United States Patent
Takahashi et al.

(10) Patent No.: US 10,230,269 B2
(45) Date of Patent: Mar. 12, 2019

(54) CONTACTLESS POWER SUPPLY SYSTEM SUPPLYING POWER USING POWER SUPPLY PAD IN CONTACT LESS MANNER

(71) Applicant: DENSO CORPORATION, Kariya, Aichi-pref. (JP)

(72) Inventors: Eisuke Takahashi, Kariya (JP); Kazuyoshi Obayashi, Kariya (JP); Kouji Mazaki, Kariya (JP); Takuro Tsutsui, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 129 days.

(21) Appl. No.: 15/121,926

(22) PCT Filed: Mar. 2, 2015

(86) PCT No.: PCT/JP2015/056087
§ 371 (c)(1),
(2) Date: Aug. 26, 2016

(87) PCT Pub. No.: WO2015/129915
PCT Pub. Date: Sep. 3, 2015

(65) Prior Publication Data
US 2017/0126059 A1    May 4, 2017

(30) Foreign Application Priority Data

Feb. 28, 2014 (JP) .................. 2014-039473
Feb. 28, 2014 (JP) .................. 2014-039477
Feb. 28, 2014 (JP) .................. 2014-039485

(51) Int. Cl.
*H02J 7/02* (2016.01)
*H01F 38/14* (2006.01)
(Continued)

(52) U.S. Cl.
CPC ............ *H02J 50/10* (2016.02); *B60L 11/182* (2013.01); *H01F 38/14* (2013.01); *H02J 7/00* (2013.01);
(Continued)

(58) Field of Classification Search
CPC .. H02J 5/005; H02J 7/025; H02J 50/10; H02J 50/90; B60L 11/182; H01F 38/14; H04B 5/0025–5/0093
(Continued)

(56) References Cited

U.S. PATENT DOCUMENTS

2009/0129126 A1   5/2009   Boys
2015/0061585 A1   3/2015   Obayashi et al.

FOREIGN PATENT DOCUMENTS

JP    2009528812 A   8/2009
JP    2013219968 A   10/2013

*Primary Examiner* — Hal Kaplan
(74) *Attorney, Agent, or Firm* — Harness, Dickey & Pierce, P.L.C.

(57) ABSTRACT

A contactless power supply system includes: a power supply pad including a power supply core formed of a magnetic material, and a power supply coil that uses the power supply core as a magnetic path; and a filter circuit including an inductor coil, the filter circuit being connected to the power supply pad. The power supply pads to which the respective filter circuits are connected are brought into a face-to-face relation so that electric power is transmitted from one power supply pad to the other power supply pad in a contactless manner. An inductor coil of at least either one of the filter circuits is provided to the power supply core of the power supply pad to which the filter circuit is connected, and the inductor coil uses the power supply core as a magnetic path.

20 Claims, 72 Drawing Sheets

(51) Int. Cl.
  *H02J 50/10* (2016.01)
  *H04B 5/00* (2006.01)
  *B60L 11/18* (2006.01)
  *H02J 50/12* (2016.01)
  *H02J 50/80* (2016.01)
  *H02J 7/00* (2006.01)
  *H02J 17/00* (2006.01)
  *H02J 50/90* (2016.01)
  *B60M 7/00* (2006.01)

(52) U.S. Cl.
  CPC ............ *H02J 7/0027* (2013.01); *H02J 7/025* (2013.01); *H02J 17/00* (2013.01); *H02J 50/12* (2016.02); *H02J 50/80* (2016.02); *H02J 50/90* (2016.02); *H04B 5/0037* (2013.01); *H04B 5/0075* (2013.01); *B60M 7/003* (2013.01)

(58) Field of Classification Search
  USPC ........................................................ 307/104
  See application file for complete search history.

CONTACTLESS POWER SUPPLY SYSTEM SUPPLYING POWER USING POWER SUPPLY PAD IN CONTACT LESS MANNER

CROSS REFERENCE TO RELATED APPLICATIONS

This application is a U.S. National Phase Application under 35 U.S.C. 371 of International Application No. PCT/JP2015/056087 filed on Mar. 2, 2015 and published in Japanese as WO 2015/129915 A1 on Sep. 3, 2015. This application is based on and claims the benefit of priority from Japanese Patent Application No. 2014-039473 filed on Feb. 28, 2014, Japanese Patent Application No. 2014-039477 filed on Feb. 28, 2014, and Japanese Patent Application No. 2014-039485 filed on Feb. 28, 2014. The entire disclosures of all of the above applications are incorporated herein by reference.

BACKGROUND OF THE INVENTION

Technical Field

The present disclosure relates to a contactless power supply system including power supply pads and a filter circuit having an inductor coil and connected to the power supply pads, in which the power supply pads are located face-to-face and electric power is transmitted from one power supply pad to the other power supply pad in a contactless manner.

Background Art

Contactless power supply systems are known, which include power supply pads and a filter circuit having an inductor coil and connected to the power supply pads. In such a contactless power supply system, the power supply pads are located face-to-face and electric power is transmitted from one power supply pad to the other power supply pad in a contactless manner. For example, JP-A-2009-528812 discloses an inductively coupled power transfer system.

The inductively coupled power transfer system includes a transformer, a loop conductor, and a pickup coil. A filter circuit is configured using the leakage inductance of the transformer. The transformer insulates an alternating current supplied to the loop conductor, and converts the current into a predetermined voltage. The filter circuit removes predetermined frequency components included in the insulated alternating current. When the pickup coil is allowed to face the loop conductor, the pickup coil is magnetically coupled to the loop conductor. As a result, electric power is transmitted from the loop conductor to the pickup coil in a contactless manner. The loop conductor and the pickup coil correspond to the power supply pad. The leakage inductance of the transformer corresponds to the inductance of the inductor coil.

Patent Literature 1: JP-A-2009-528812

In the case where a filter circuit is used in a contactless power supply system, typically, an inductor coil having a core is used.

On the other hand, in the above-described inductively coupled power transfer system, the filter circuit is configured using the leakage inductance of the transformer. Thus, it is not necessary to separately provide an inductor coil having a core as a filter circuit, and the system can be downsized.

However, the inductively coupled power transfer system is applicable only to a system including a transformer. If inductance necessary for a filter circuit is large, leakage inductance of the transformer has to be increased, causing the efficiency of the transformer to be lowered.

SUMMARY

Hence it is desired to provide a contactless power supply system that can be used in the absence of a transformer, with a reduced size compared with the case of separately providing an inductor coil having a core, and with the characteristics of the filter circuit being ensured.

The present disclosure made in order to solve the problem is a contactless power supply system characterized by: a power supply pad having a power supply core formed of a magnetic material, and a power supply coil provided to the power supply core, the power supply coil using the power supply core as a magnetic path; and a filter circuit having an inductor coil, the filter circuit being connected to the power supply pad. In the contactless power supply system, the power supply pad to which the filter circuit is connected is opposed to the power supply pad to which the filter circuit is connected, and electric power is transmitted from one of the power supply pads to the other of the power supply pads in a contactless manner. In the contactless power supply system, the inductor coil of at least any one of the filter circuits is provided to the power supply core of the power supply pad to which the filter circuit is connected, and the inductor coil uses the power supply core as a magnetic path.

In another feature of the present disclosure, the inductor coil of at least any one of the filter circuits is in an annular shape. The inductor coil is provided to the power supply core of the power supply pad to which the filter circuit is connected so that magnetic fluxes generated from the power supply coil are substantially perpendicular to an axial center direction at an axial center part. The inductor coil uses the power supply core as a magnetic path. The axial center direction is a normal direction to the inner plane surrounded by the annular inductor coil, the normal direction passing through the axial center of the annular inductor coil. The axial center part is an inner part surrounded by the annular inductor coil and is a columnar part extending in the axial center direction. The term "magnetic fluxes generated from the power supply coil are substantially perpendicular to the axial center direction at the axial center part" means that magnetic fluxes generated from the power supply coil are within an allowable range close to an angle of 90 including an angle of 90 with respect to the axial center direction of the inductor coil at the axial center part of the inductor coil.

In still another feature of the present disclosure, the inductor coil of at least any one of the filter circuits is configured to include a plurality of coils which are arranged so that electric currents induced from magnetic fluxes generated from the power supply coil cancel each other. The inductor coil is provided to the power supply core of the power supply pad to which the filter circuit is connected. The inductor coil uses the power supply core as a magnetic path.

According to these configurations, the power supply core of the power supply pad is used as a core included in the magnetic path of the inductor coil. Thus, the contactless power supply system is applicable to a mode in which no transformer is provided. Further, the contactless power supply system can be downsized, compared with the case where an inductor coil having a core is separately provided. Moreover, according to the other features of the present disclosure, magnetic fluxes generated from the power supply coil are substantially perpendicular to the axial center direction at the axial center part of the inductor coil. Moreover, the inductor coil is configured to include the plurality of coils which are arranged so that electric currents induced from magnetic fluxes generated from the power supply coil cancel each other. Thus, the coupling coefficient of the inductor coil to the power supply coil is substantially zero, reducing the magnetic fluxes generated from the power supply coil as much as possible. Accordingly, the characteristics of the filter circuit can be ensured.

BRIEF DESCRIPTION OF DRAWINGS

FIG. 120 is a cross-sectional view taken along the line E-E of FIG. 118.

FIG. 121 is a diagram corresponding to FIG. 118 for explaining current flow in the inductor coil.

FIG. 122 is a diagram corresponding to FIG. 119 for explaining current flow in the inductor coil.

FIG. 123 is a diagram corresponding to FIG. 120 for explaining magnetic flux flow in the inductor coil.

FIG. 124 is a diagram for explaining magnetic flux flow in a power transmission side pad and the inductor coil.

FIG. 125 is a diagram for explaining current flow in the inductor coil generated from magnetic flux in the power transmission side pad.

FIG. 126 is a top view of a core for explaining the layout of an inductor coil of a contactless power supply system according to a twenty-first embodiment.

FIG. 127 is a cross-sectional view taken along the line F-F of FIG. 126.

FIG. 128 is a diagram corresponding to FIG. 126 for explaining current flow in the inductor coil.

FIG. 129 is a diagram corresponding to FIG. 127 for explaining magnetic flux flow in the inductor coil.

FIG. 130 is a diagram for explaining magnetic flux flow in a power transmission side pad and the inductor coil.

FIG. 131 is a diagram for explaining current flow in the inductor coil generated from magnetic flux in the power transmission side pad.

Figure 132:
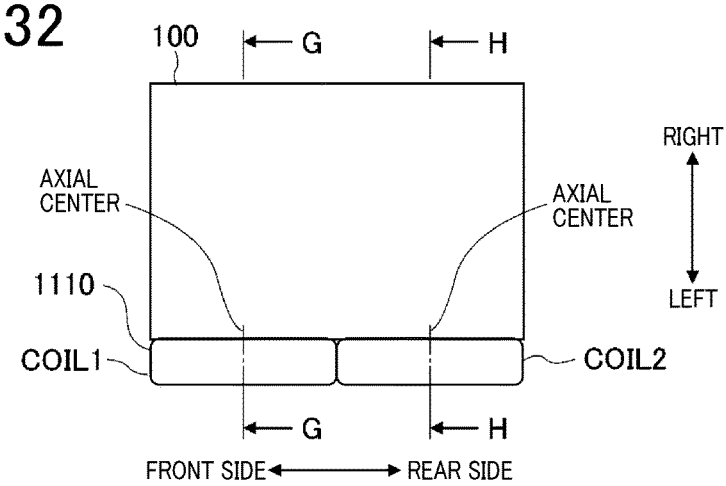

FIG. 132 is a top view of a core for explaining the layout of an inductor coil of a contactless power supply system according to a twenty-second embodiment.

Figure 133:
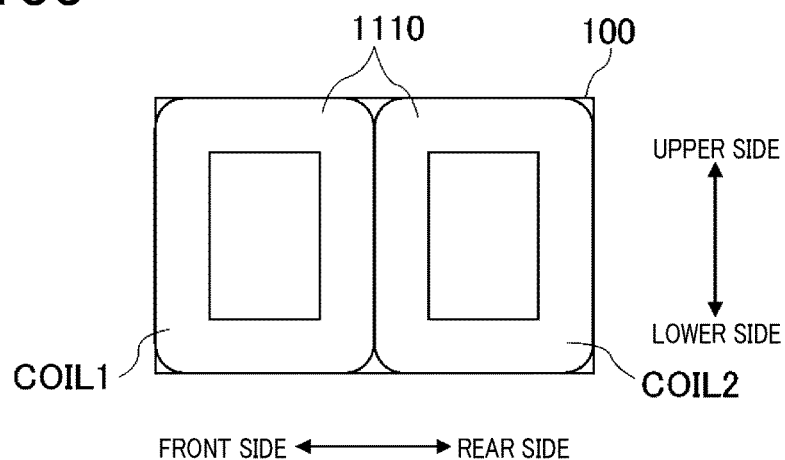

FIG. 133 is a left side view of the core for explaining the layout of the inductor coil.

Figure 134:
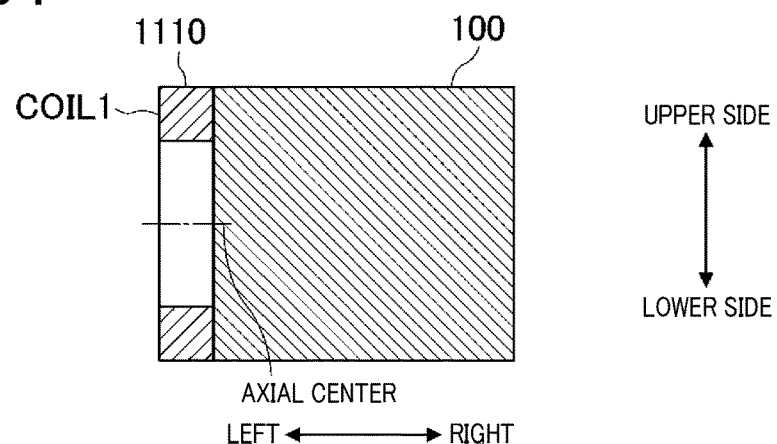

FIG. 134 is a cross-sectional view taken along the line G-G of FIG. 132.

Figure 135:
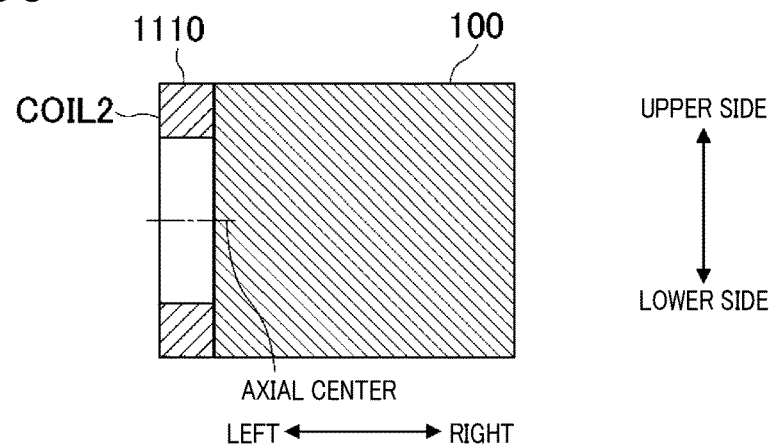

FIG. 135 is a cross-sectional view taken along the line H-H of FIG. 132.

Figure 136:
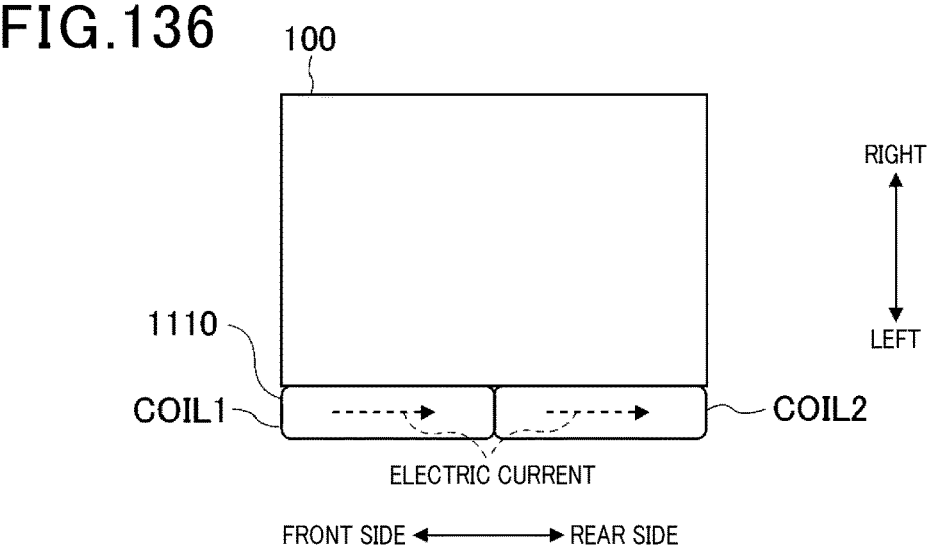

FIG. 136 is a diagram corresponding to FIG. 132 for explaining current flow in the inductor coil.

Figure 137:
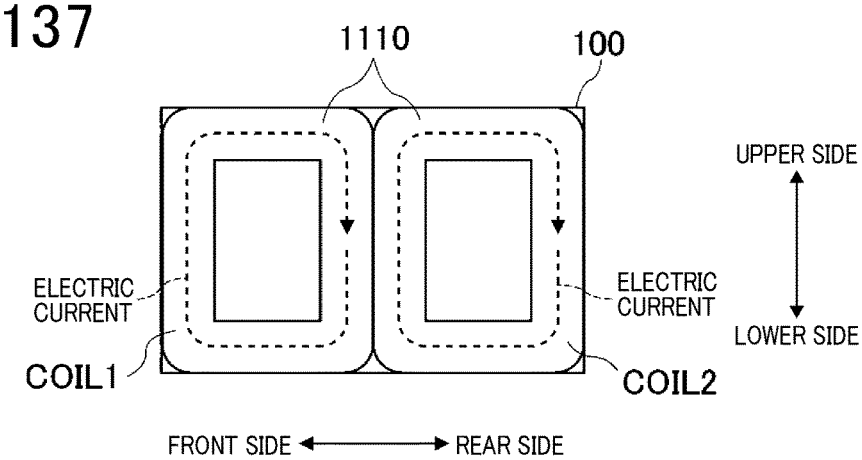

FIG. 137 is a diagram corresponding to FIG. 133 for explaining current flow in the inductor coil.

Figure 138:
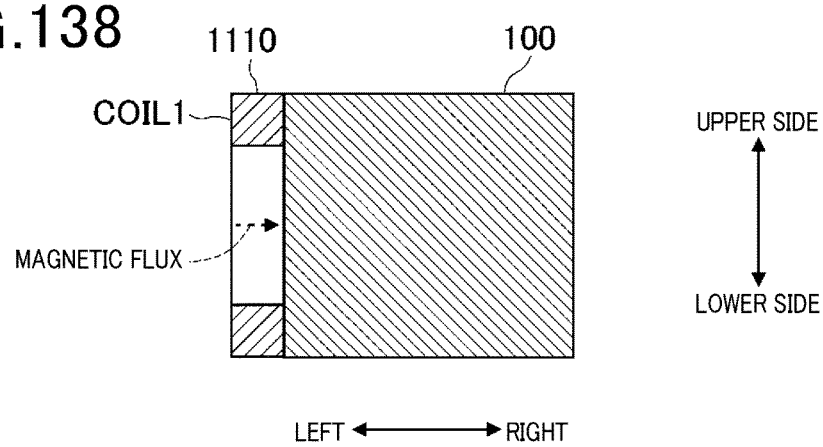

FIG. 138 is a diagram corresponding to FIG. 134 for explaining magnetic flux flow in the inductor coil.

Figure 139:
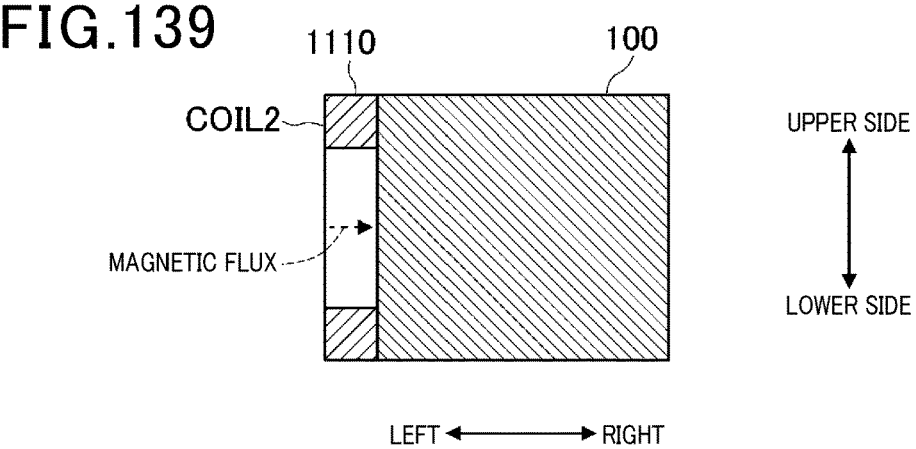

FIG. 139 is a diagram corresponding to FIG. 135 for explaining magnetic flux flow in the inductor coil.

Figure 140:
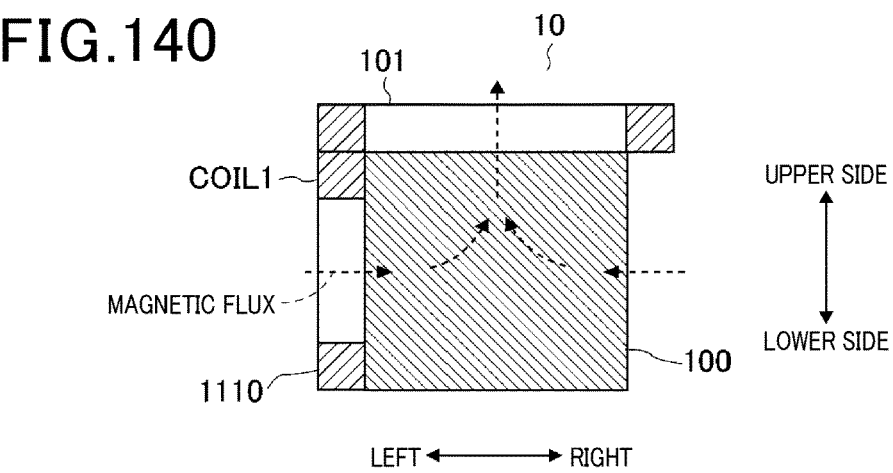

FIG. 140 is a diagram for explaining magnetic flux flow in a power transmission side pad and the inductor coil.

Figure 141:
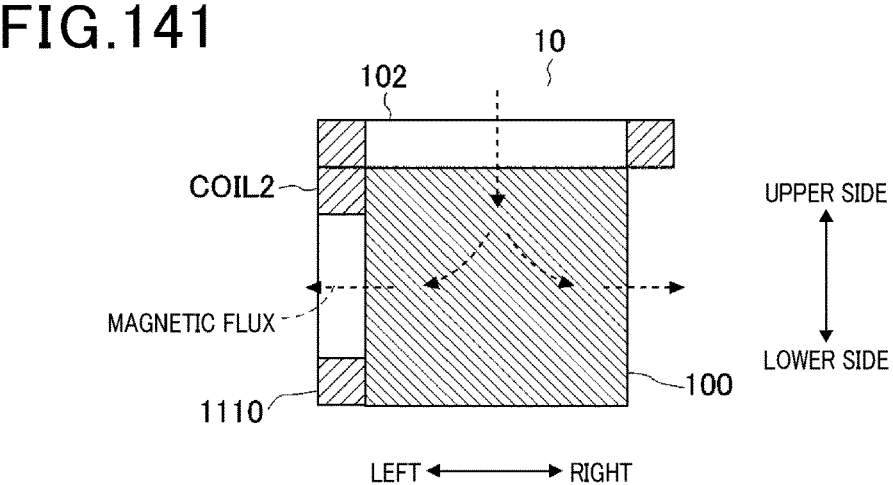

FIG. 141 is a diagram for explaining magnetic flux flow in the power transmission side pad and the inductor coil.

Figure 142:
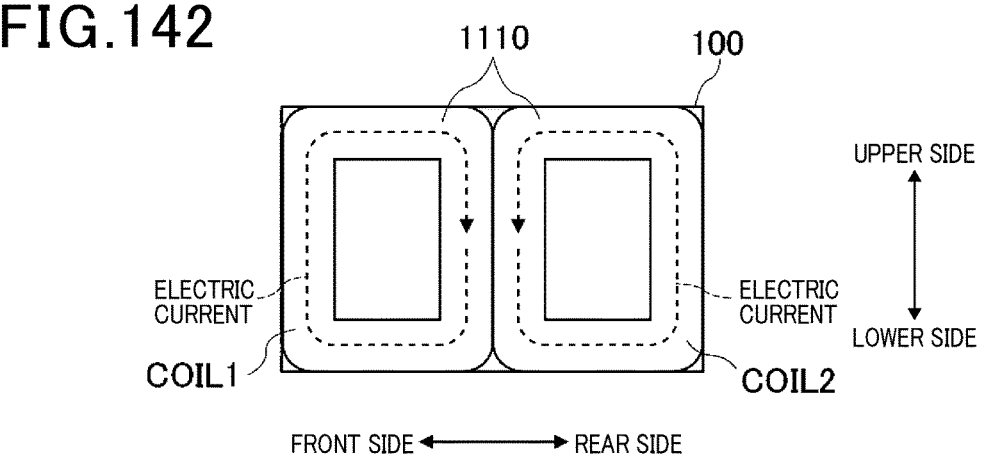

FIG. 142 is a diagram for explaining current flow in the inductor coil generated from magnetic flux in the power transmission side pad.

Figure 143:
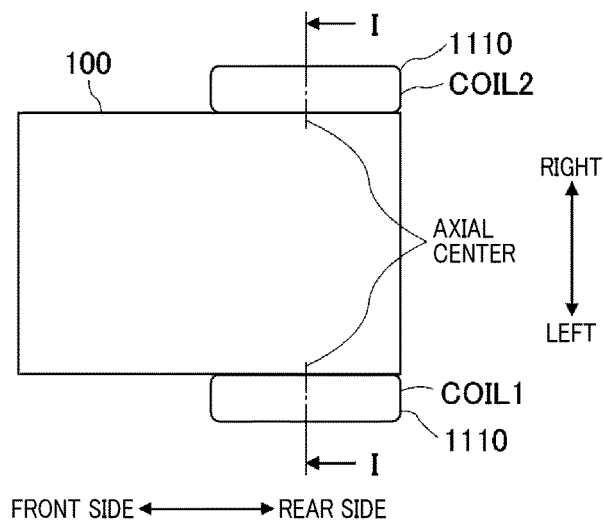

FIG. 143 is a top view of a core for explaining the layout of an inductor coil of a contactless power supply system according to a twenty-third embodiment.

Figure 144:
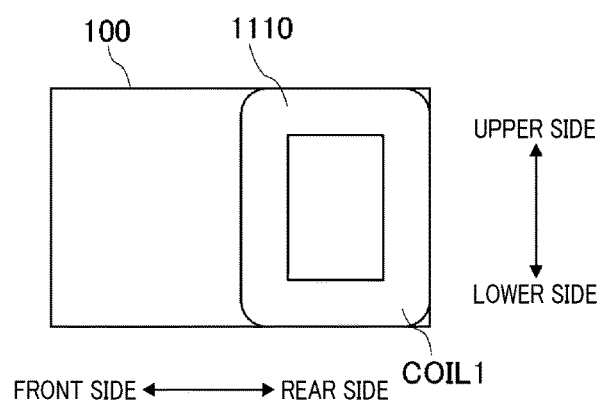

FIG. 144 is a left side view of the core for explaining the layout of the inductor coil.

Figure 145:
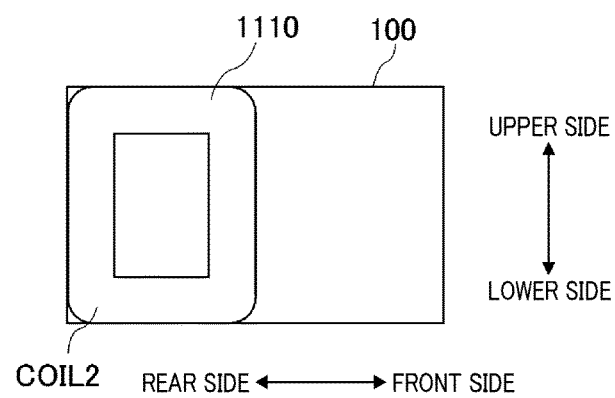

FIG. 145 is a right side view of the core for explaining the layout of the inductor coil.

Figure 146:
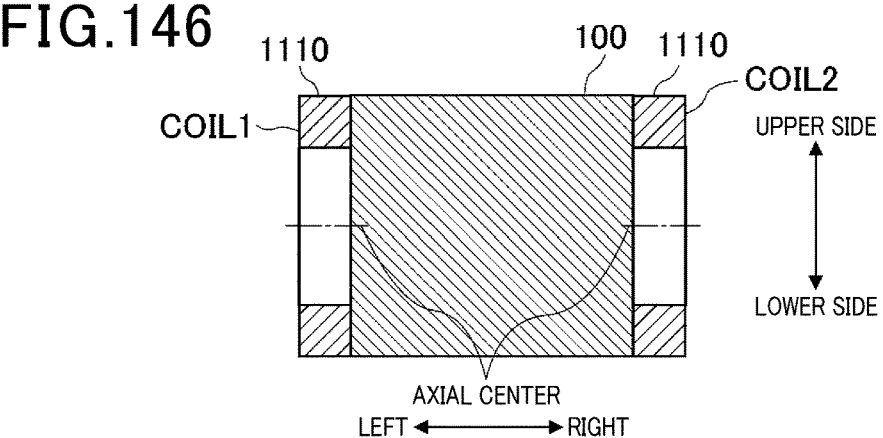

FIG. 146 is a cross-sectional view taken along the line I-I of FIG. 143.

Figure 147:
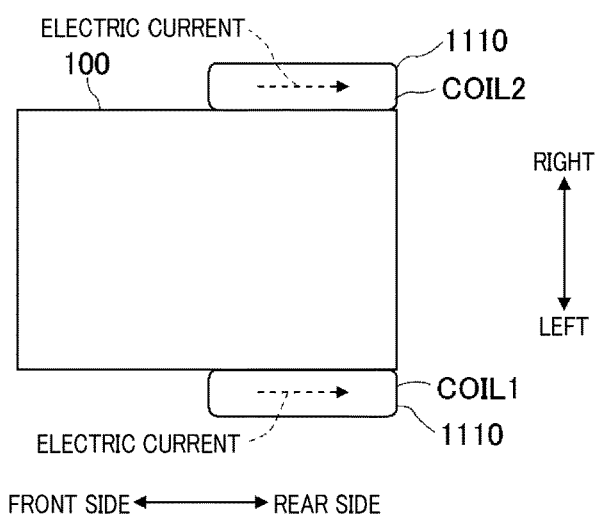

FIG. 147 is a diagram corresponding to FIG. 143 for explaining current flow in the inductor coil.

Figure 148:
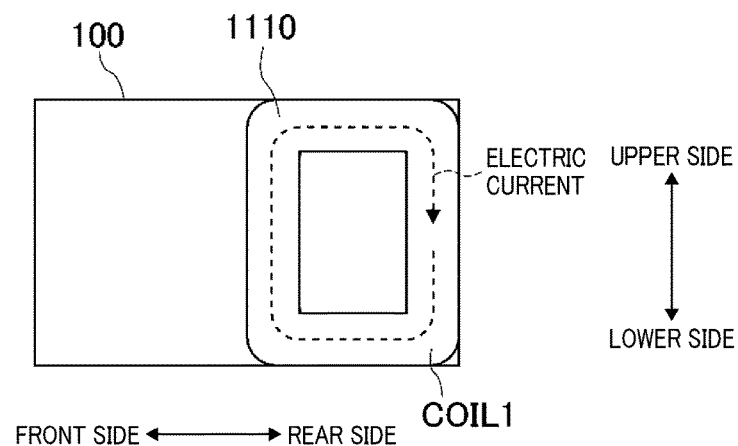

FIG. 148 is a diagram corresponding to FIG. 144 for explaining current flow in the inductor coil.

Figure 149:
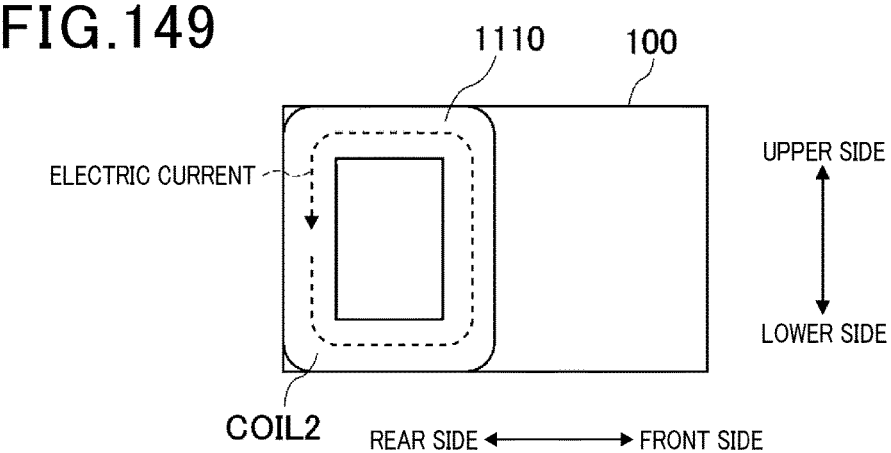

FIG. 149 is a diagram corresponding to FIG. 145 for explaining current flow in the inductor coil.

Figure 150:
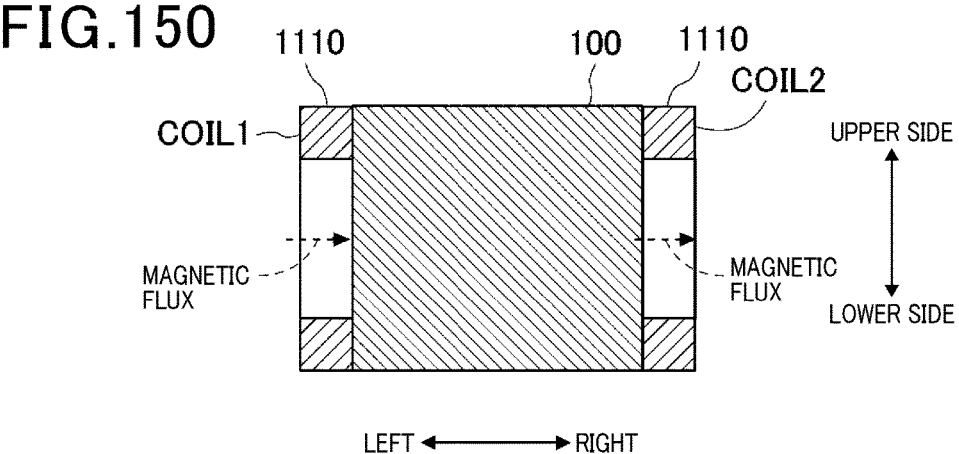

FIG. 150 is a diagram corresponding to FIG. 146 for explaining magnetic flux flow in the inductor coil.

Figure 151:
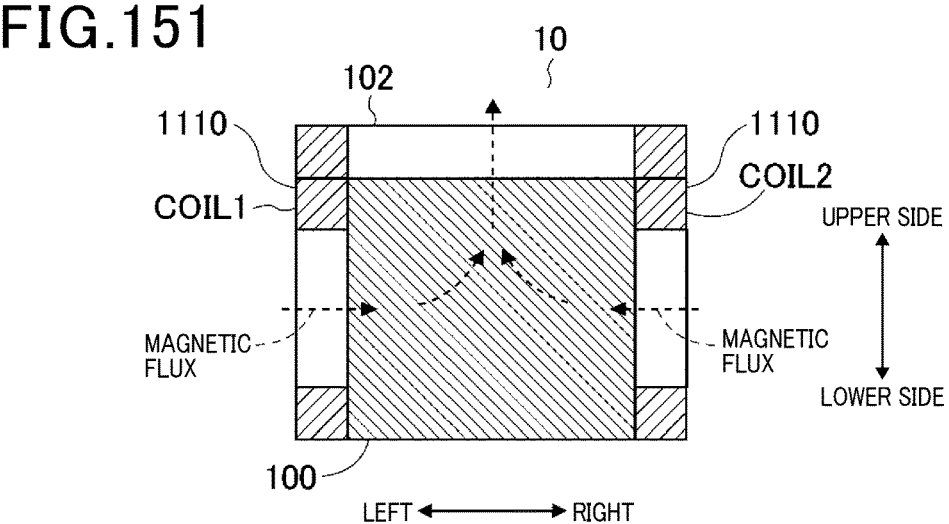

FIG. 151 is a diagram for explaining magnetic flux flow in a power transmission side pad and the inductor coil.

Figure 152:
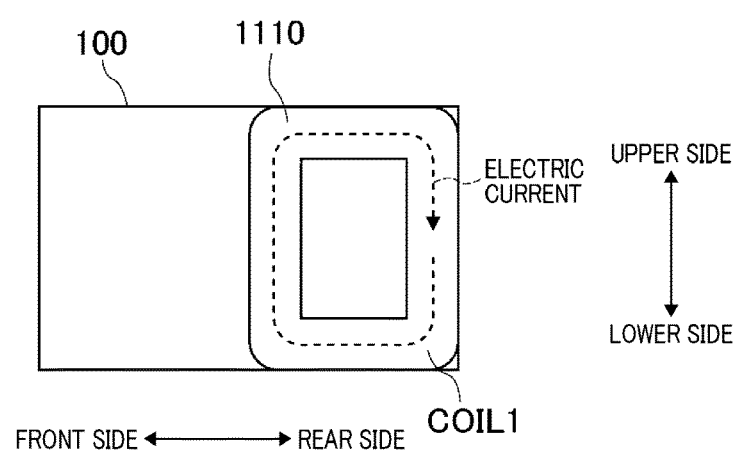

FIG. 152 is a diagram corresponding to FIG. 144 for explaining current flow in the inductor coil generated from magnetic flux in the power transmission side pad.

Figure 153:
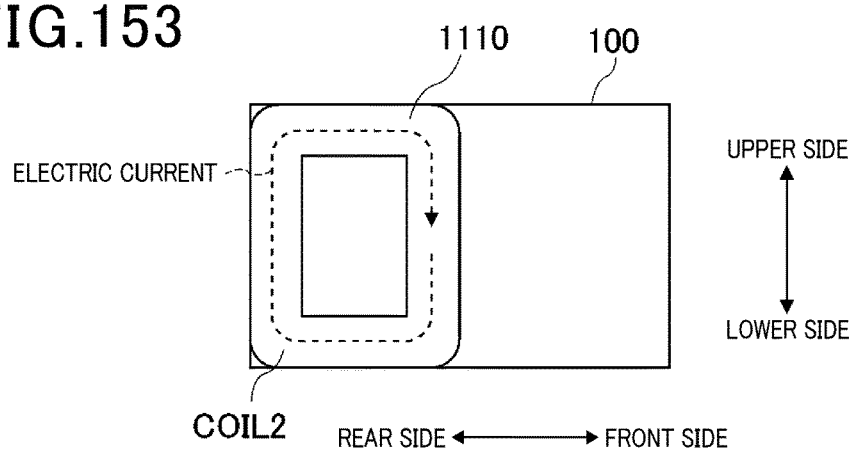

FIG. 153 is a diagram corresponding to FIG. 145 for explaining current flow in the inductor coil generated from magnetic flux in the power transmission side pad.

Figure 154:
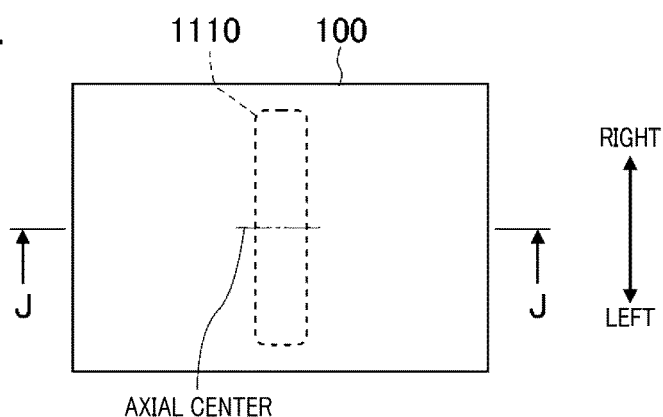

FIG. 154 is a top view of a core for explaining the layout of an inductor coil of a contactless power supply system according to a twenty-fourth embodiment.

Figure 155:
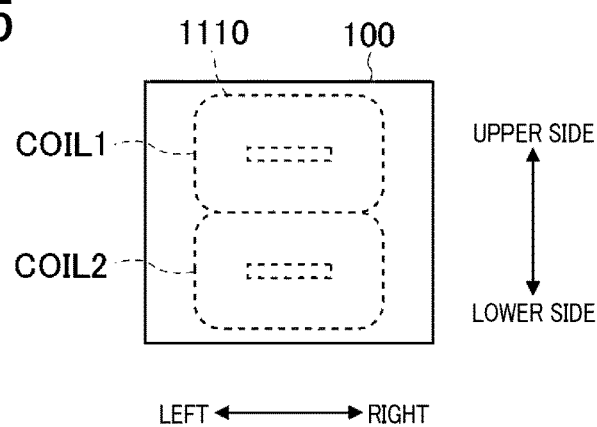

FIG. 155 is a rear side view of the core for explaining the layout of the inductor coil.

Figure 156:
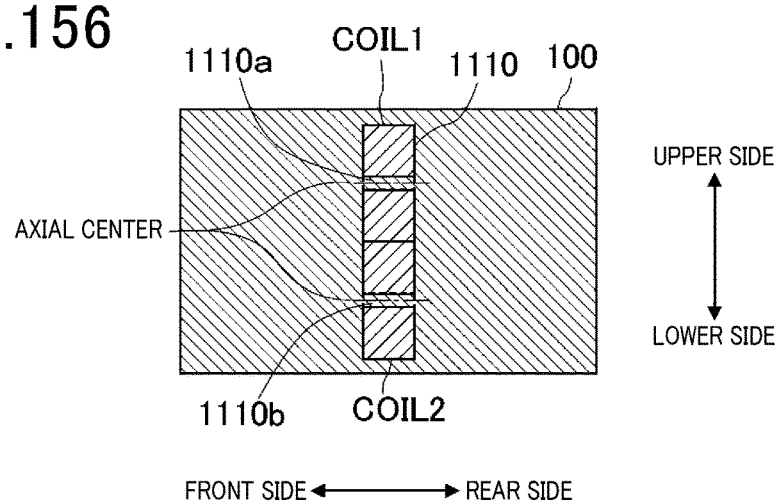

FIG. 156 is a cross-sectional view taken along the line J-J of FIG. 154.

Figure 157:
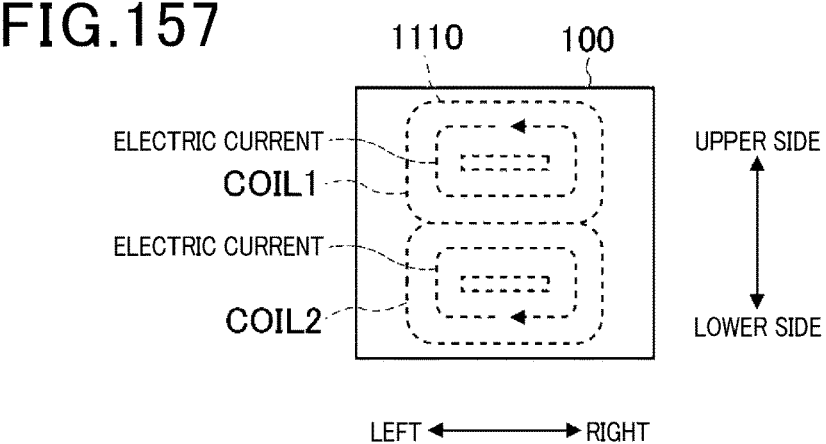

FIG. 157 is a diagram corresponding to FIG. 155 for explaining current flow in the inductor coil.

Figure 158:
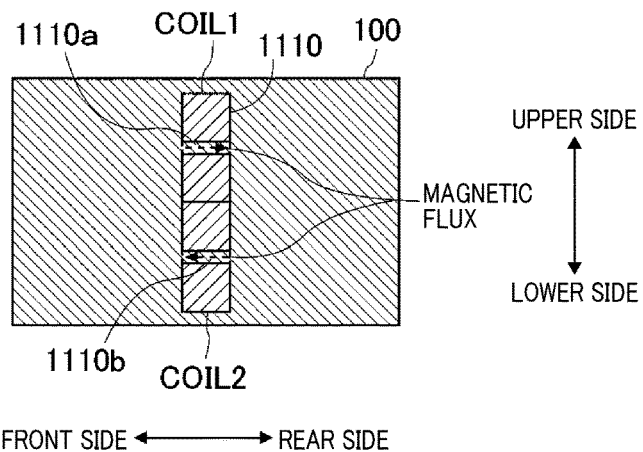

FIG. 158 is a diagram corresponding to FIG. 156 for explaining magnetic flux flow in the inductor coil.

Figure 159:
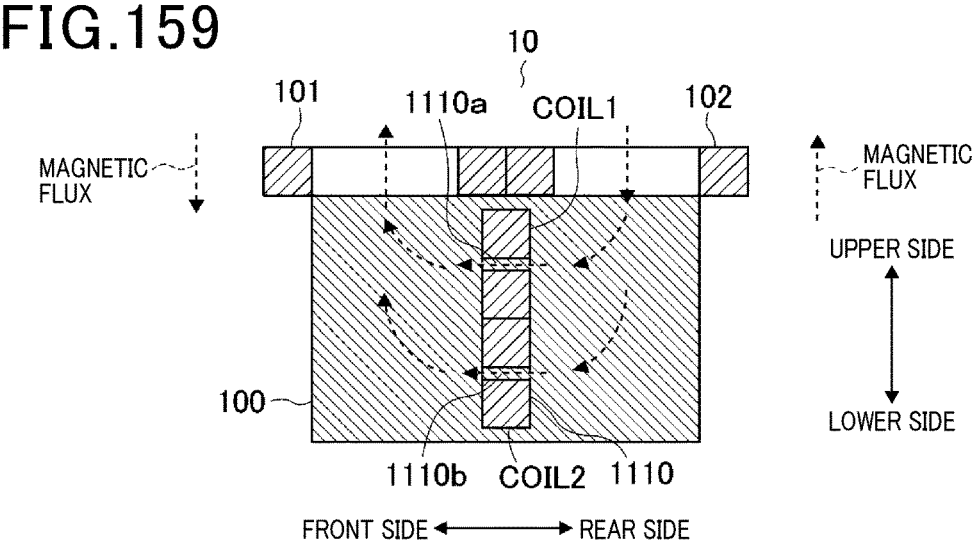

FIG. 159 is a diagram for explaining magnetic flux flow in a power transmission side pad and the inductor coil.

Figure 160:
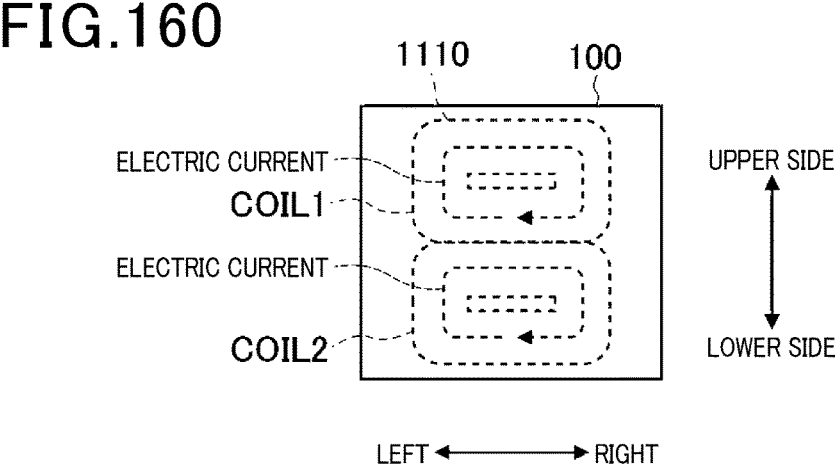

FIG. 160 is a diagram for explaining current flow in the inductor coil generated from magnetic flux in the power transmission side pad.

Figure 161:
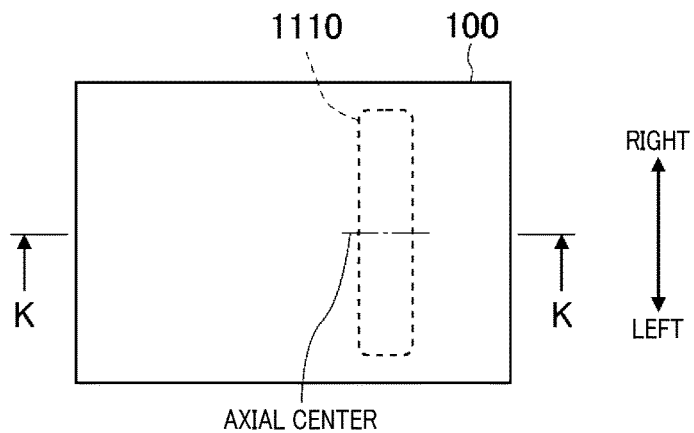

FIG. 161 is a top view of a core for explaining the layout of an inductor coil of a contactless power supply system according to a twenty-fifth embodiment.

Figure 162:
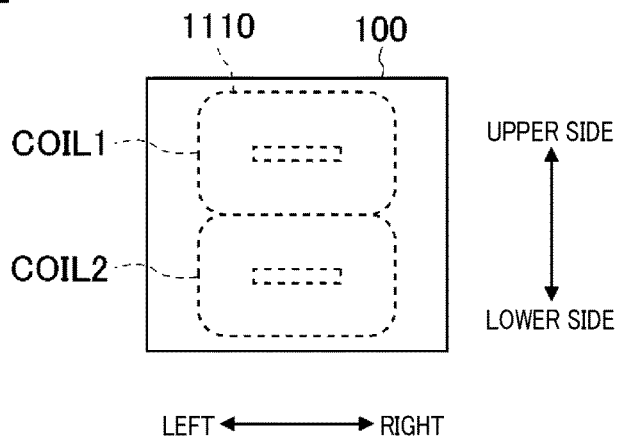

FIG. 162 is a rear side view of the core for explaining the layout of the inductor coil.

Figure 163:
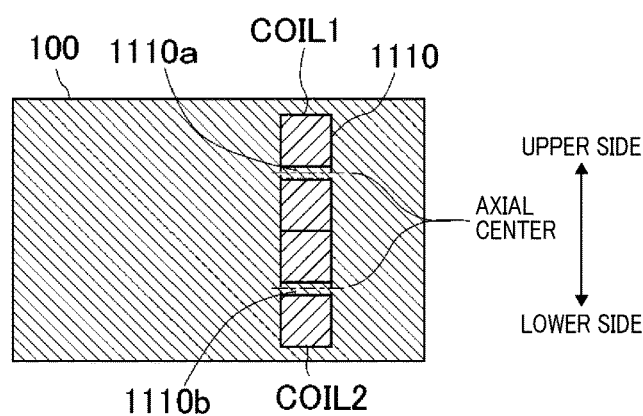

FIG. 163 is a cross-sectional view taken along the line K-K of FIG. 161.

Figure 164:
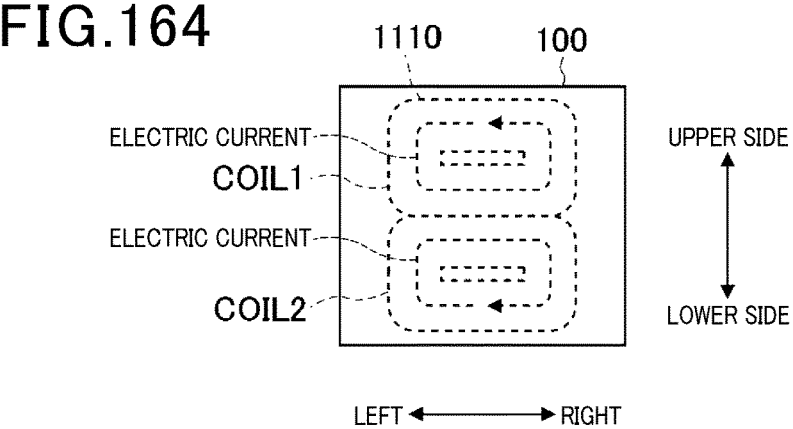

FIG. 164 is a diagram corresponding to FIG. 162 for explaining current flow in the inductor coil.

Figure 165:
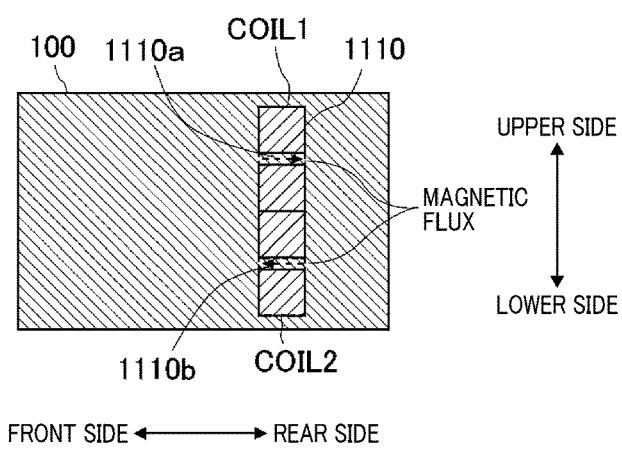

FIG. 165 is a diagram corresponding to FIG. 163 for explaining magnetic flux flow in the inductor coil.

Figure 166:
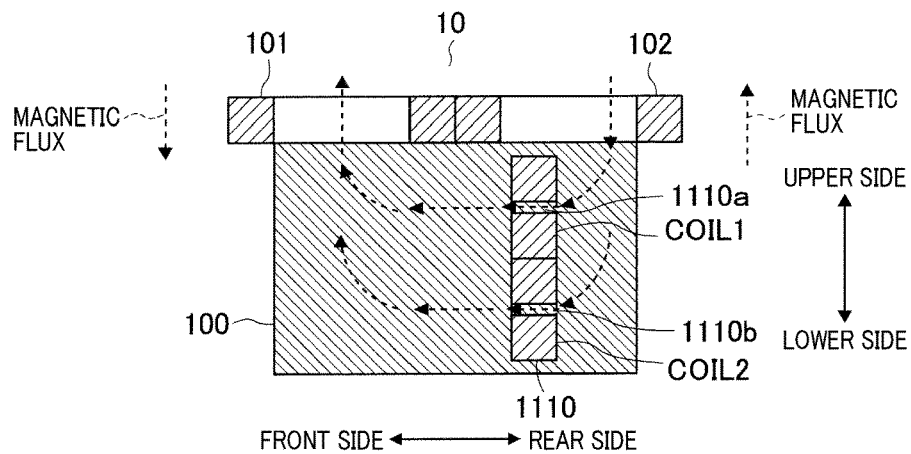

FIG. 166 is a diagram for explaining magnetic flux flow in a power transmission side pad and the inductor coil.

Figure 167:
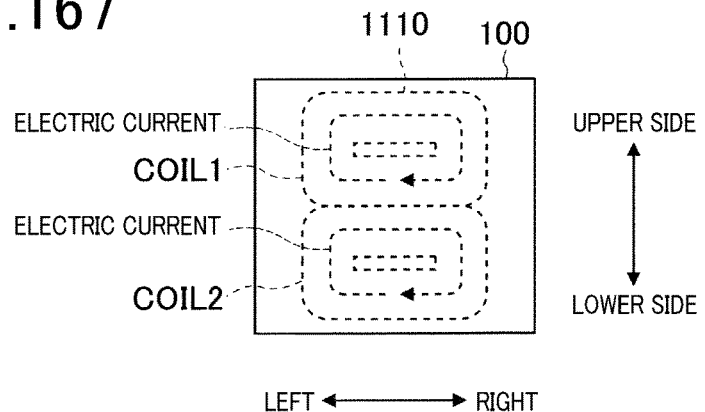

FIG. 167 is a diagram for explaining current flow in the inductor coil generated from magnetic flux in the power transmission side pad.

Figure 168:
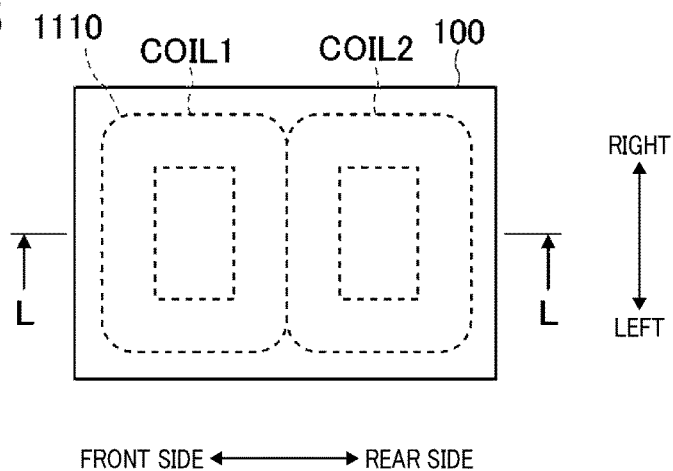

FIG. 168 is a top view of a core for explaining the layout of an inductor coil of a contactless power supply system according to a twenty-sixth embodiment.

Figure 169:
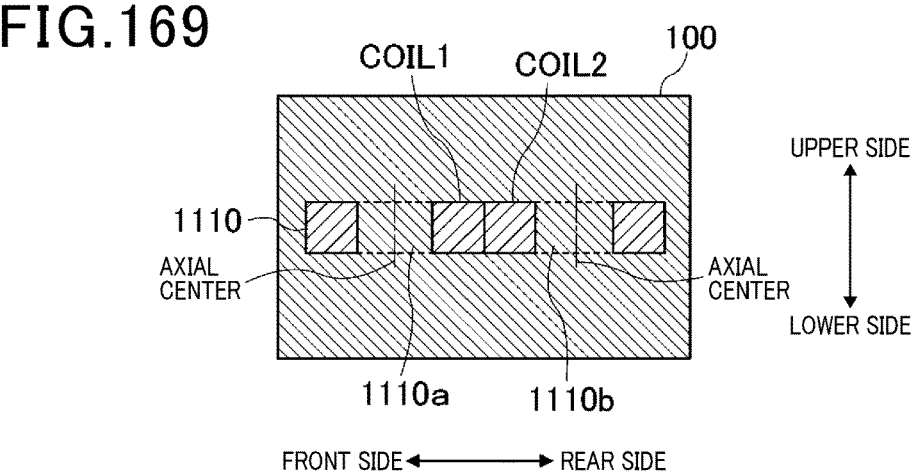

FIG. 169 is a cross-sectional view taken along the line L-L of FIG. 168.

Figure 170:
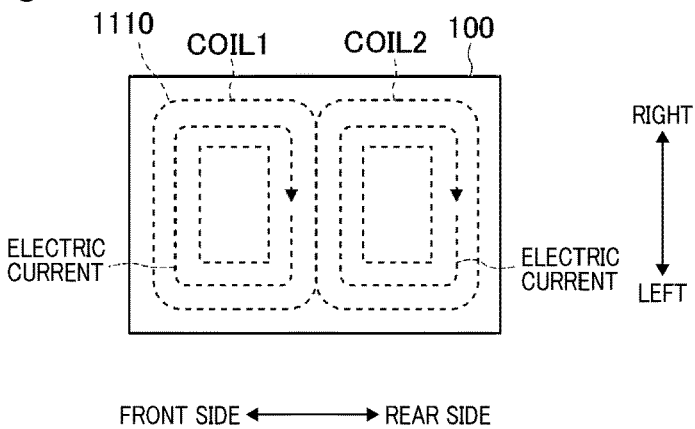

FIG. 170 is a diagram corresponding to FIG. 168 for explaining current flow in the inductor coil.

Figure 171:
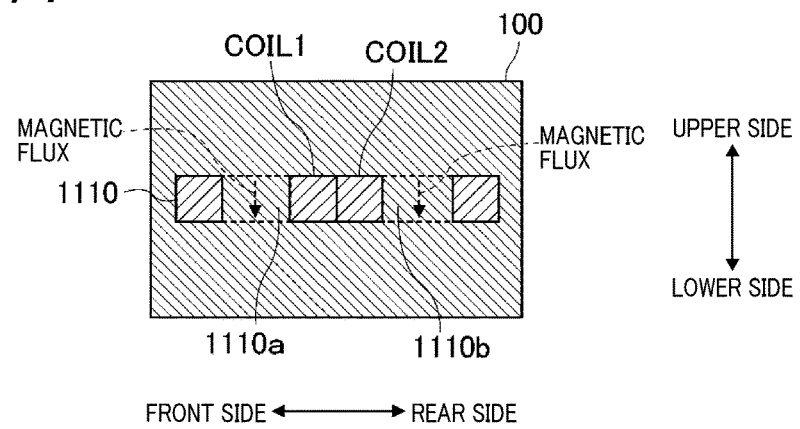

FIG. 171 is a diagram corresponding to FIG. 169 for explaining magnetic flux flow in the inductor coil.

Figure 172:
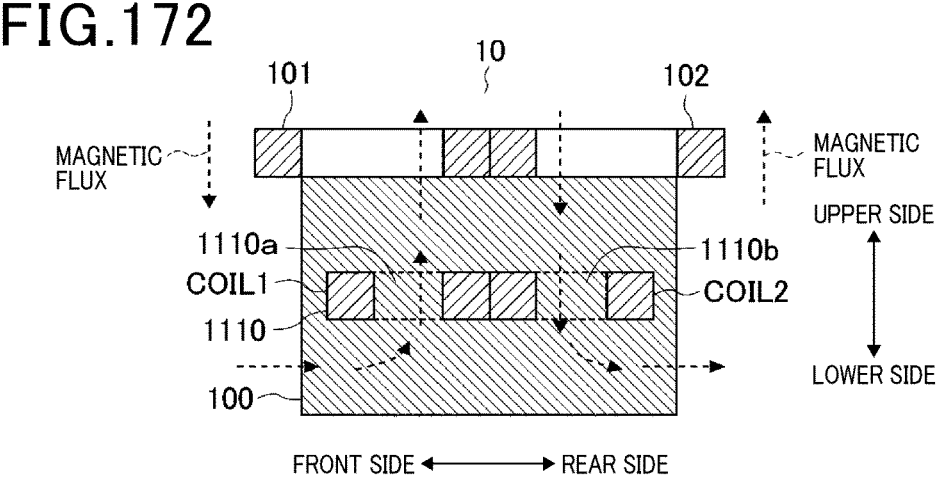

FIG. 172 is a diagram for explaining magnetic flux flow in a power transmission side pad and the inductor coil.

Figure 173:
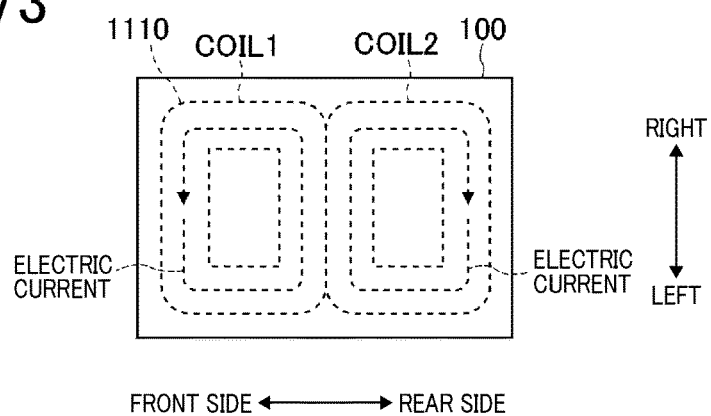

FIG. 173 is a diagram for explaining current flow in the inductor coil generated from magnetic flux in the power transmission side pad.

Figure 174:
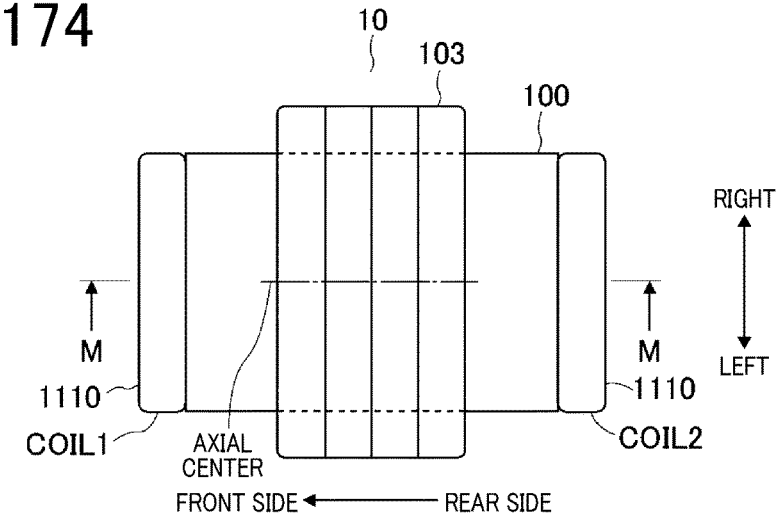

FIG. 174 is a top view of a power transmission side pad of a contactless power supply system according to a twenty-seventh embodiment.

Figure 175:
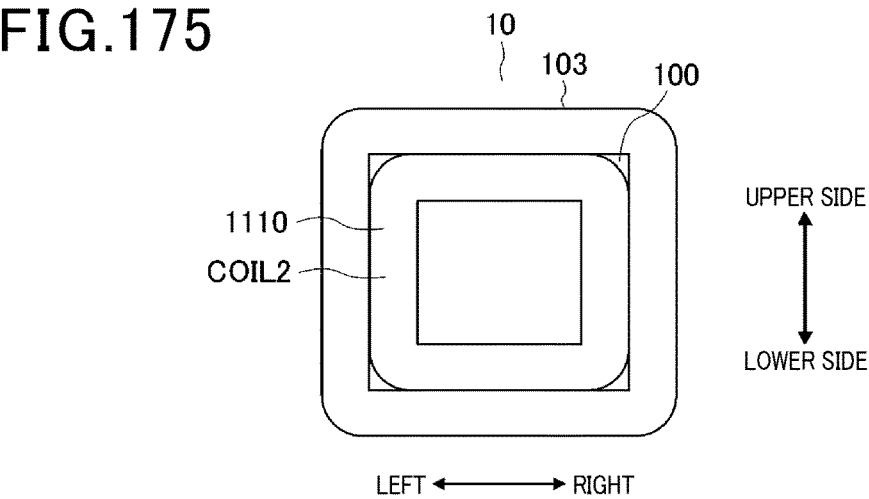

FIG. 175 is a rear side view of the power transmission side pad.

Figure 176:
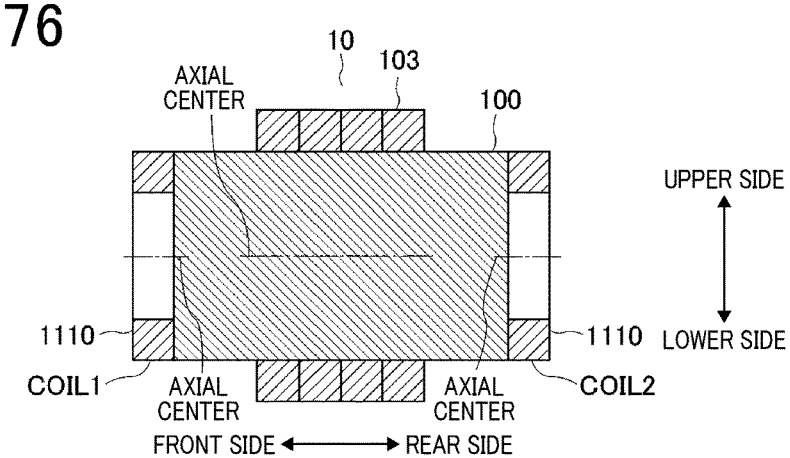

FIG. 176 is a cross-sectional view taken along the line M-M of FIG. 174.

Figure 177:
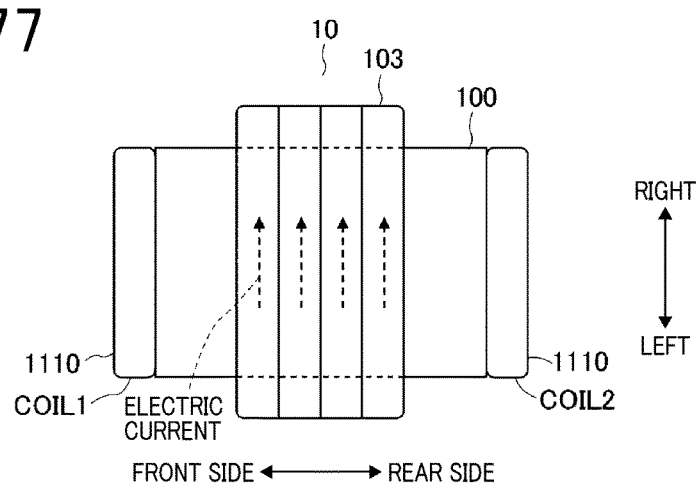

FIG. 177 is a diagram corresponding to FIG. 174 for explaining current flow in the power transmission side pad.

Figure 178:
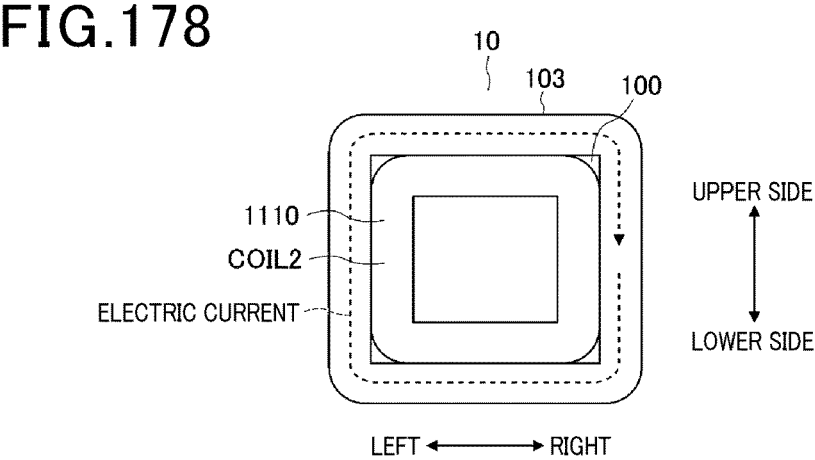

FIG. 178 is a diagram corresponding to FIG. 175 for explaining current flow in the power transmission side pad.

Figure 179:
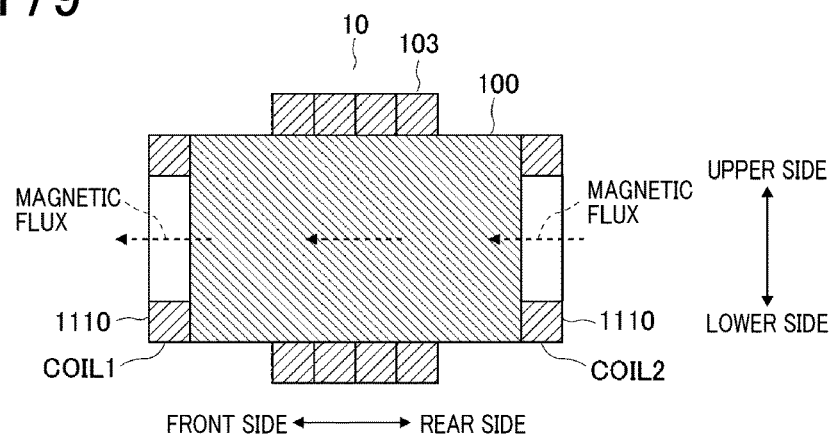

FIG. 179 is a diagram for explaining magnetic flux flow in the power transmission side pad and the inductor coil.

Figure 180:
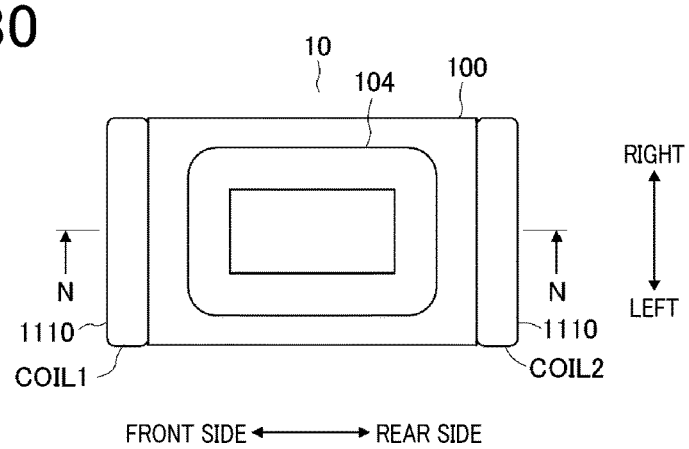

FIG. 180 is a top view of a power transmission side pad of a contactless power supply system according to a twenty-eighth embodiment.

Figure 181:
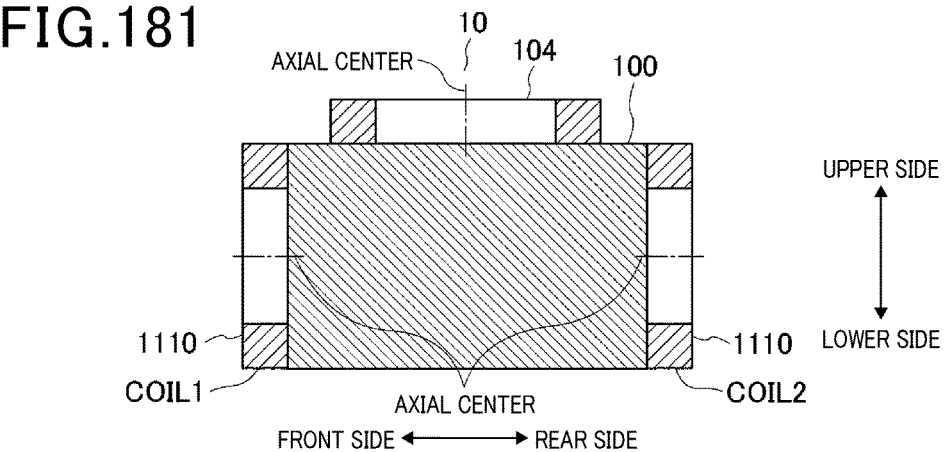

FIG. 181 is a cross-sectional view taken along the line N-N of FIG. 180.

Figure 182:
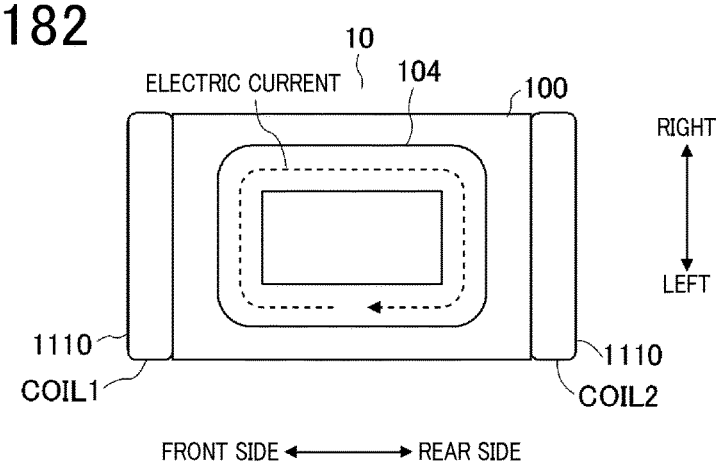

FIG. 182 is a diagram corresponding to FIG. 180 for explaining current flow in the power transmission side pad.

Figure 183:
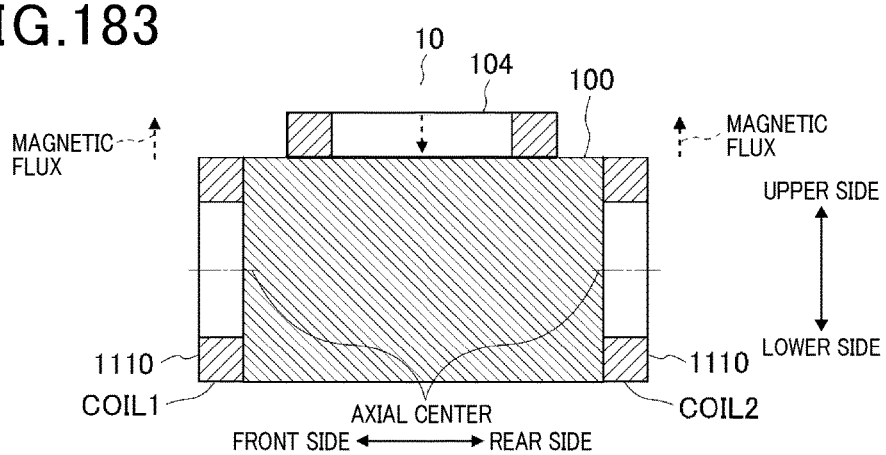

FIG. 183 is a diagram corresponding to FIG. 181 for explaining current flow in the power transmission side pad.

Figure 110:
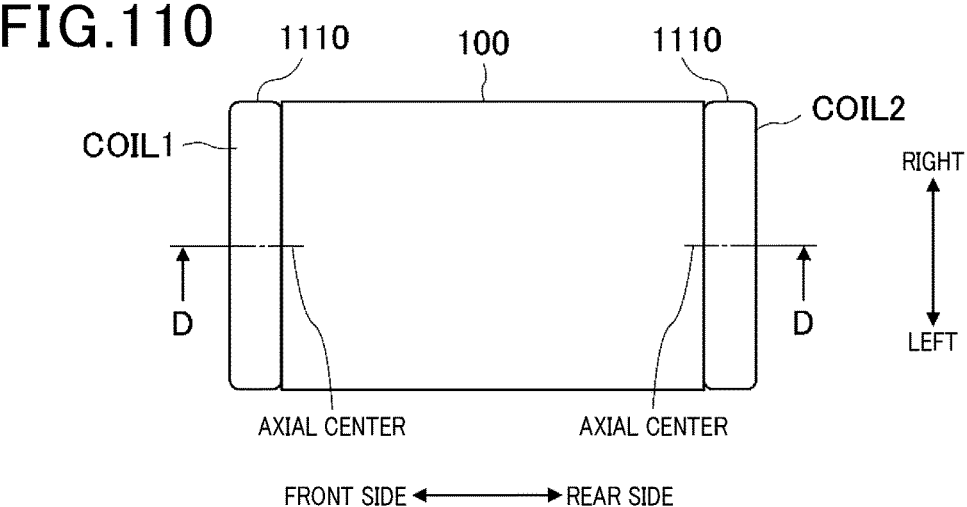
FIG. 110 is a top view of a core for explaining the layout of an inductor coil.
Figure 184:
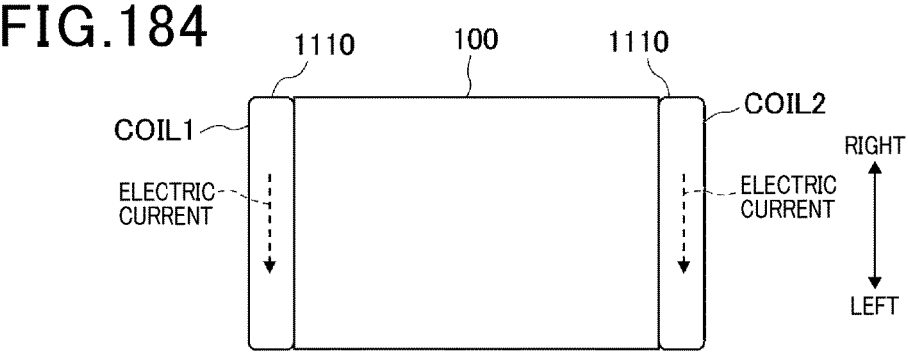

FIG. 184 is a diagram corresponding to FIG. 110 for explaining current flow in the inductor coil.

Figure 111:
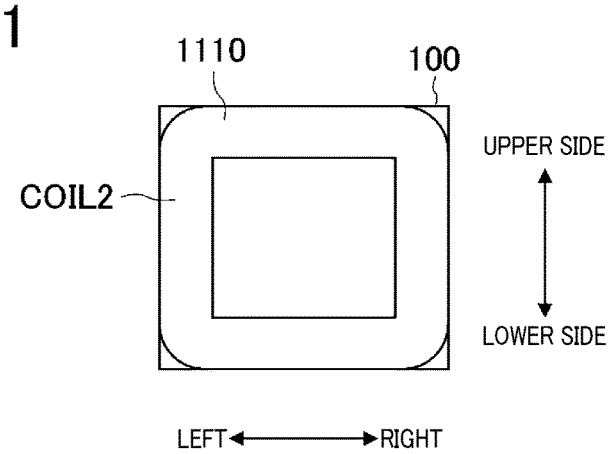
FIG. 111 is a rear side view of the core for explaining the layout of the inductor coil.
Figure 185:
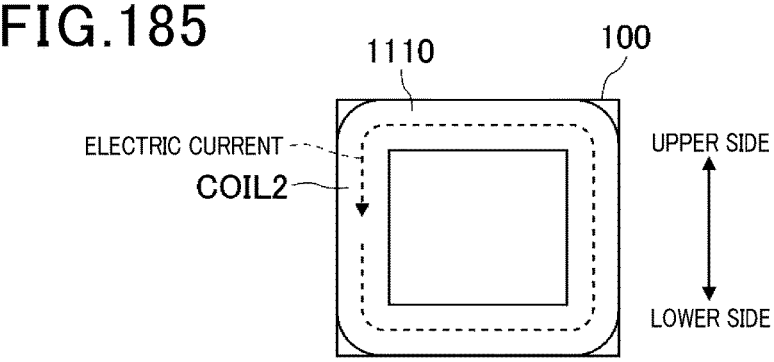

FIG. 185 is a diagram corresponding to FIG. 111 for explaining current flow in the inductor coil.

Figure 112:
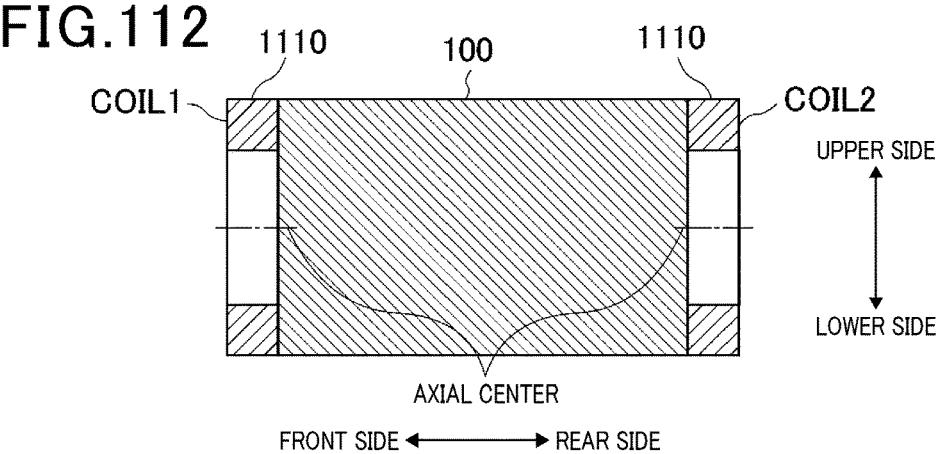
FIG. 112 is a cross-sectional view taken along the line D-D of FIG. 110.
Figure 186:
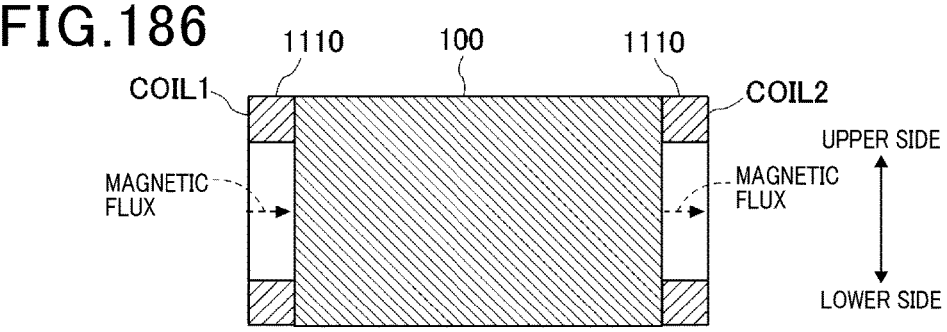

FIG. 186 is a diagram corresponding to FIG. 112 for explaining magnetic flux flow in the inductor coil.

Figure 187:
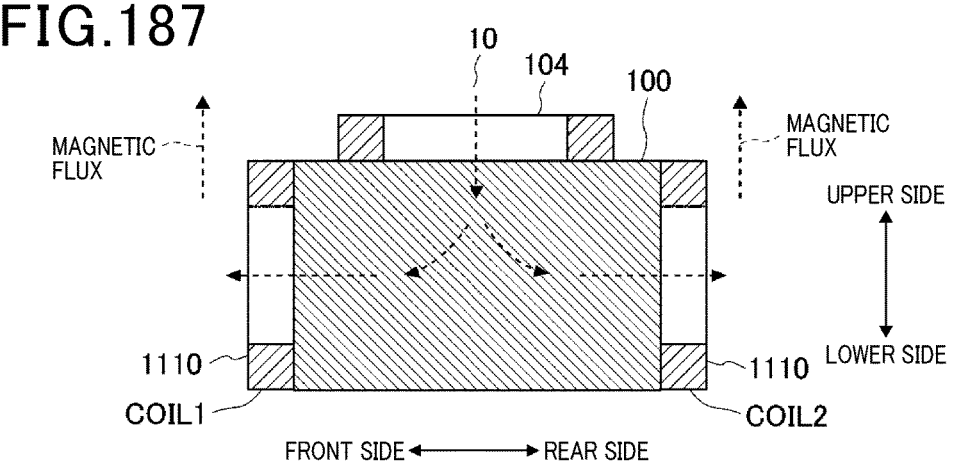

FIG. 187 is a diagram for explaining magnetic flux flow in the power transmission side pad and the inductor coil.

Figure 188:
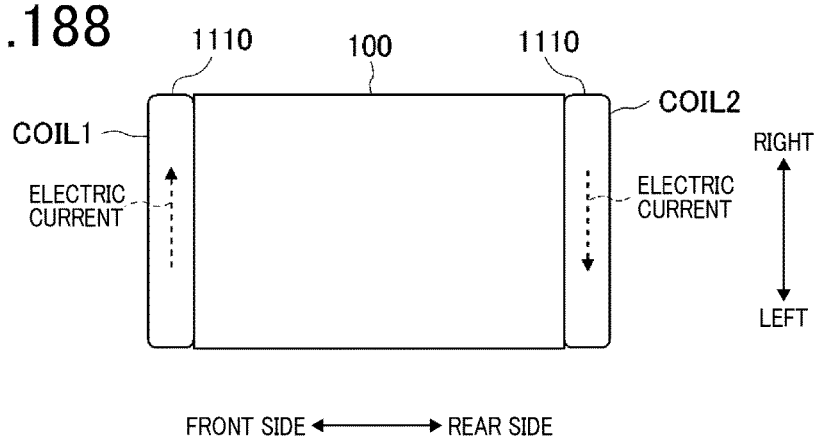

FIG. 188 is a diagram for explaining current flow in the inductor coil generated from magnetic flux in the power transmission side pad.

Figure 118:
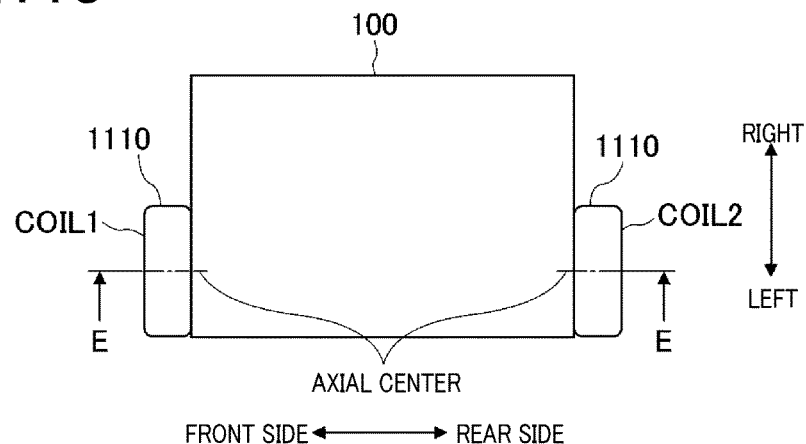
FIG. 118 is a top view of a core for explaining the layout of an inductor coil of a contactless power supply system according to a twentieth embodiment.
Figure 189:
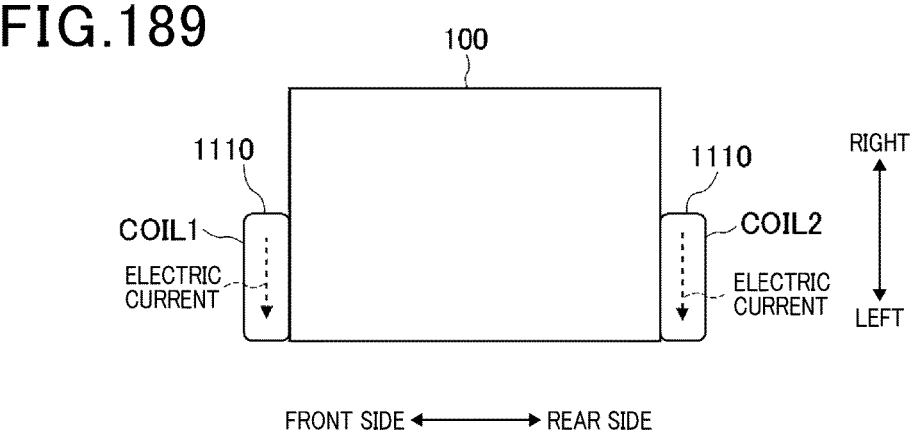

FIG. 189 is a diagram corresponding to FIG. 118 for explaining current flow in an inductor coil of a contactless power supply system according to a twenty-ninth embodiment.

Figure 119:
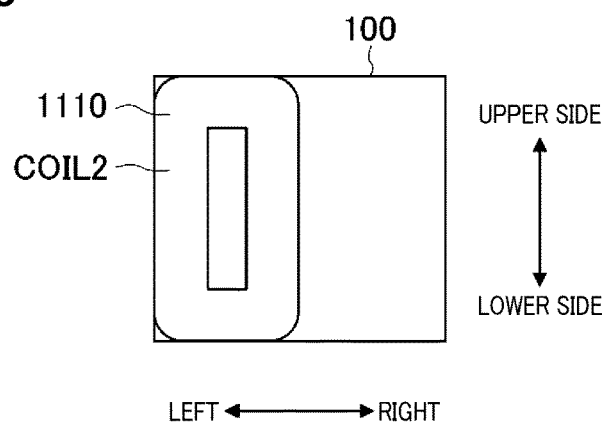
FIG. 119 is a rear side view of the core for explaining the layout of the inductor coil.
Figure 190:
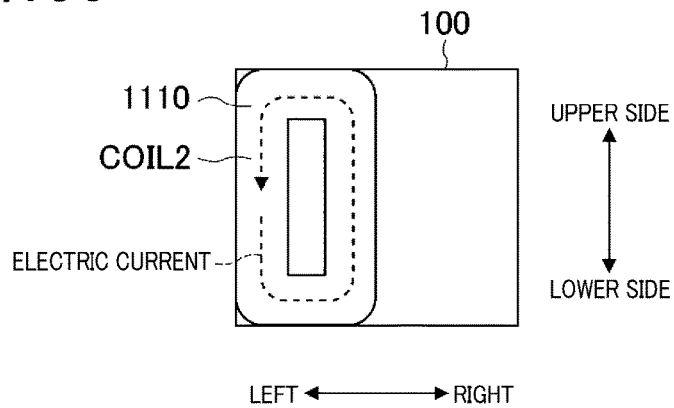

FIG. 190 is a diagram corresponding to FIG. 119 for explaining current flow in the inductor coil.

Figure 120:
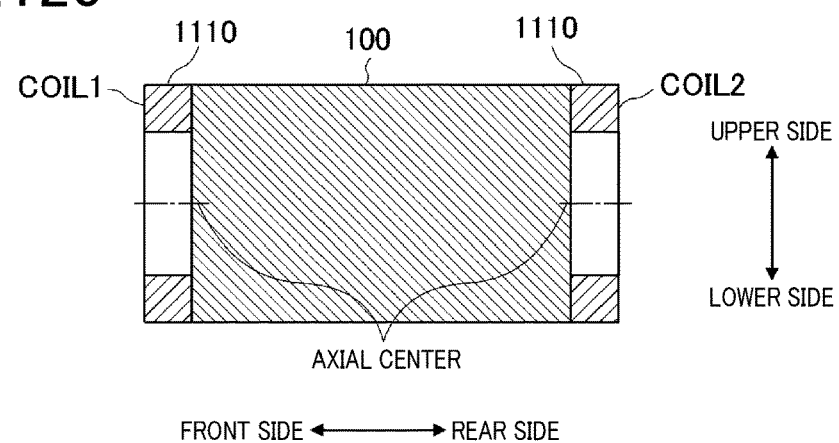
Figure 191:
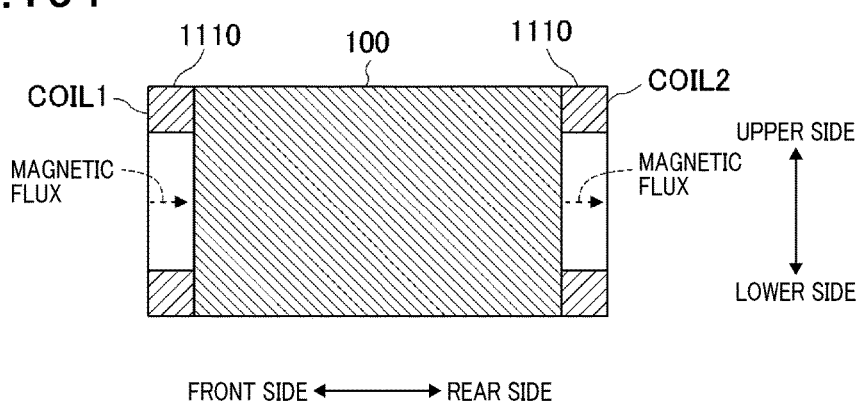

FIG. 191 is a diagram corresponding to FIG. 120 for explaining magnetic flux flow in the inductor coil.

Figure 192:
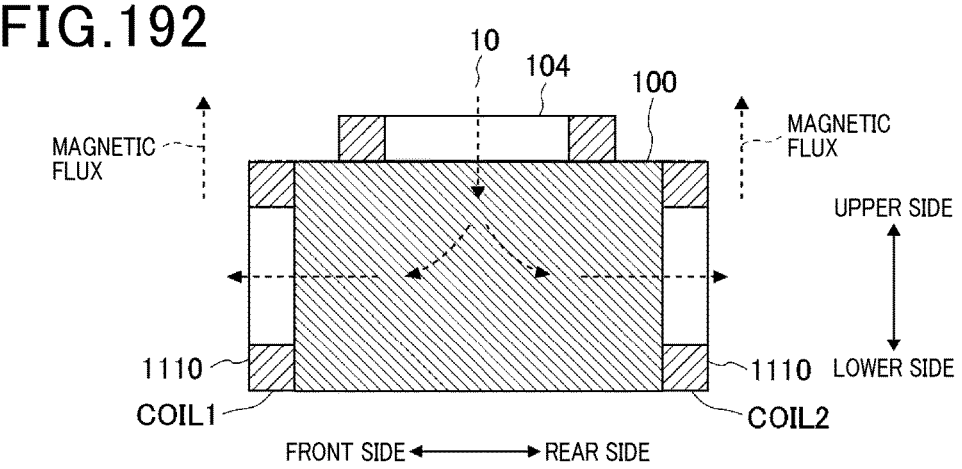

FIG. 192 is a diagram for explaining magnetic flux flow in a power transmission side pad and the inductor coil.

Figure 193:
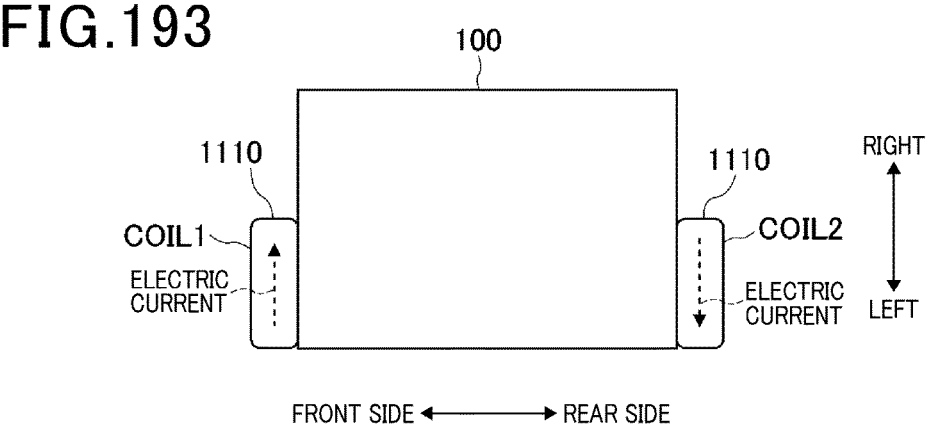

FIG. 193 is a diagram for explaining current flow in the inductor coil generated from magnetic flux in the power transmission side pad.

Figure 126:
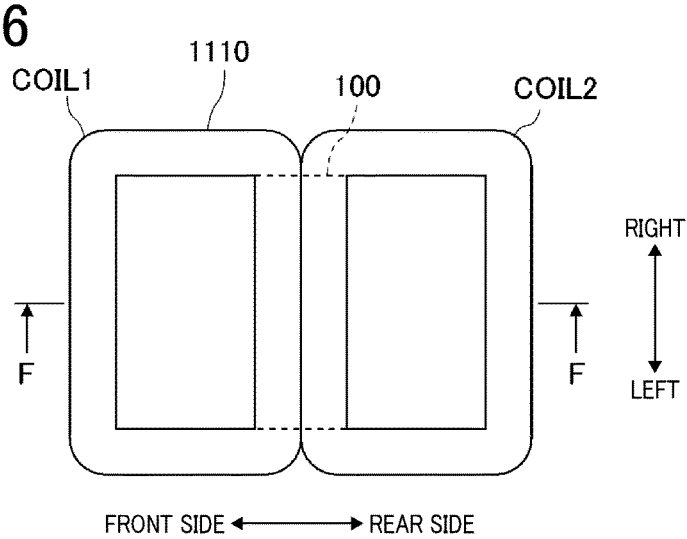
Figure 194:
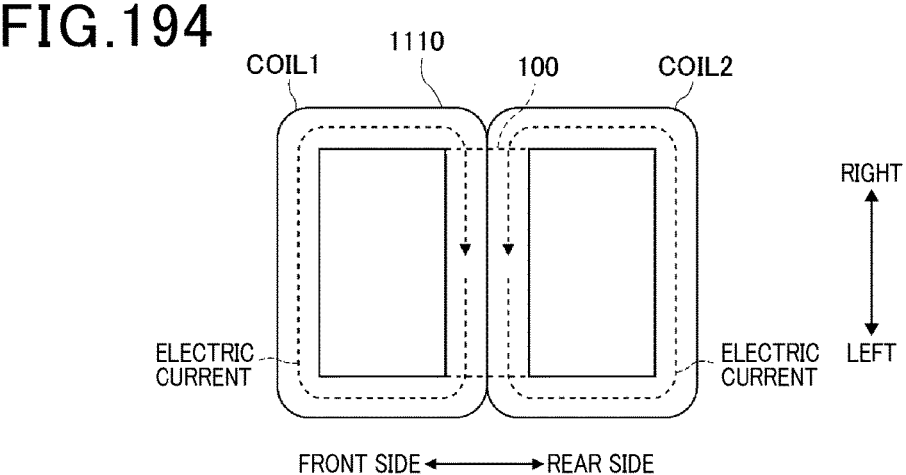

FIG. 194 is a diagram corresponding to FIG. 126 for explaining current flow in an inductor coil of a contactless power supply system according to a thirtieth embodiment.

Figure 127:
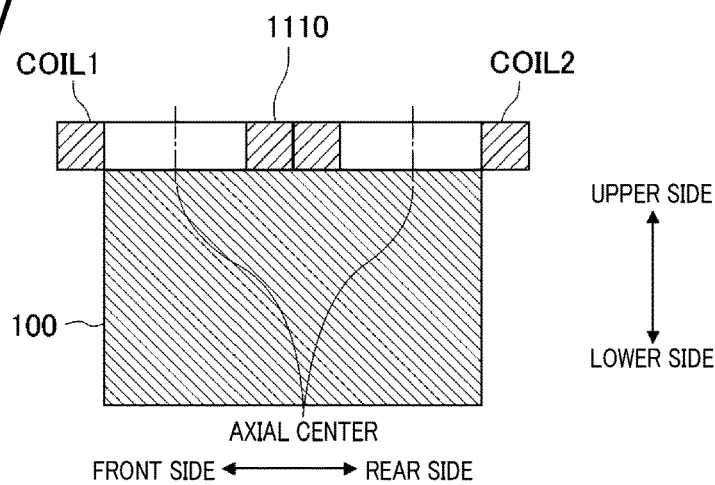
Figure 195:
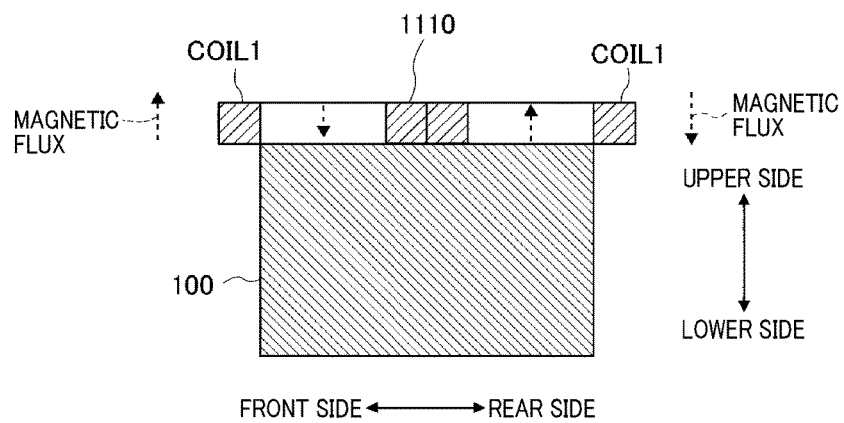

FIG. 195 is a diagram corresponding to FIG. 127 for explaining magnetic flux flow in the inductor coil.

Figure 196:
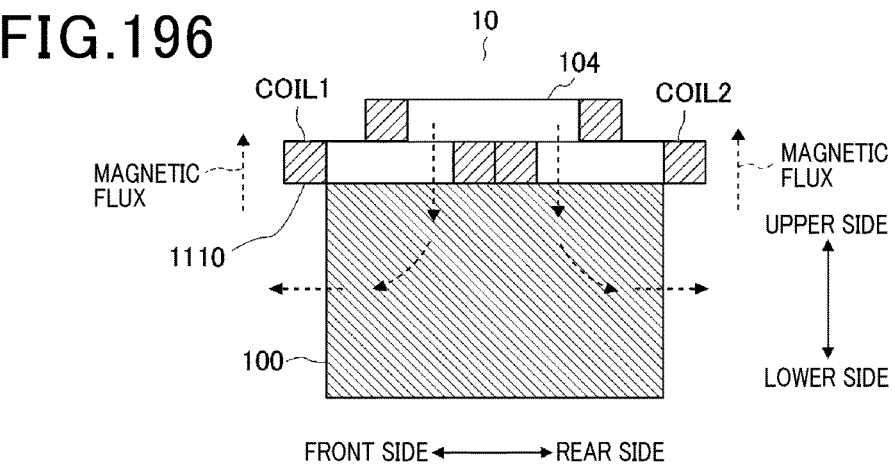

FIG. 196 is a diagram for explaining magnetic flux flow in a power transmission side pad and the inductor coil.

Figure 197:
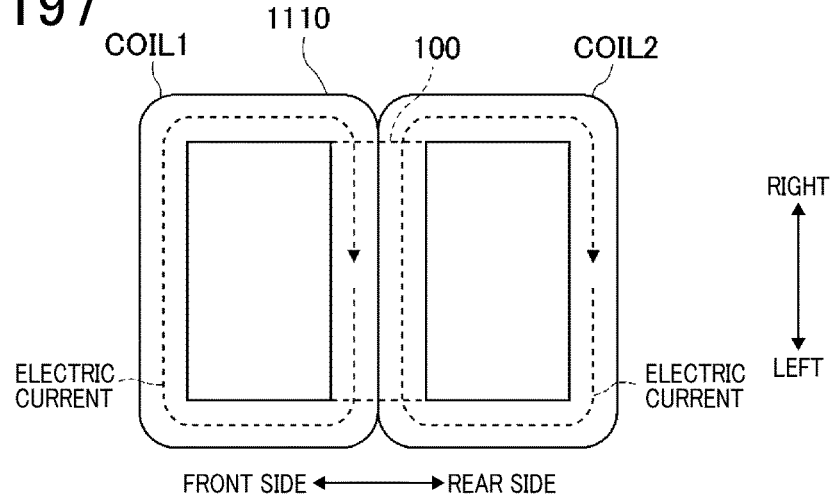

FIG. 197 is a diagram for explaining current flow in the inductor coil generated from magnetic flux in the power transmission side pad.

Figure 198:
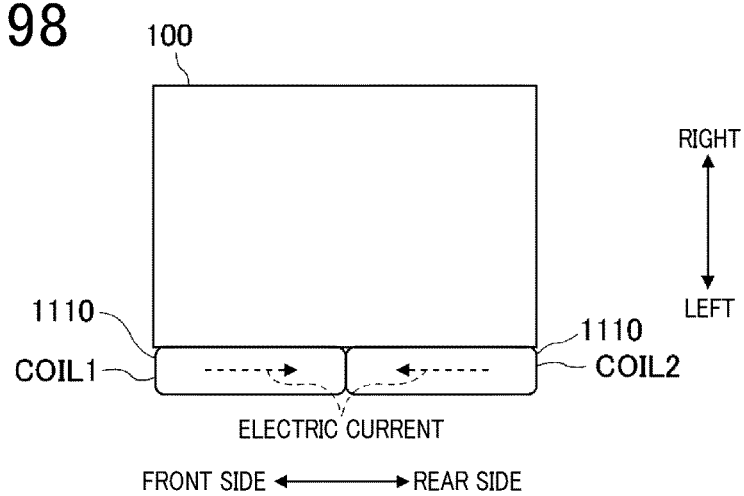

FIG. 198 is a diagram corresponding to FIG. 132 for explaining current flow in an inductor coil of a contactless power supply system according to a thirty-first embodiment.

Figure 199:
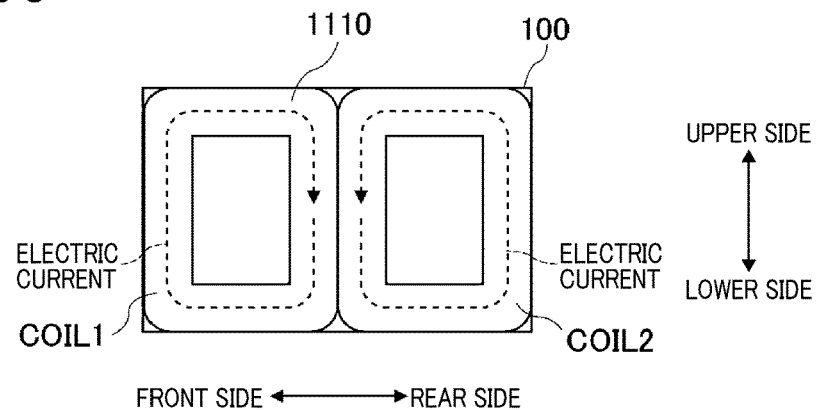

FIG. 199 is a diagram corresponding to FIG. 133 for explaining current flow in the inductor coil.

Figure 200:
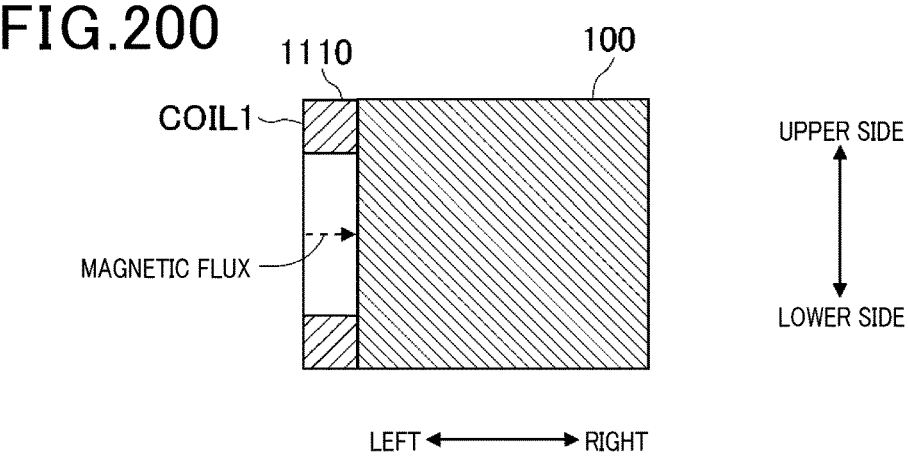

FIG. 200 is a diagram corresponding to FIG. 134 for explaining magnetic flux flow in the inductor coil.

Figure 201:
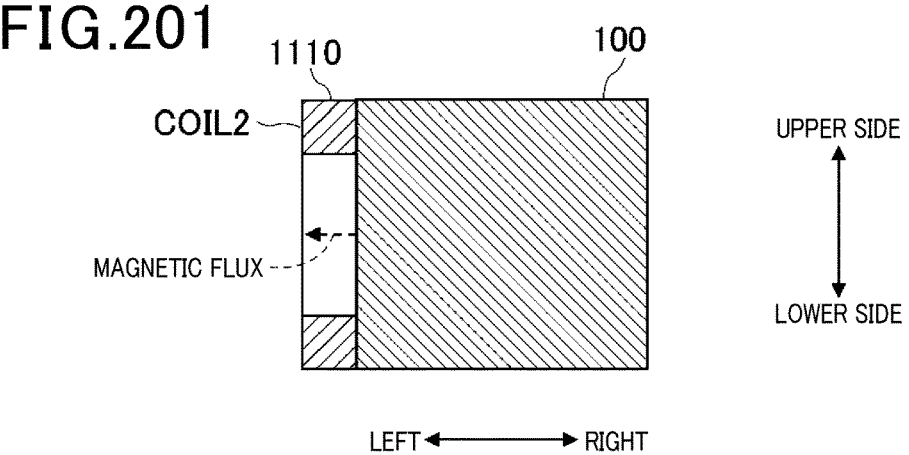

FIG. 201 is a diagram corresponding to FIG. 135 for explaining magnetic flux flow in the inductor coil.

Figure 202:
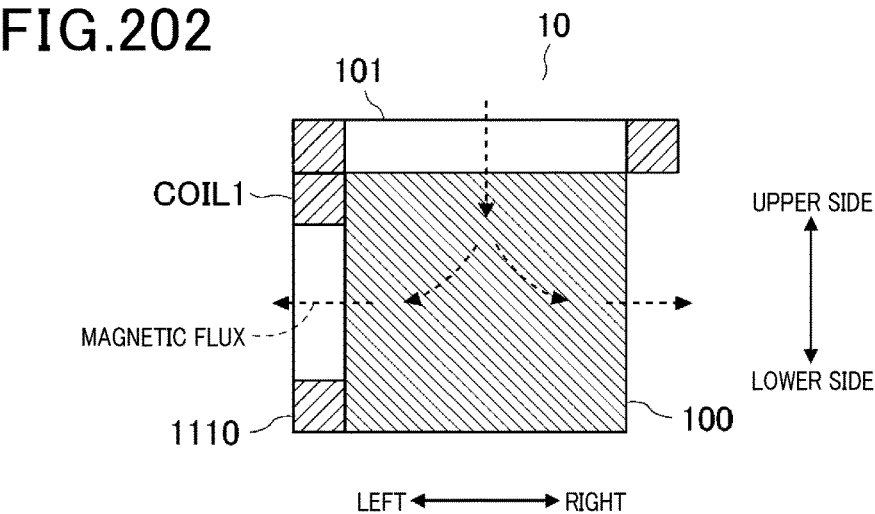

FIG. 202 is a diagram for explaining magnetic flux flow in a power transmission side pad and the inductor coil.

Figure 203:
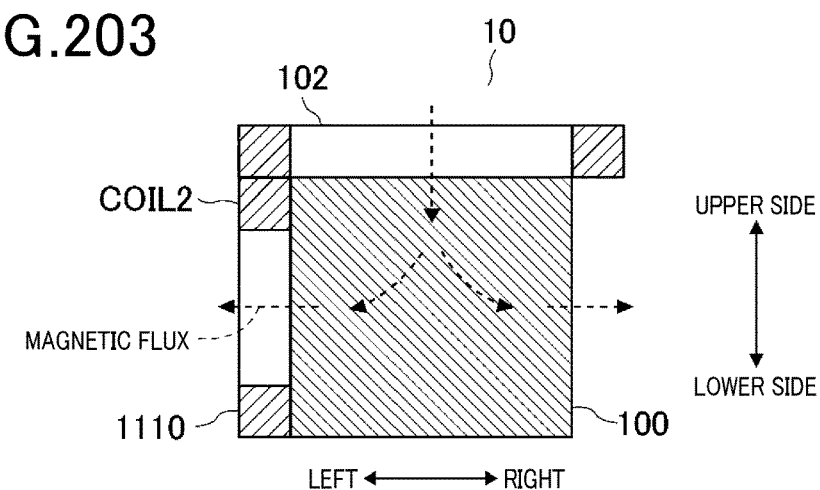

FIG. 203 is a diagram for explaining magnetic flux flow in the power transmission side pad and the inductor coil.

Figure 204:
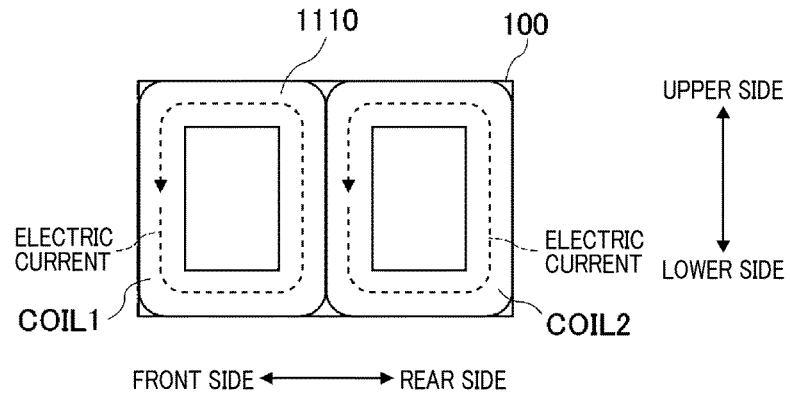

FIG. 204 is a diagram for explaining current flow in the inductor coil generated from magnetic flux in the power transmission side pad.

Figure 205:
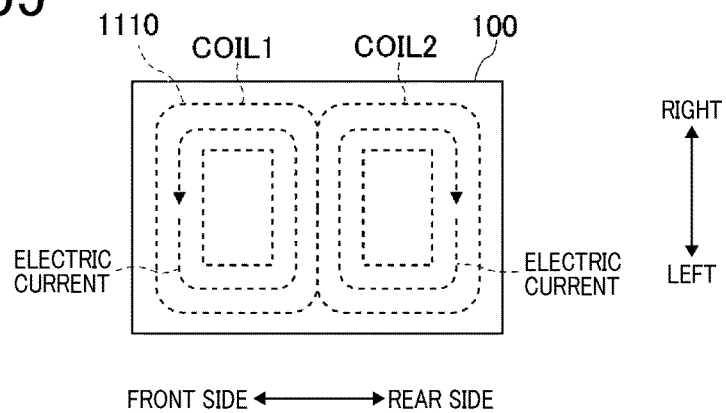

FIG. 205 is a diagram corresponding to FIG. 168 for explaining current flow in an inductor coil of a contactless power supply system according to a thirty-second embodiment.

Figure 206:
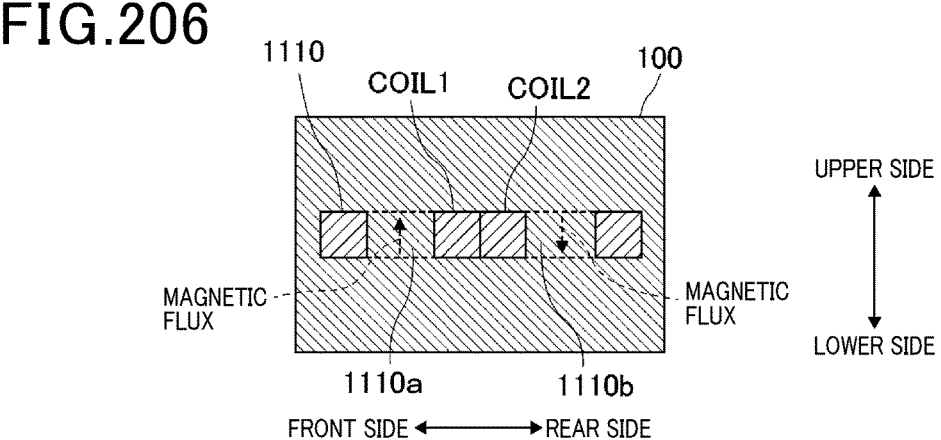

FIG. 206 is a diagram corresponding to FIG. 169 for explaining magnetic flux flow in the inductor coil.

Figure 207:
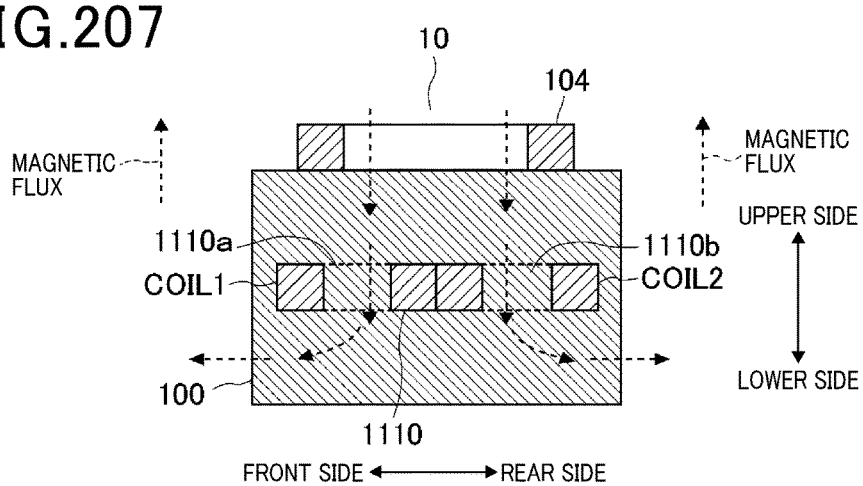

FIG. 207 is a diagram for explaining magnetic flux flow in a power transmission side pad and the inductor coil.

Figure 208:
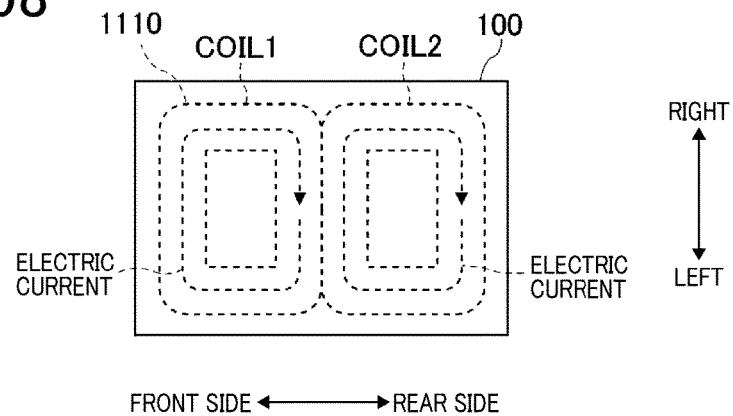

FIG. 208 is a diagram for explaining current flow in the inductor coil generated from magnetic flux in the power transmission side pad.

Figure 209:
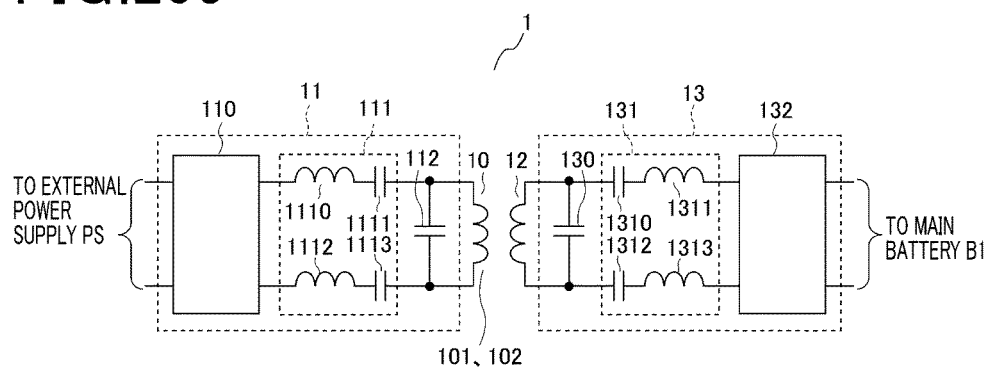

FIG. 209 is a circuit diagram of a power transmission circuit and a power reception circuit of a contactless power supply system according to a thirty-third embodiment.

Figure 210:
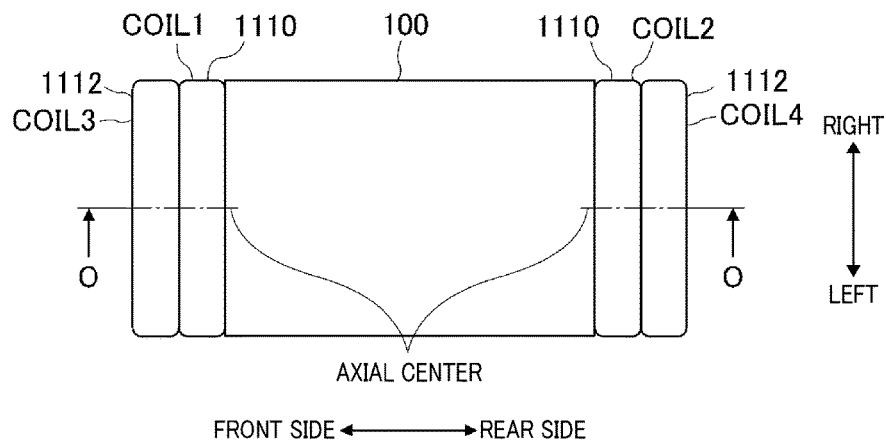

FIG. 210 is a top view of a core for explaining the layout of inductor coils.

Figure 211:
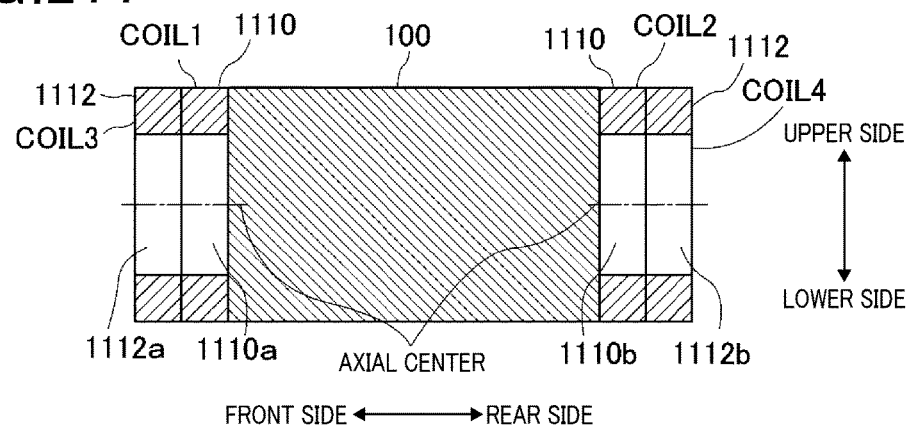

FIG. 211 is a cross-sectional view taken along the line O-O of FIG. 210.

Figure 212:
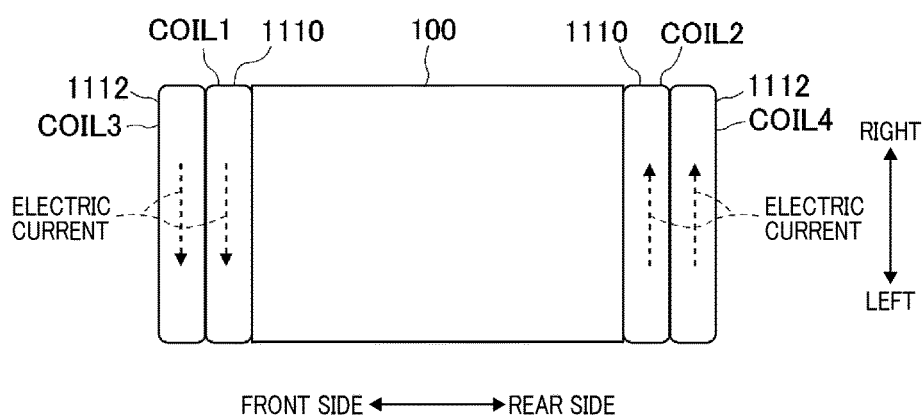

FIG. 212 is a diagram corresponding to FIG. 210 for explaining current flow in the inductor coils.

Figure 213:
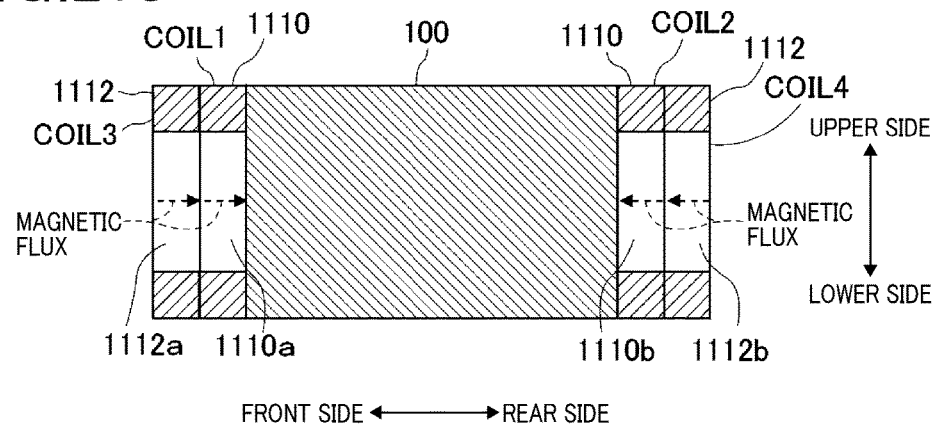

FIG. 213 is a diagram corresponding to FIG. 211 for explaining magnetic flux flow in the inductor coils.

Figure 214:
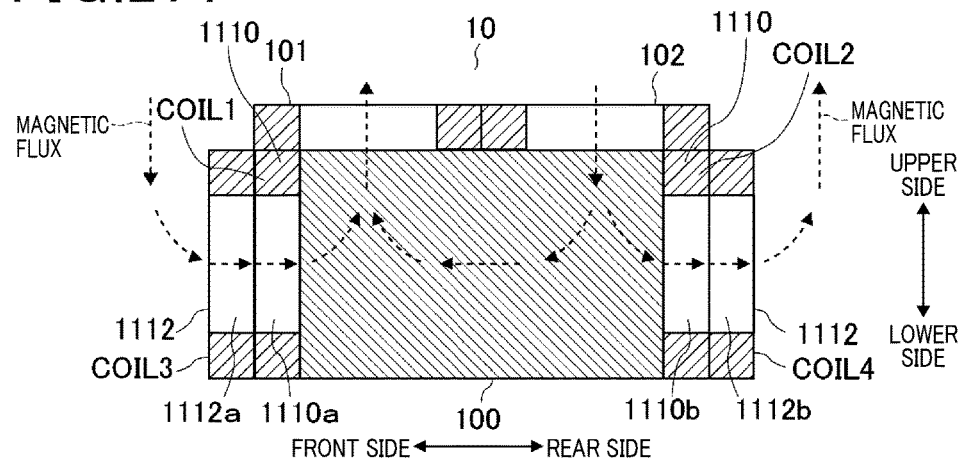

FIG. 214 is a diagram for explaining magnetic flux flow in a power transmission side pad and the inductor coils.

Figure 215:
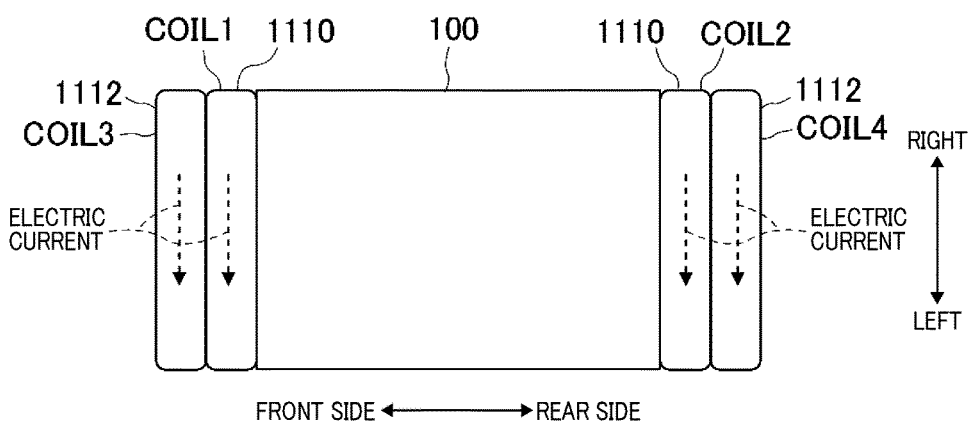

FIG. 215 is a diagram for explaining current flow in the inductor coils generated from magnetic flux in the power transmission side pad.

Figure 216:
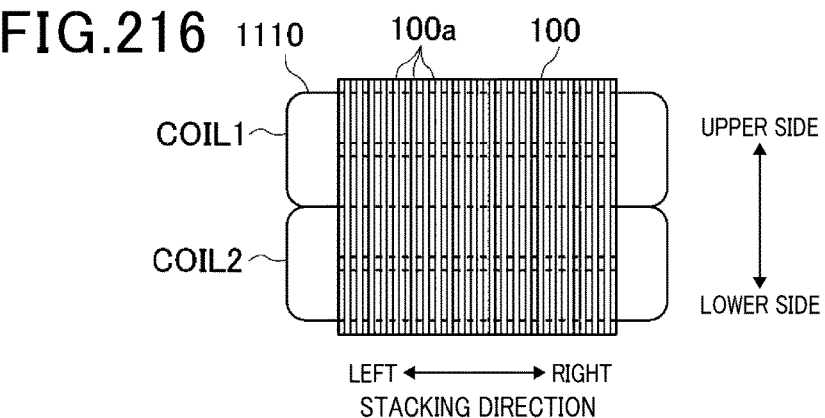

FIG. 216 is a top view of the core for explaining a modification of the core and the inductor coil.

DETAILED DESCRIPTION OF THE PREFERRED EMBODIMENTS

Next, a contactless power supply system according to the present disclosure will be described in detail based on embodiments. The present embodiment shows an example in which the contactless power supply system according to the present disclosure is applied to a contactless power supply system that transmits electric power to a main battery installed in an electric vehicle or a hybrid vehicle in a contactless manner.

First Embodiment

First, referring to FIGS. 1 to 10, a configuration of a contactless power supply system according to a first embodiment will be described. In the drawings, the longitudinal direction, the lateral direction, and the vertical direction indicate the directions relative to a vehicle.

Figure 1:
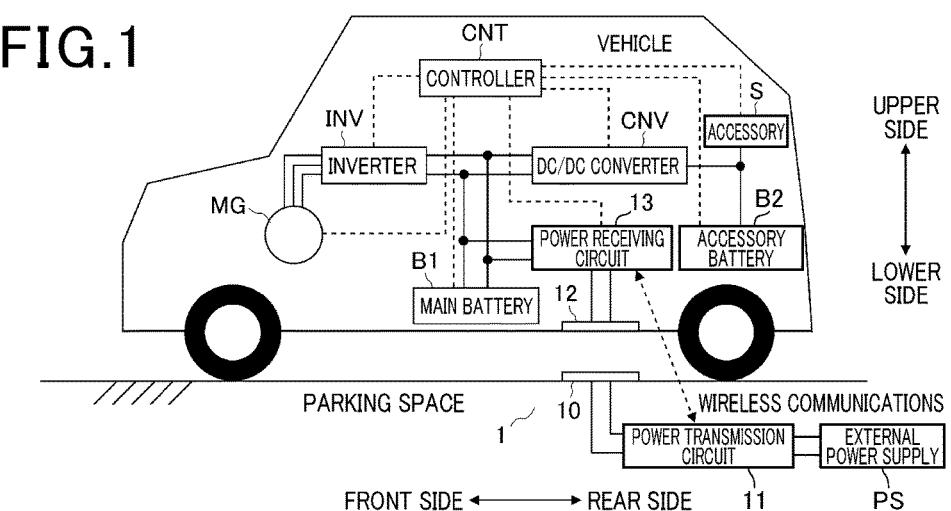
FIG. 1 is a circuit diagram of a contactless power supply system according to the present disclosure.

As shown in FIG. 1, an electric vehicle or a hybrid vehicle includes a motor generator MG, a main battery B1, an inverter circuit INV, an accessory S, an accessory battery B2, a DC/DC converter circuit CNV, and a controller CNT.

The motor generator MG operates as a motor to generate driving force for running a vehicle, being supplied with a three-phase alternating current. In decelerating a vehicle, the motor generator MG also operates as a generator to generate a three-phase alternating current, being rotated by external driving force.

The main battery B1 is a chargeable and dischargeable power supply that outputs a direct current high voltage.

The inverter circuit INV converts a direct current outputted from the main battery B1 into a three-phase alternating current, for supply to the motor generator MG when the motor generator MG operates as a motor. The inverter circuit INV also converts a three-phase alternating current outputted from the motor generator MG into a direct current, for supply to the main battery B1 when the motor generator MG operates as a generator.

The accessory S represents peripheral devices, such as wiper devices and an electric power steering device, which operate with a supply of direct current low voltage thereto.

The accessory battery B2 is a chargeable and dischargeable power supply that outputs a direct current low voltage.

The DC/DC converter circuit CNV converts a direct current high voltage outputted from the main battery B1 into a direct current low voltage, for supply to the accessory battery B2 and the accessory S.

The controller CNT controls the inverter circuit INV, the DC/DC converter circuit CNV, and the accessory S on the basis of information about the main battery B1, the accessory battery B2, and the motor generator MG.

A contactless power supply system 1 transmits electric power from an external power supply PS set up outside the vehicle to the main battery B1 installed in the vehicle in a contactless manner to charge the main battery B1. The contactless power supply system 1 includes a power transmission side pad 10 (power supply pad), a power transmission circuit 11, a power reception side pad 12, and a power reception circuit 13.

Figure 2:
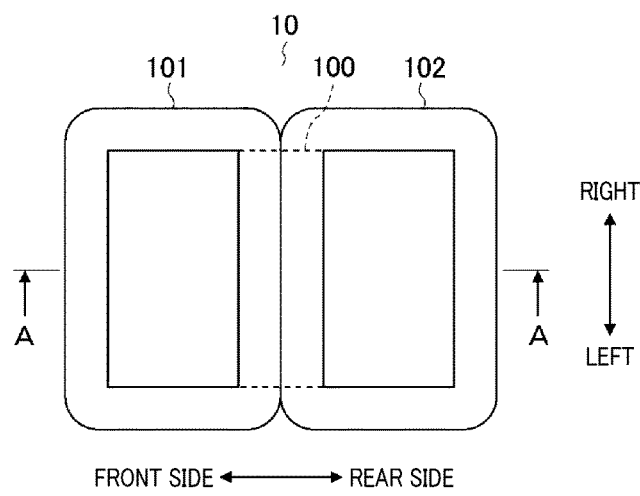
FIG. 2 is a top view of a power transmission side pad.
Figure 3:
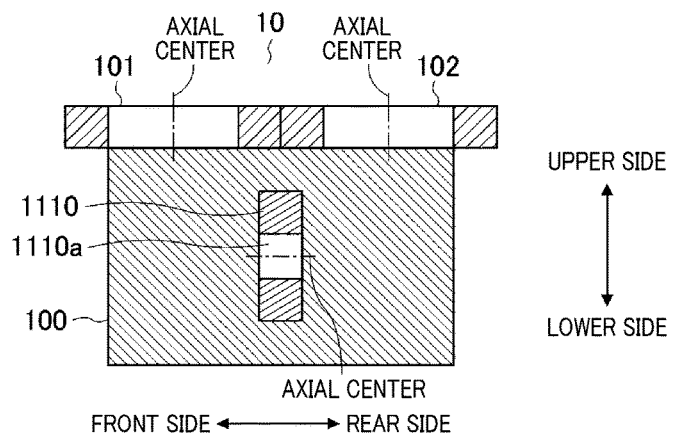
FIG. 3 is a cross-sectional view taken along the line A-A of FIG. 2.

The power transmission side pad 10 is set up at a predetermined position on the ground surface inside a parking space. The ground surface faces the power reception side pad 12 installed at the bottom part of the vehicle when the vehicle is parked inside the parking space. The pad 10 generates magnetic flux by electric current being passed therethrough. As shown in FIGS. 2 and 3, the power transmission side pad 10 includes a core 100 (power supply core) and coils 101 and 102 (power supply coils).

The core 100 is formed of a magnetic material and is in a rectangular parallelepiped shape configuring a path circuit. Specifically, the core 100 is formed of ferrite or a dust core.

The coils 101 and 102 are each in a substantially rectangular annular shape configured of a wound conductor wire to generate magnetic flux by current being passed therethrough. The coils 101 and 102 are disposed adjacent to each other in the longitudinal direction on the top surface of the core 100, with their axial center directions being each aligned with the vertical direction, and use the core 100 as a magnetic path. The axial center direction of each of the coils 101 and 102 is a direction normal to the inner plane surrounded by the annular coil 101 or 102, the normal direction passing through the axial center of each of the annular coils 101 and 102. The axial center direction passes through the center of gravity of each of the annular coils 101 and 102. As depicted by the arrows in FIG. 4, when current is passed through the coils 101 and 102, as depicted by the arrows in FIG. 5, magnetic flux is generated. When current is passed in the reverse direction, magnetic flux of reverse direction is generated.

Figure 6:
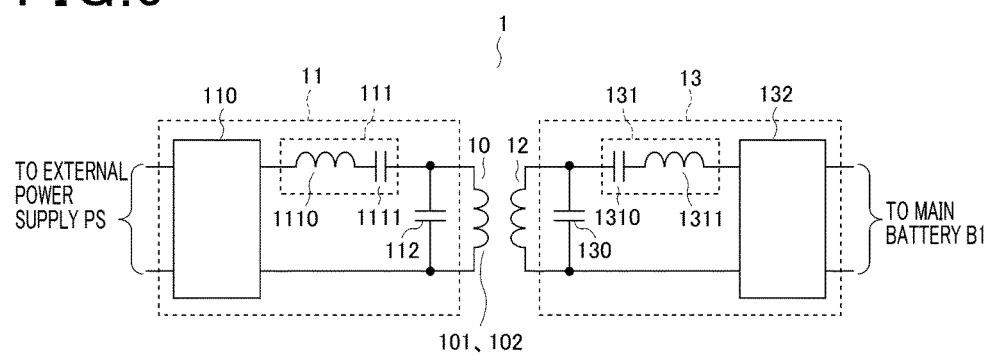
FIG. 6 is a circuit diagram of a power transmission circuit and a power reception circuit illustrated in FIG. 1.

The power transmission circuit 11 shown in FIG. 1 transmits and receives information to/from the power reception circuit 13 by radio communication, and converts the output of the external power supply PS into high-frequency alternating current on the basis of the received information, for supply to the power transmission side pad 10. As shown in FIG. 6, the power transmission circuit 11 includes a power conversion circuit 110, a filter circuit 111, and a resonance capacitor 112, and is disposed outside the vehicle.

The power conversion circuit 110 converts the output of the external power supply PS into high-frequency alternating current and outputs the alternating current. The input terminal of the power conversion circuit 110 is connected to the external power supply PS, and the output terminal thereof is connected to the filter circuit 111 and the power transmission side pad 10.

The filter circuit 111 removes predetermined frequency components included in the alternating current supplied from the power conversion circuit 110. The filter circuit 111 includes an inductor coil 1110 and a capacitor 1111.

Figure 7:
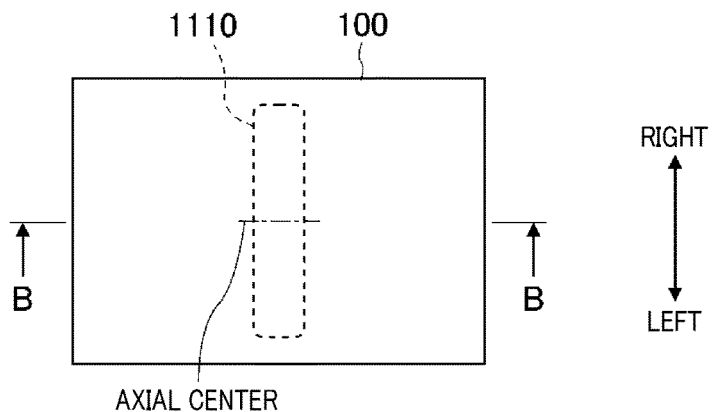
FIG. 7 is a top view of a core of the power transmission side pad for explaining the layout of an inductor coil.
Figure 8:
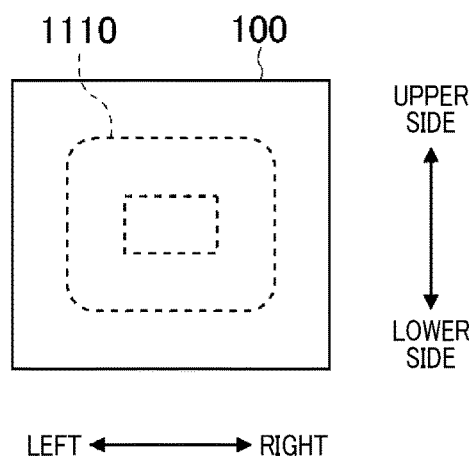
FIG. 8 is a rear side view of the core of the power transmission side pad for explaining the layout of the inductor coil.
Figure 9:
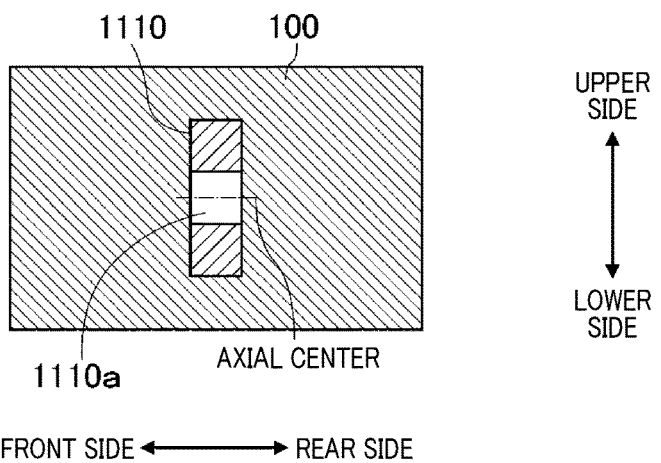
FIG. 9 is a cross-sectional view taken along the line B-B of FIG. 7.

As shown in FIGS. 7 to 9, the inductor coil 1110 is an element in a substantially rectangular annular shape configured of a wound conductor wire. The inductor coil 1110 is provided to the core 100 of the power transmission side pad 10 and uses the core 100 as a magnetic path. The inductor coil 1110 is provided in such a manner that the coupling coefficient of the inductor coil 1110 to the coils 101 and 102 of the power transmission side pad 10 is substantially zero. The coupling coefficient being substantially zero refers to that the coupling coefficient is in an allowable range of from zero, inclusive, to a value approximate to zero. The inductor coil 1110 is buried near the center part of the core 100 in terms of the longitudinal direction, the lateral direction, and the vertical direction, with its axial center direction being aligned with the longitudinal direction. The inductor coil 1110 is configured in such a manner that the magnetic permeability of an axial center part 1110a in a quadrangular prism shape is lower than the magnetic permeability of the core 100. Specifically, the axial center part 1110a is configured of an air layer. The axial center direction is normal to the inner plane surrounded by the annular inductor coil 1110, the normal direction passing through the axis of the annular inductor coil 1110. The axial center direction passes through the center of gravity of the annular inductor coil 1110. The axial center part 1110a is an inner part surrounded by the annular inductor coil 1110 and a columnar part extending in the axial center direction.

Figure 4:
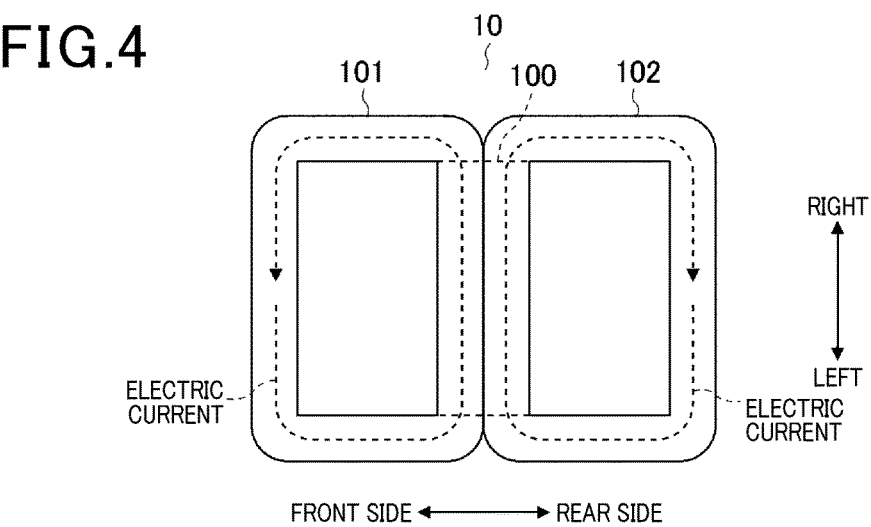
FIG. 4 is a diagram corresponding to FIG. 2 for explaining current flow in the power transmission side pad.
Figure 5:
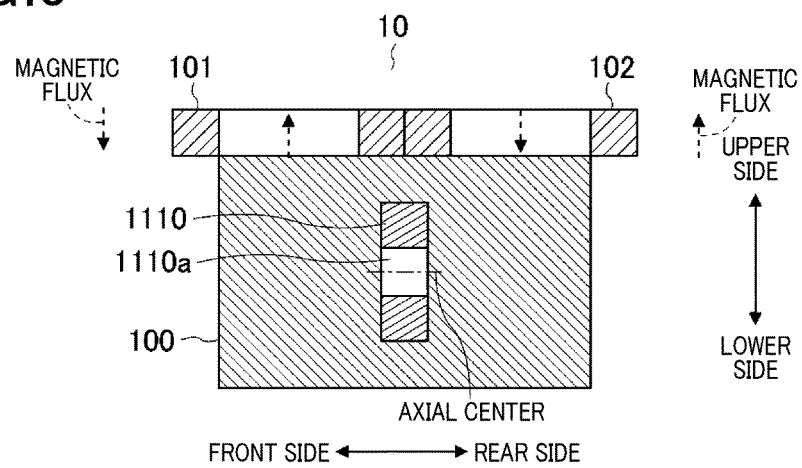
FIG. 5 is a diagram corresponding to FIG. 3 for explaining magnetic flux flow in the power transmission side pad.
Figure 10:
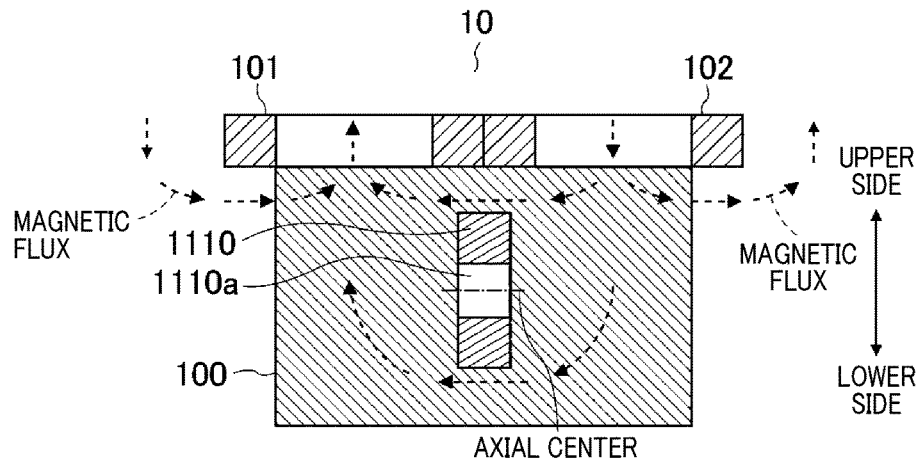
FIG. 10 is a diagram for explaining magnetic flux flow in the power transmission side pad and the inductor coil.

Thus, when current is passed through the coils 101 and 102 as depicted by the arrows in FIG. 4 and magnetic flux is generated as depicted by the arrows in FIG. 5, the magnetic flux flows through and around the core 100 as shown in FIG. 10. Thus, the magnetic flux hardly passes through the axial center part 1110a of the inductor coil 1110. In other words, the magnetic flux hardly interlinks with the inductor coil 1110. Accordingly, the influence of the magnetic fluxes generated from the coils 101 and 102 can be reduced as much as possible.

As shown in FIG. 6, the inductor coil 1110 is serially connected to the capacitor 1111. One end of the inductor coil 1110 is connected to the output terminal of the power conversion circuit 110. One end of the capacitor 1111 is connected to the power transmission side pad 10.

The resonance capacitor 112 serves as a circuit that configures a resonant circuit together with the coils 101 and 102 of the power transmission side pad 10. The resonance capacitor 112 is connected in parallel to the power transmission side pad 10.

The power reception side pad 12 illustrated in FIG. 1 is installed in the bottom part of the vehicle so as to face the power transmission side pad 10, being vertically spaced apart therefrom when the vehicle is parked in the parking space. The power reception side pad 12 generates an alternating current by electromagnetic induction caused by the interlinkage of alternating magnetic fluxes generated from the power transmission side pad 10. The power reception side pad 12 includes a core and coils. The power reception side pad 12 has the same configuration as that of the power transmission side pad 10, and is disposed upside down.

The power reception circuit 13 transmits and receives information to/from the power transmission circuit 11 by radio communication and converts the alternating current supplied from the power reception side pad 12 into a direct current on the basis of the received information to charge the main battery B1. As shown in FIG. 6, the power reception circuit 13 includes a resonance capacitor 130, a filter circuit 131, and a power conversion circuit 132.

The resonance capacitor 130 configures a resonant circuit together with the coils of the power reception side pad 12. The resonance capacitor 130 is connected in parallel to the power reception side pad 12.

The filter circuit 131 removes predetermined frequency components included in the alternating current supplied from the power reception side pad 12, to which the resonance capacitor 130 is connected. The filter circuit 131 includes capacitors 1310 and 1312, and inductor coils 1311 and 1313.

The inductor coil 1311 has the same configuration as that of the inductor coil 1110, and is provided to the core of the power reception side pad 12 to use the core as a magnetic path. Thus, similarly to the inductor coil 1110, the inductor coil 1311 can reduce the influence of the magnetic fluxes generated from the coils of the power reception side pad 12 as much as possible.

The capacitor 1310 is serially connected to the inductor coil 1311. One end of the capacitor 1310 is connected to the power reception side pad 12. One end of the inductor coil 1311 is connected to the power conversion circuit 132.

The power conversion circuit 132 converts the alternating current supplied through the filter circuit 131 into a direct current, for supply to the main battery B1. The input terminal of the power conversion circuit 132 is connected to the filter circuit 131 and the power reception side pad 12. The output terminal is connected to the main battery B1.

Next, referring to FIGS. 1 to 6, the operation of the contactless power supply system will be described.

As shown in FIG. 1, when the vehicle is parked in the parking space, the power transmission side pad 10 faces the power reception side pad 12, being vertically spaced apart from each other by a predetermined distance. In this state, after a charge start button (not shown) is pressed to instruct the start of charging, the power transmission circuit 11 and the power reception circuit 13 transmit and receive information by radio communication.

The power conversion circuit 110 illustrated in FIG. 6 converts the output of the external power supply PS into high-frequency alternating current and outputs the alternating current. The filter circuit 111 removes predetermined frequency components included in the alternating current supplied from the power conversion circuit 110. The power transmission side pad 10, to which the resonance capacitor 112 is connected, generates alternating magnetic flux by alternating current being supplied via the filter circuit 111.

As depicted by the arrows in FIG. 10, the magnetic fluxes generated from the power transmission side pad 10 flows through and around the core 100. As shown in FIGS. 7 to 9, the inductor coil 1110 is buried in the core 100. As shown in FIG. 9, the axial center part 1110a of the inductor coil 1110 is configured of an air layer. Thus, as shown in FIG. 10, the magnetic flux hardly passes through the axial center part 1110a of the inductor coil 1110. In other words, the magnetic flux hardly interlinks with the inductor coil 1110. Consequently, the influence of the magnetic fluxes generated from the coils 101 and 102 can be reduced as much as possible. Accordingly, the characteristics of the filter circuit 111 can be ensured.

The power reception side pad 12, to which the resonance capacitor 130 is connected, generates an alternating current by electromagnetic induction caused by the interlinkage of the alternating magnetic fluxes generated from the power transmission side pad 10. The filter circuit 131 removes predetermined frequency components included in the alternating current supplied from the power reception side pad 12, to which the resonance capacitor 130 is connected.

The magnetic fluxes generated from the power reception side pad 12 flows through and around the core. However, the inductor coil 1311 has the same configuration as that of the inductor coil 1110. Thus, the magnetic flux hardly interlinks with the inductor coil 1311. Consequently, the influence of the magnetic fluxes generated from the coils of the power reception side pad 12 can be reduced as much as possible. Accordingly, the characteristics of the filter circuit 131 can be ensured.

The power conversion circuit 132 converts the alternating current supplied through the filter circuit 131 into a direct current, for supply to the main battery B1. In this manner, electric power can be transmitted from the external power supply PS to the main battery B1 in a contactless manner to charge the main battery B1.

Next, advantageous effects of the contactless power supply system according to the first embodiment will be described.

According to the first embodiment, the inductor coil 1110 of the filter circuit 11 is provided to the core 100 of the power transmission side pad 10, to which the filter circuit 11 is connected to use the core 100 as a magnetic path. In other words, the inductor coil 1110 uses the core 100 of the power transmission side pad 10 as a core configuring the magnetic path of the inductor coil 1110. Thus, the present embodiment is applicable to a mode in which no transformer is provided. Further, the contactless power supply system 1 can be downsized, compared with the case where an inductor coil having a core is separately provided.

According to the first embodiment, the inductor coil 1110 is provided in such a manner that the coupling coefficient of the inductor coil 1110 to the coils 101 and 102 of the power transmission side pad 10 is substantially zero. Consequently, the influence of the magnetic fluxes generated from the coils 101 and 102 can be reduced as much as possible. Accordingly, the characteristics of the filter circuit 111 can be ensured.

According to the first embodiment, the inductor coil 1110 is buried in the core 100. Thus, the magnetic fluxes generated from the inductor coil 1110 are not easily leaked to the outside of the core 100. In other words, the magnetic fluxes generated from the inductor coil 1110 are hardly interlinked with the coils 101 and 102 disposed on the top surface of the core 100. Consequently, the influence of the magnetic fluxes generated from the inductor coil 1110 can be reduced as much as possible.

According to the first embodiment, the inductor coil 1110 is in a substantially rectangular annular shape, and is configured in such a manner that the magnetic permeability of the axial center part 1110a is lower than the magnetic permeability of the core 100. Thus, when current is passed through the coils 101 and 102 as depicted by the arrows in FIG. 4 and magnetic flux is generated as depicted by the arrows in FIG. 5, the magnetic flux flows through and around the core 100 as depicted by the arrows in FIG. 10. Thus, the magnetic flux hardly passes through the axial center part 1110a of the inductor coil 1110. In other words, the magnetic flux hardly interlinks with the inductor coil 1110. Thus, the coupling coefficient of the inductor coil 1110 to the coils 101 and 102 of the power transmission side pad 10 can reliably be substantially zero.

According to the first embodiment, the axial center part 1110a of the inductor coil 1110 is configured of an air layer. Thus, the magnetic permeability of the axial center part 1110a can be more reliably made lower than the magnetic permeability of the core 100.

Second Embodiment

Next, a contactless power supply system according to a second embodiment will be described. In the contactless power supply system according to the second embodiment, only an inductor coil is disposed differently from the contactless power supply system according to the first embodiment. Other than the inductor coil, the configurations are the same as those of the contactless power supply system according to the first embodiment. Thus, referring to FIGS. 11 to 13, the configuration of only the inductor coil will be described, and description of the operation thereof is omitted. Note that, the same components as those of the first embodiment are designated with the same reference signs to omit duplicate description.

Figure 11:
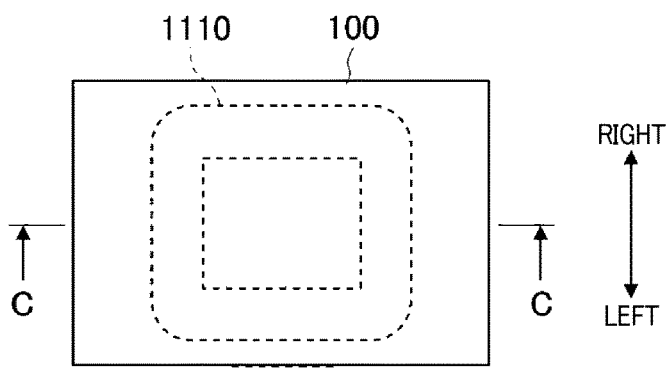
FIG. 11 is a top view of a core for explaining the layout of an inductor coil of a contactless power supply system according to a second embodiment.
Figure 12:
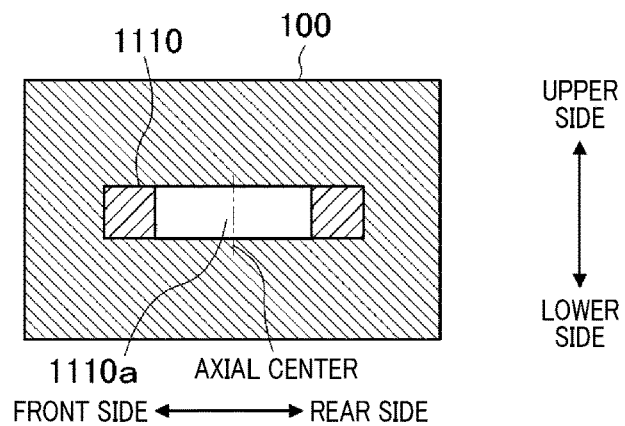
FIG. 12 is a cross-sectional view taken along the line C-C of FIG. 11.
Figure 13:
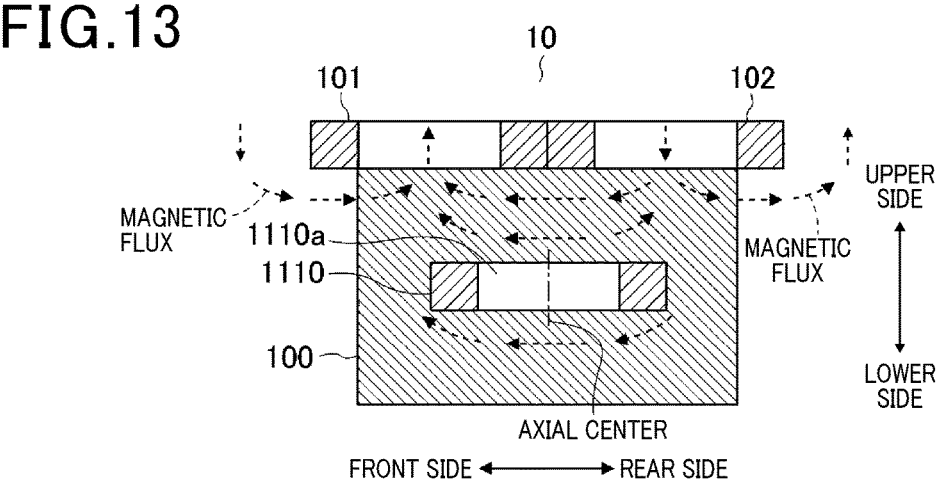
FIG. 13 is a diagram for explaining magnetic flux flow in a power transmission side pad and the inductor coil.

An inductor coil 1110 illustrated in FIGS. 11 and 12 is an element in a substantially rectangular annular shape configured of a wound conductor wire. The inductor coil 1110 is buried near the center part of a core 100 in the longitudinal direction, the lateral direction, and the vertical direction, with its axial center direction being aligned with the vertical direction. An axial center part 1110a in a quadrangular prism shape is configured of an air layer. When current is passed through coils 101 and 102 to generate magnetic flux, as depicted by the arrows in FIG. 13, the magnetic flux flows through and around the core 100. Thus, the magnetic flux hardly passes through the axial center part 1110a of the inductor coil 1110.

Next, the advantageous effects of the contactless power supply system according to the second embodiment will be described. According to the second embodiment, advantageous effects similar to those of the first embodiment can be obtained.

Third Embodiment

Next, a contactless power supply system according to a third embodiment will be described. In the contactless power supply system according to the third embodiment, the configuration of a filter circuit is changed from that of the contactless power supply system according to the first embodiment and the configuration of an inductor coil is changed in association with the change in the filter circuit. Other than the filter circuit and the inductor coil, the configurations are the same as those of the contactless power supply system according to the first embodiment. Thus, referring to FIGS. 14 to 20, only the configurations of the filter circuit and the inductor coil are described, and the description of operations is omitted. Note that, the same components as those of the first embodiment are designated with the same reference numerals to omit duplicate description.

Figure 14:
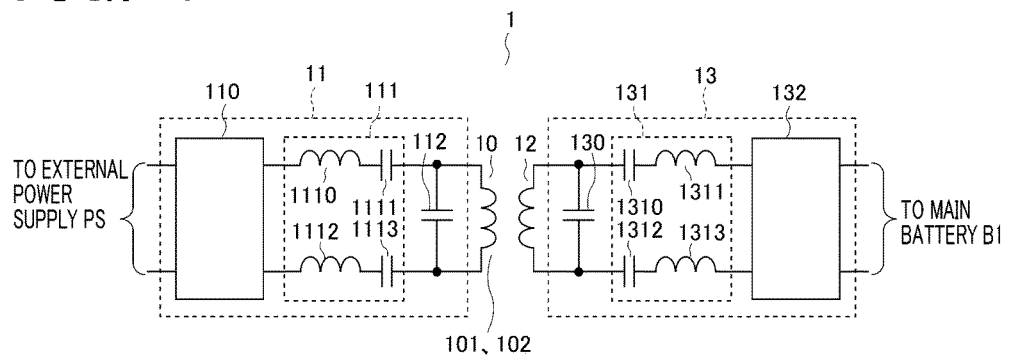
FIG. 14 is a circuit diagram of a power transmission circuit and a power reception circuit of a contactless power supply system according to a third embodiment.

As shown in FIG. 14, a filter circuit 111 includes inductor coils 1110 and 1112 and capacitors 1111 and 1113.

Figure 15:
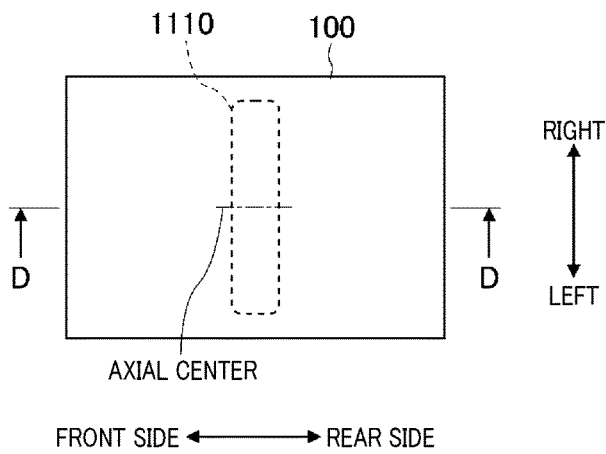
FIG. 15 is a top view of a core for explaining the layout of an inductor coil.
Figure 16:
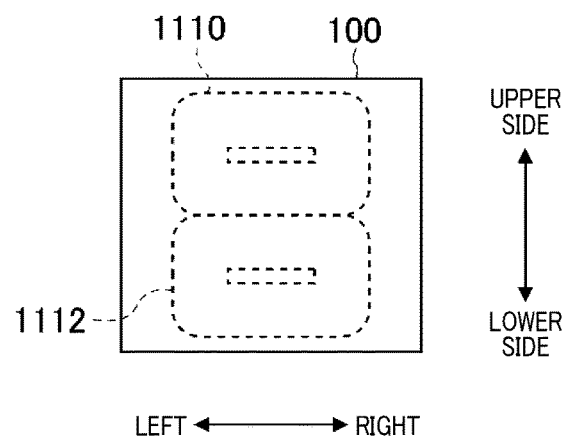
FIG. 16 is a rear side view of the core for explaining the layout of the inductor coils.
Figure 17:
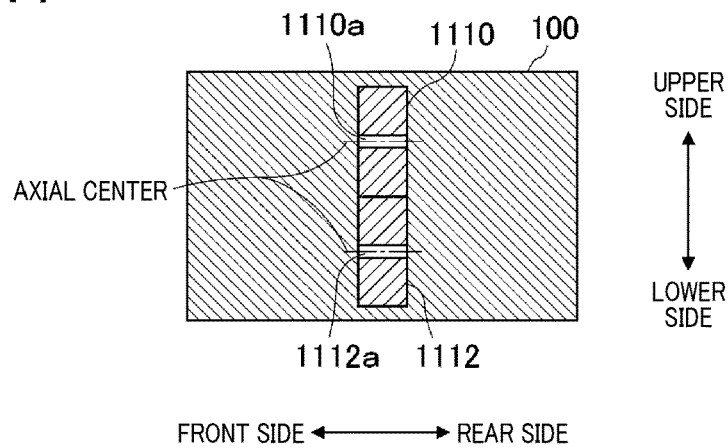
FIG. 17 is a cross-sectional view taken along the line D-D of FIG. 15.

As shown in FIGS. 15 to 17, the inductor coils 1110 and 1112 are in a substantially rectangular annular shape configured of a wound conductor wire. The inductor coils 1110 and 1112 are disposed adjacent to each other in the vertical direction perpendicular to the axial center direction, with their axial center directions being the longitudinal direction, and are buried near the center part of the core 100 in the longitudinal direction, the lateral direction, and the vertical direction. Axial center parts 1110a and 1112a in a quadrangular prism shape are configured of an air layer.

Figure 18:
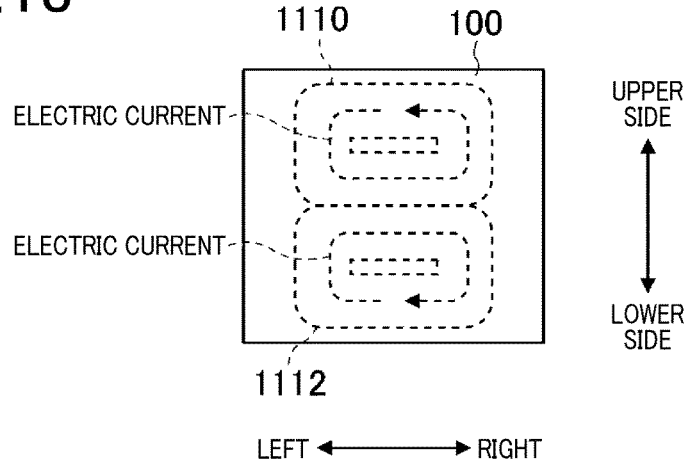
FIG. 18 is a diagram corresponding to FIG. 16 for explaining current flow in the inductor coils.
Figure 19:
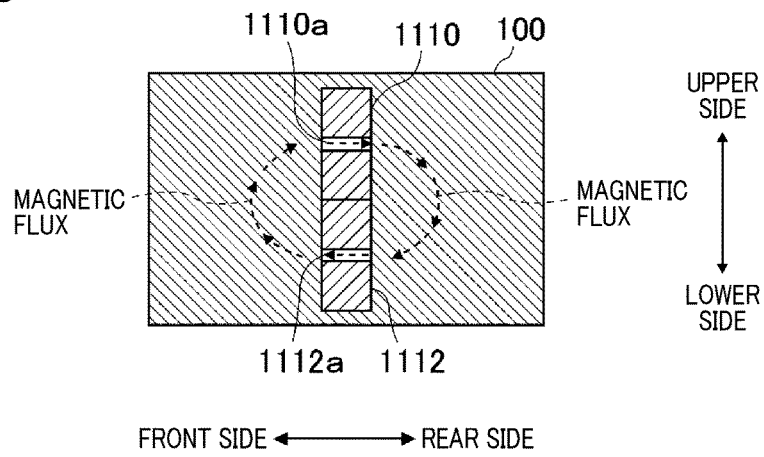
FIG. 19 is a diagram corresponding to FIG. 17 for explaining magnetic flux flow in the inductor coils.
Figure 20:
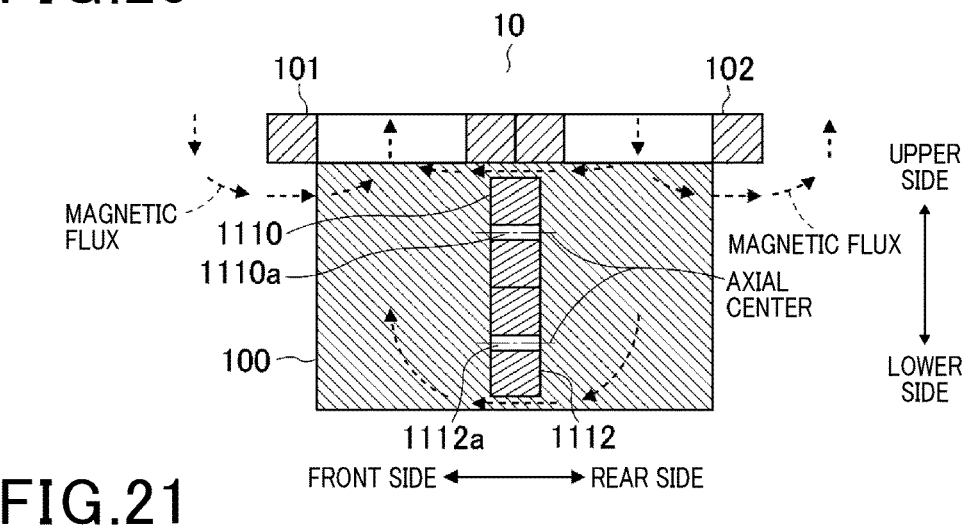
FIG. 20 is a diagram for explaining magnetic flux flow in a power transmission side pad and the inductor coils.

The inductor coils 1110 and 1112 are arranged in such a manner that magnetic fluxes do not cancel each other, which are generated when a current is passed through the filter circuit 111. Specifically, the inductor coils 1110 and 1112 are arranged in such a manner that when current is passed through the filter circuit 111, a magnetic flux at the axial center part 1110a, which is generated from the inductor coil 1110, and a magnetic flux at the axial center part 1112a, which is generated from the inductor coil 1112, flow in the reverse direction. More specifically, the inductor coils 1110 and 1112 are arranged in such a manner that electric currents as depicted by the arrows in FIG. 18 are permitted to flow when current is passed through the filter circuit 111. As shown in FIG. 19, in this case, a magnetic flux at the axial center part 1110a, which is generated from the inductor coil 1110, and a magnetic flux at the axial center part 1112a, which is generated from the inductor coil 1112, flow in the reverse direction. Thus, the magnetic fluxes generated from the inductor coil 1110 and the magnetic fluxes generated from the inductor coil 1112 do not cancel each other. When current is passed through the coils 101 and 102 to generate magnetic flux, as depicted by the arrows in FIG. 20, the magnetic flux flows through and around the core 100. However, the magnetic flux hardly passes through the axial center parts 1110a and 1112a of the inductor coils 1110 and 1112.

Next, the advantageous effects of the contactless power supply system according to the third embodiment will be described. According to the third embodiment, advantageous effects similar to those of the first embodiment can be obtained.

According to the third embodiment, two inductor coils 1110 and 1112 are provided to one core 100. Thus, the contactless power supply system 1 can be further downsized, compared with the case where two inductor coils having a core are separately provided.

According to the third embodiment, the inductor coils 1110 and 1112 are disposed adjacent to each other. Accordingly, increase in the size of the core 100 can be reduced.

According to the third embodiment, the inductor coils 1110 and 1112 are arranged in such a manner that magnetic fluxes do not cancel each other, which are generated when current is passed through the filter circuit 111. Accordingly, the characteristics of the filter circuit 111 can be ensured.

Fourth Embodiment

Next, a contactless power supply system according to a fourth embodiment will be described. In the contactless power supply system according to the fourth embodiment, only inductor coils are disposed differently from the contactless power supply system according to the third embodiment. Other than the inductor coils, the contactless power supply system according to the fourth embodiment is the same as the contactless power supply system according to the third embodiment. Thus, referring to FIGS. 21 to 25, only the configurations of the inductor coils are described, and the description of operations is omitted. Note that the same components as those of the third embodiment are designated with the same reference numerals to omit duplicate description.

Figure 21:
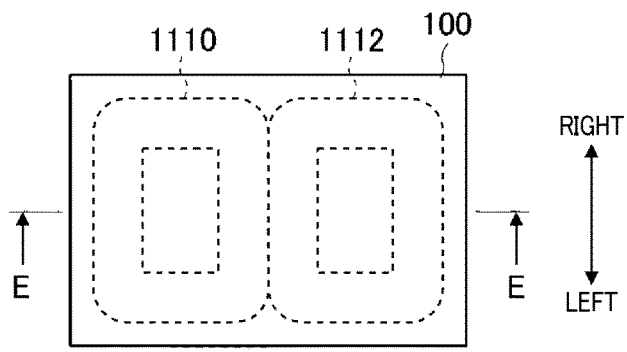
FIG. 21 is a top view of a core for explaining the layout of inductor coils of a contactless power supply system according to a fourth embodiment.
Figure 22:
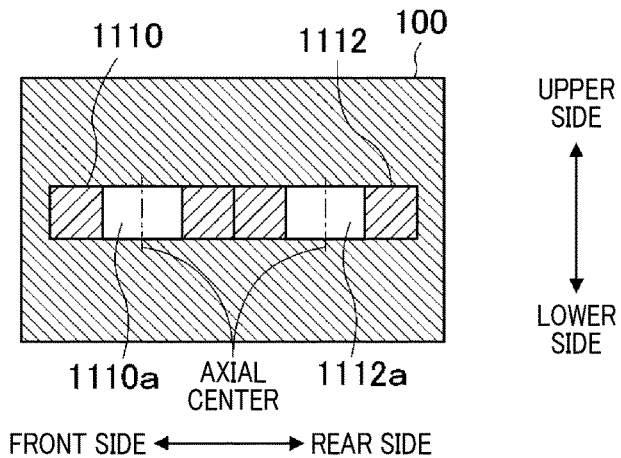
FIG. 22 is a cross-sectional view taken along the line E-E of FIG. 21.

As shown in FIGS. 21 and 22, inductor coils 1110 and 1112 are in a substantially rectangular annular shape configured of a wound conductor wire. The inductor coils 1110 and 1112 are disposed adjacent to each other in the longitudinal direction perpendicular to the axial center direction, with their axial center directions being the vertical direction, and are buried near the center part of a core 100 in the longitudinal direction, the lateral direction, and the vertical direction. Axial center parts 1110*a* and 1112*a* in a quadrangular prism shape are configured of an air layer.

Figure 23:
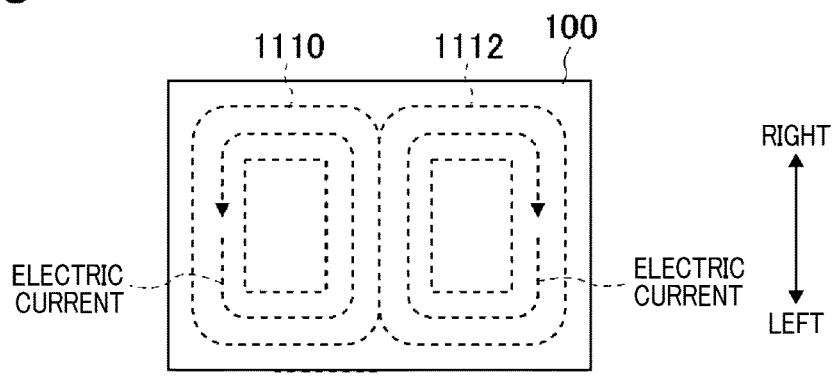
FIG. 23 is a diagram corresponding to FIG. 21 for explaining current flow in the inductor coils.
Figure 24:
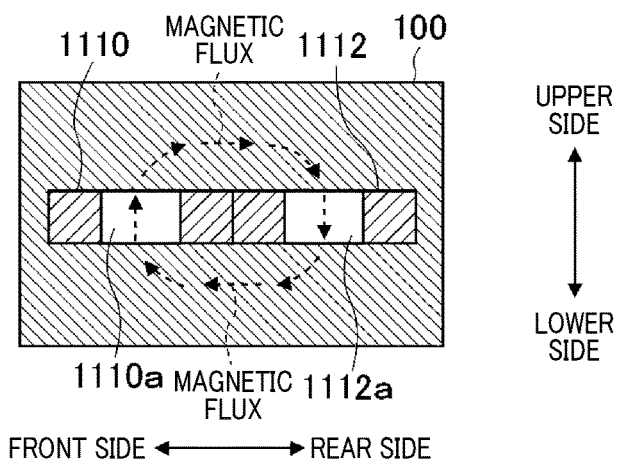
FIG. 24 is a diagram corresponding to FIG. 22 for explaining magnetic flux flow in the inductor coils.
Figure 25:
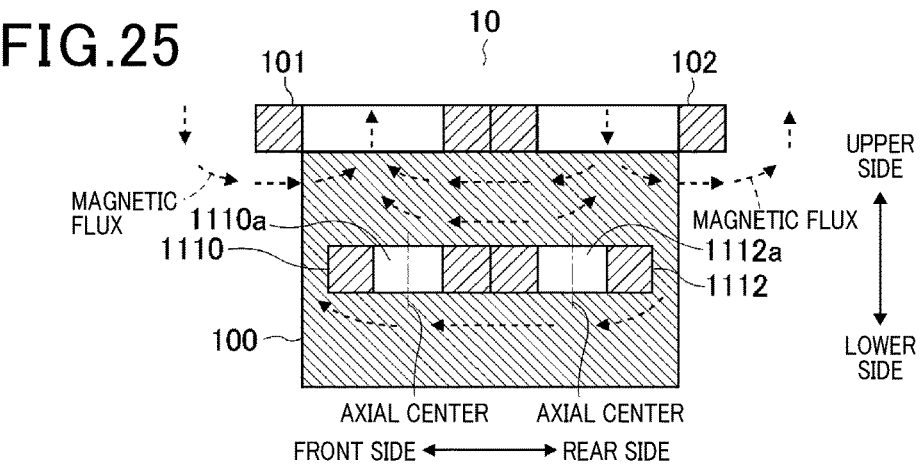
FIG. 25 is a diagram for explaining magnetic flux flow in a power transmission side pad and the inductor coils.

The inductor coils 1110 and 1112 are arranged in such a manner that magnetic fluxes do not cancel each other, which are generated when current is passed through a filter circuit 111. Specifically, the inductor coils 1110 and 1112 are arranged in such a manner that when current is passed through the filter circuit 111, a magnetic flux at the axial center part 1110*a*, which is generated from the inductor coil 1110, and a magnetic flux at the axial center part 1112*a*, which is generated from the inductor coil 1112, flow in the reverse direction. More specifically, the inductor coils 1110 and 1112 are arranged in such a manner that electric currents as depicted by the arrows in FIG. 23 are permitted to flow when current is passed through the filter circuit 111. As shown in FIG. 24, in this case, a magnetic flux at the axial center part 1110*a*, which is generated from the inductor coil 1110, and a magnetic flux at the axial center part 1112*a*, which is generated from the inductor coil 1112, flow in the reverse direction. Thus, the magnetic fluxes generated from the inductor coil 1110 and the magnetic fluxes generated from the inductor coil 1112 do not cancel each other. When current is passed through the coils 101 and 102 to generate magnetic flux, as depicted by the arrows in FIG. 25, the magnetic flux flows through and around the core 100. However, the magnetic flux hardly passes through the axial center parts 1110*a* and 1112*a* of the inductor coils 1110 and 1112.

Next, the advantageous effects of the contactless power supply system according to the fourth embodiment will be described. According to the fourth embodiment, advantageous effects similar to those of the third embodiment can be obtained.

Fifth Embodiment

Next, a contactless power supply system according to a fifth embodiment will be described. In the contactless power supply system according to the fifth embodiment, only the configurations of the coils of a power transmission side pad and a power reception side pad are changed from the contactless power supply system according to the first embodiment. Other than the coils of the power transmission side pad and the power reception side pad, the configurations are the same as those of the contactless power supply system according to the first embodiment. Thus, referring to FIGS. 26 to 31, only the configurations of the coils of the power transmission side pad and the power reception side pad are described, and the description of operations is omitted. Note that, the same components as those of the first embodiment are designated with the same reference numerals to omit duplicate description.

Figure 26:
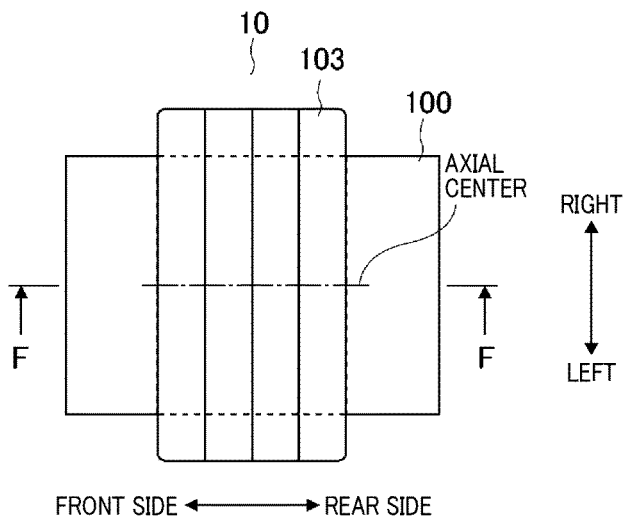
FIG. 26 is a top view of a power transmission side pad of a contactless power supply system according to a fifth embodiment.
Figure 27:
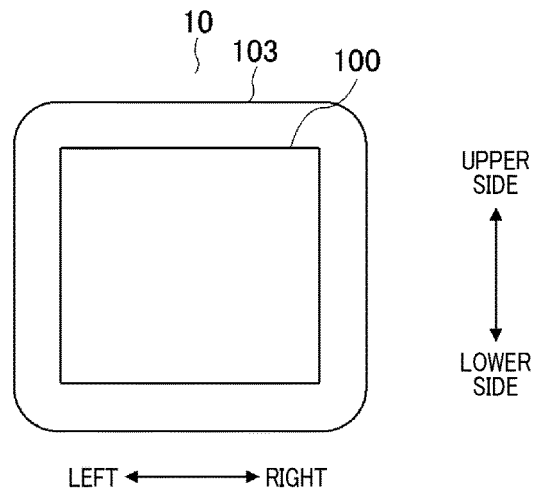
FIG. 27 is a rear side view of the power transmission side pad.
Figure 28:
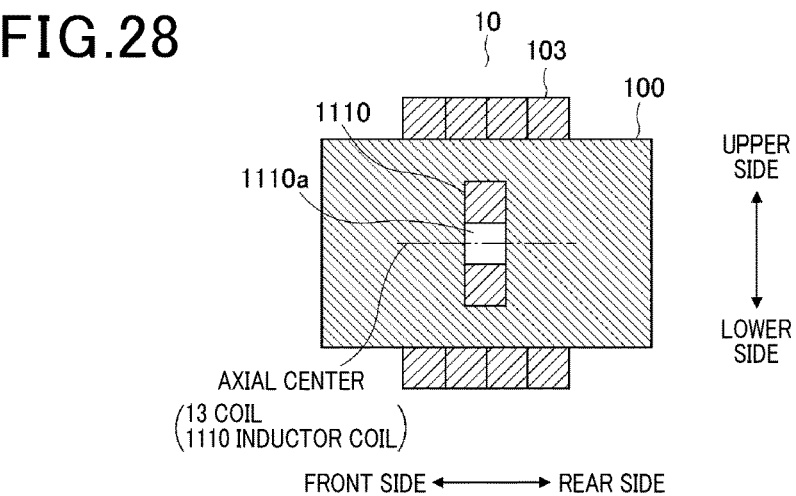
FIG. 28 is a cross-sectional view taken along the line F-F of FIG. 26.
Figure 29:
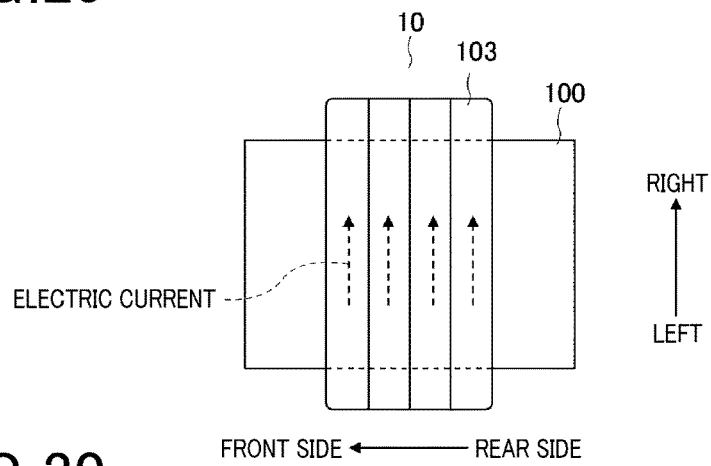
FIG. 29 is a diagram corresponding to FIG. 26 for explaining current flow in the power transmission side pad.
Figure 30:
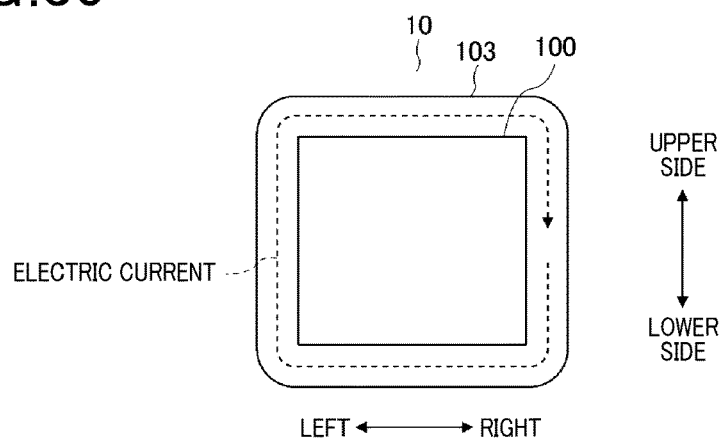
FIG. 30 is a diagram corresponding to FIG. 27 for explaining current flow in the power transmission side pad.
Figure 31:
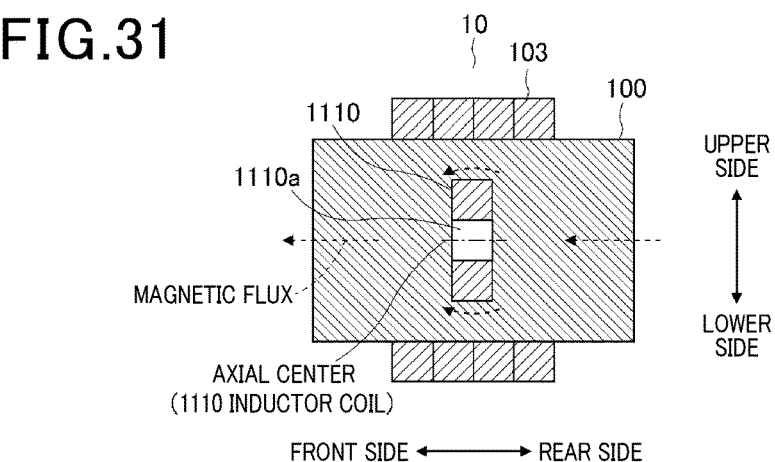
FIG. 31 is a diagram corresponding to FIG. 28 for explaining magnetic flux flow in the power transmission side pad.

As shown in FIGS. 26 to 28, a power transmission side pad 10 includes a core 100 (a power supply core) and coils 103 (power supply coils).

The coil 103 is in a substantially rectangular annular shape configured of a wound conductor wire to generate magnetic flux, with current being passed through the coil. The coil 103 is disposed along the outer circumferential surface of the core 100, with its axial center direction being aligned with the longitudinal direction to use the core 100 as a magnetic path. As depicted by the arrows in FIGS. 29 and 30, when current is passed through the coils 103, magnetic flux is generated as depicted by the arrows in FIG. 31. When current flows in the reverse direction, a magnetic flux in the reverse direction is generated. As depicted by the arrows in FIGS. 29 and 30, when current is passed through the coils 103 to generate magnetic flux, the magnetic flux flows through and around the core 100 as depicted by the arrows in FIG. 31. Thus, the magnetic flux hardly passes through the axial center part 1110*a* of the inductor coil 1110.

A power reception side pad 12 has the same configuration as that of the power transmission side pad 10, and is disposed upside down.

Next, the advantageous effects of the contactless power supply system according to the fifth embodiment will be described. According to the fifth embodiment, advantageous effects similar to those of the first embodiment can be obtained.

Sixth Embodiment

Next, a contactless power supply system according to a sixth embodiment will be described. In the contactless power supply system according to the sixth embodiment, only the configurations of the coils of a power transmission side pad and a power reception side pad are changed from the contactless power supply system according to the first embodiment. Other than the coils of the power transmission side pad and the power reception side pad, the configurations are the same as those of the contactless power supply system according to the first embodiment. Thus, referring to FIGS. 32 to 35, only the configurations of the coils of the power transmission side pad and the power reception side pad are described, and the description of operations is omitted. Note that the same components as those of the first embodiment are designated with the same reference numerals to omit duplicate description.

Figure 32:
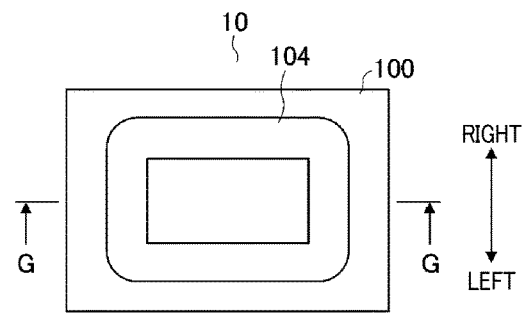
FIG. 32 is a top view of a power transmission side pad of a contactless power supply system according to a sixth embodiment.
Figure 33:
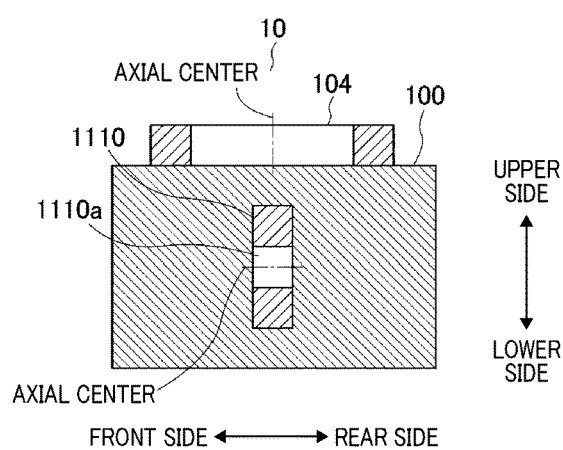
FIG. 33 is a cross-sectional view taken along the line G-G of FIG. 32.
Figure 34:
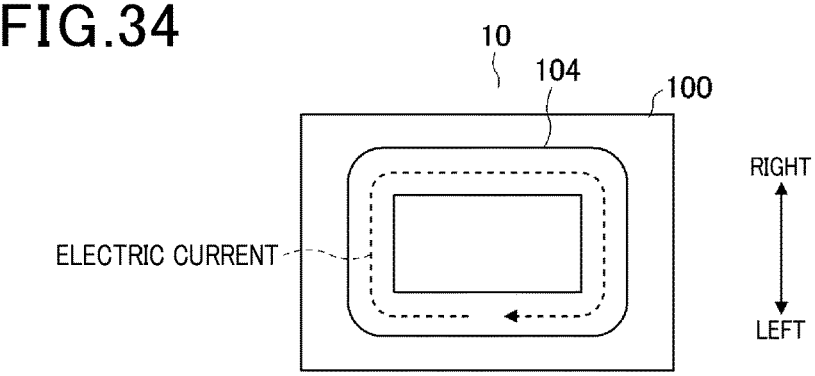
FIG. 34 is a diagram corresponding to FIG. 32 for explaining current flow in the power transmission side pad.
Figure 35:
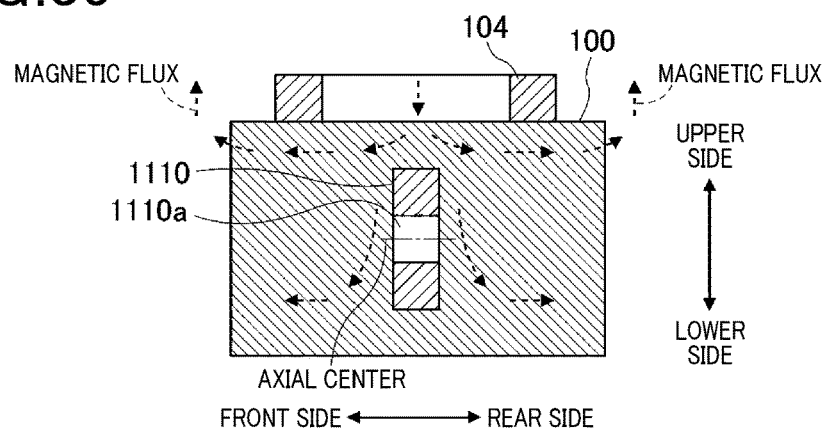
FIG. 35 is a diagram corresponding to FIG. 33 for explaining magnetic flux flow in the power transmission side pad.

As shown in FIGS. 32 and 33, a power transmission side pad 10 includes a core 100 (a power supply core) and a coil 104 (a power supply coil).

The coil 104 is in a substantially rectangular annular shape configured of a wound conductor wire to generate magnetic flux, with current being passed through the coil. The coil 104 is disposed near the center part on the top surface of the core 100 in the longitudinal direction and the lateral direction, with its axial center direction being aligned with the vertical direction to use the core 100 as a magnetic path. As depicted by an arrow in FIG. 34, when current is passed through the coil 104, magnetic flux is generated as depicted by the arrows in FIG. 35. When current flows in the reverse direction, a magnetic flux in the reverse direction is generated. As depicted by the arrow in FIG. 34, when current is passed through the coil 104 to generate magnetic flux, the magnetic flux flows through and around the core 100 as depicted by the arrows in FIG. 35. Thus, the magnetic flux hardly passes through an axial center part 1110*a* of an inductor coil 1110.

A power reception side pad 12 has the same configuration as that of the power transmission side pad 10, and is disposed upside down.

Next, the advantageous effects of the contactless power supply system according to the sixth embodiment will be described. According to the sixth embodiment, advantageous effects similar to those of the first embodiment can be obtained.

Seventh Embodiment

Referring to FIG. 1 and FIGS. 39 to 52, the configuration of a contactless power supply system according to a seventh embodiment will be described. Note that, the longitudinal direction, the lateral direction, and the vertical direction in the drawings show the directions in a vehicle.

Similarly to the first embodiment, the contactless power supply system according to the present embodiment is applied to the vehicle illustrated in FIG. 1, and the basic circuit configuration of the contactless power supply system is the same. Thus, the configuration is omitted, because the configuration is already described in the first embodiment. In the following, differences will be mainly described.

The power transmission side pad 10 illustrated in FIG. 1 is disposed at a predetermined position on the ground surface inside a parking space. At the position, when the vehicle is parked inside the parking space, the power transmission side pad 10 faces the power reception side pad 12 installed in the bottom part of the vehicle and generates magnetic flux when current is passed therethrough. As shown in FIGS. 39 to 42, the power transmission side pad 10 includes a core 100 (a power supply core) and coils 101 and 102 (power supply coils).

The core 100 is a member formed of a magnetic material in a rectangular parallelepiped shape configuring a magnetic path. Specifically, the core 100 is a member formed of ferrite or a dust core.

Figure 43:
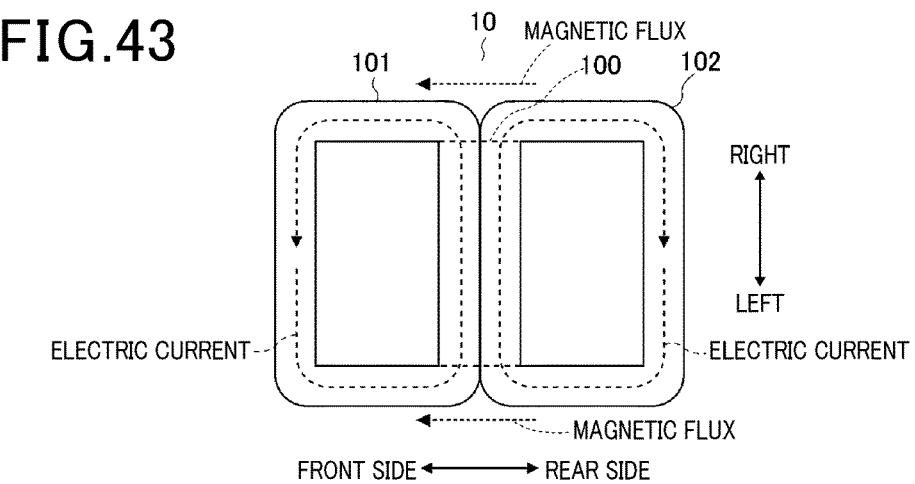
FIG. 43 is a diagram corresponding to FIG. 39 for explaining current flow in the power transmission side pad.

The coils 101 and 102 are in a substantially rectangular annular shape configured of a wound conductor wire to generate magnetic flux, with current being passed through the coils. The coils 101 and 102 are disposed adjacent to each other in the longitudinal direction on the top surface of the core 100, with their axial center directions being aligned with the vertical direction to use the core 100 as a magnetic path. The axial center direction of each of the coils 101 and 102 is a normal direction to the inner plane surrounded by the annular coils 101 and 102, the normal direction passing through the axial center of each of the annular coils 101 and 102. Note that, the axial center direction passes through the center of gravity of the annular coils 101 and 102. As shown in FIG. 43, when current is passed through the coils 101 and 102, magnetic flux is generated as shown in FIGS. 43 to 46. When current flows in the reverse direction, a magnetic flux is generated in the reverse direction.

Figure 47:
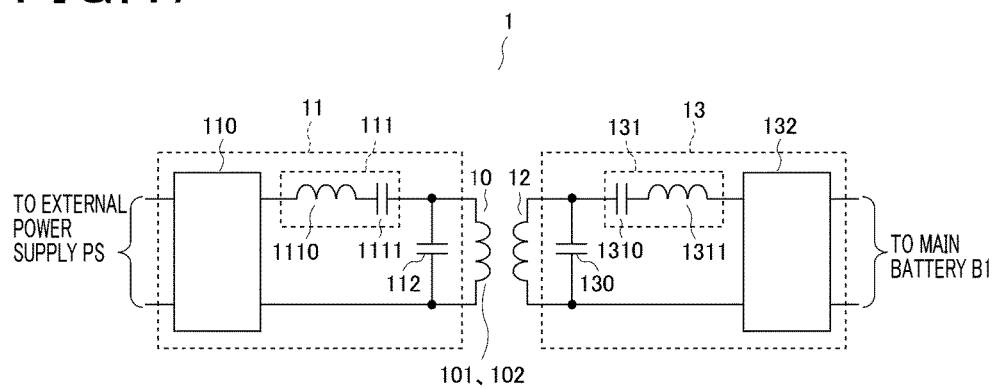
FIG. 47 is a circuit diagram of a power transmission circuit and a power reception circuit illustrated in FIG. 1.

The power transmission circuit 11 illustrated in FIG. 1 transmits and receives information to/from the power reception circuit 13 by radio communication, and converts the output of the external power supply PS into high-frequency alternating current on the basis of the received information, for supply to the power transmission side pad 10. As shown in FIG. 47, a power transmission circuit 11 includes a power conversion circuit 110, a filter circuit 111, and a resonance capacitor 112, and is disposed outside the vehicle.

The power conversion circuit 110 converts the output of the external power supply PS into high-frequency alternating current and outputs the alternating current. The input terminal of the power conversion circuit 110 is connected to the external power supply PS. The output terminal is connected to the filter circuit 111 and the power transmission side pad 10.

The filter circuit 111 removes predetermined frequency components included in the alternating current supplied from the power conversion circuit 110. The filter circuit 111 includes an inductor coil 1110 and a capacitor 1111.

Figure 48:
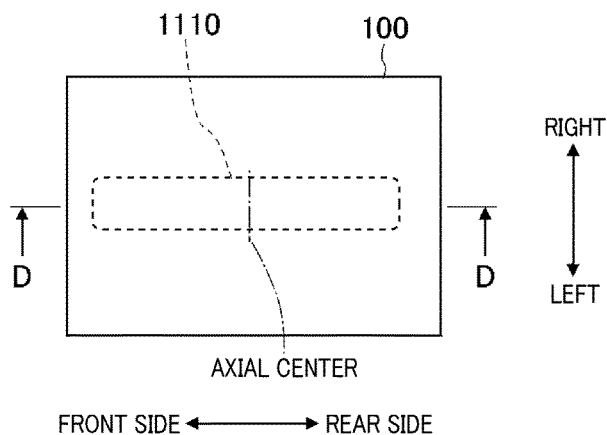
FIG. 48 is a top view of a core for explaining the layout of an inductor coil.
Figure 49:
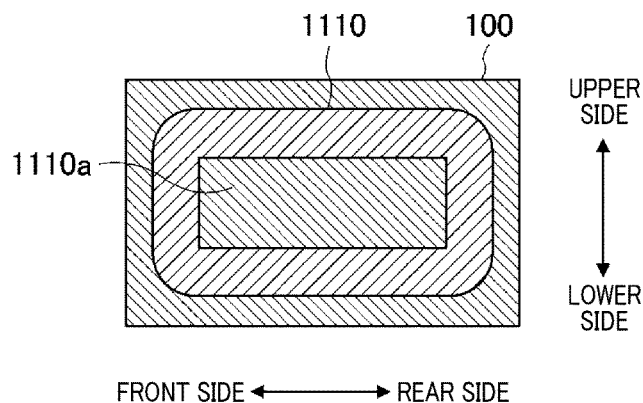
FIG. 49 is a cross-sectional view taken along the line D-D of FIG. 48.

As shown in FIGS. 48 and 49, the inductor coil 1110 is in a substantially rectangular annular shape configured of a wound conductor wire. The inductor coil 1110 is provided to the core 100 of the power transmission side pad 10 to use the core 100 as a magnetic path. The inductor coil 1110 is buried near the center part of the core 100 in the longitudinal direction, the lateral direction, and the vertical direction, with its axial center direction being aligned with the lateral direction. An axial center part 1110a in a nearly quadrangular prism shape of the inductor coil 1110 is configured of the magnetic material of the core 100, not an air layer. The axial center direction is a normal direction to the inner plane surrounded by the annular inductor coil 1110, the normal direction passing through the axis of the annular inductor coil 1110. Note that, the axial center direction passes through the center of gravity of the annular inductor coil 1110. The axial center part 1110a is an inner part surrounded by the annular inductor coil 1110 and a columnar part extending in the axial center direction.

Figure 44:
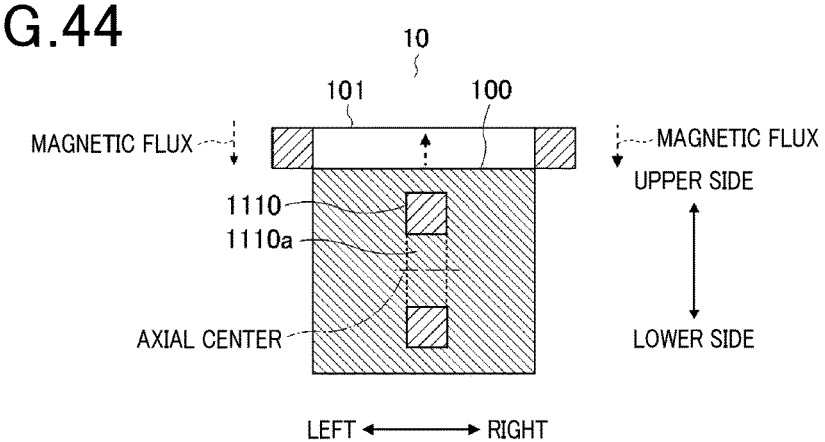
FIG. 44 is a diagram corresponding to FIG. 40 for explaining magnetic flux flow in the power transmission side pad.
Figure 45:
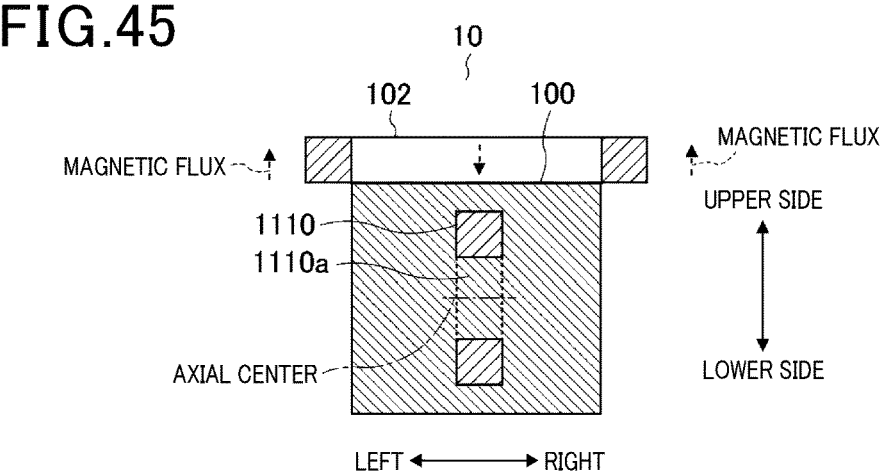
FIG. 45 is a diagram corresponding to FIG. 41 for explaining magnetic flux flow in the power transmission side pad.
Figure 46:
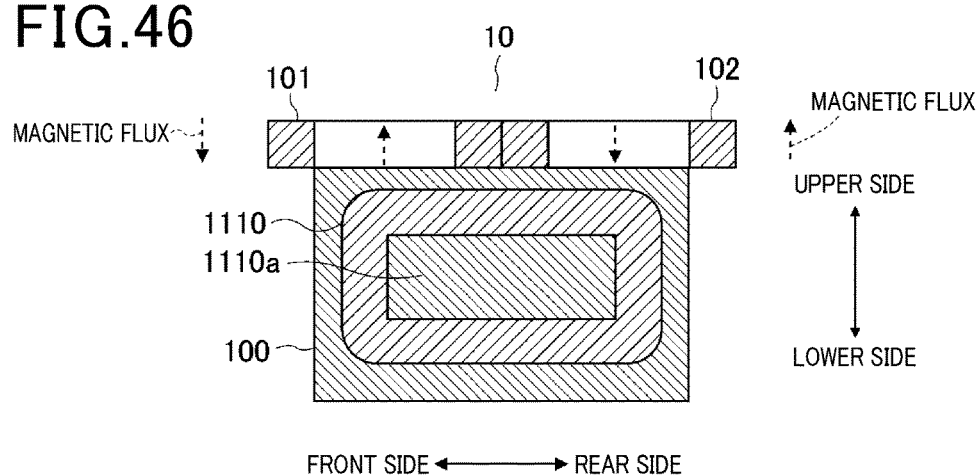
FIG. 46 is a diagram corresponding to FIG. 42 for explaining magnetic flux flow in the power transmission side pad.
Figure 50:
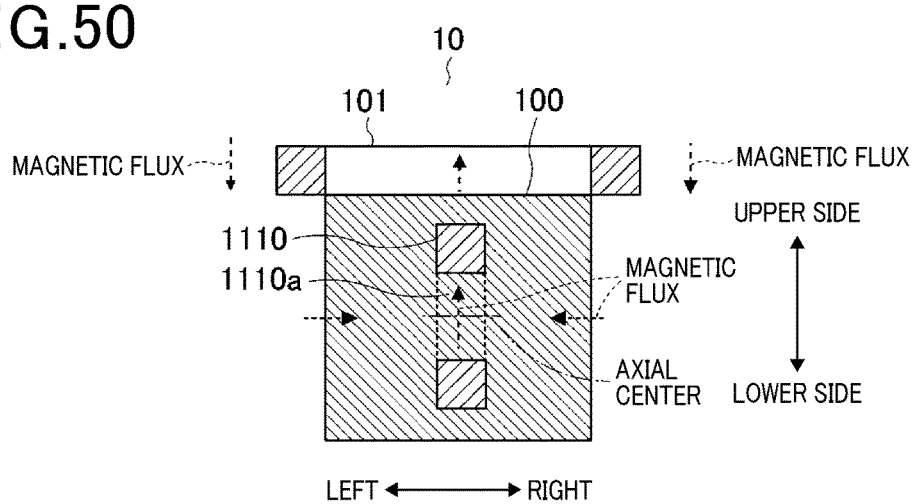
FIG. 50 is a diagram corresponding to FIG. 44 for explaining magnetic flux flow in the power transmission side pad and the inductor coil.
Figure 51:
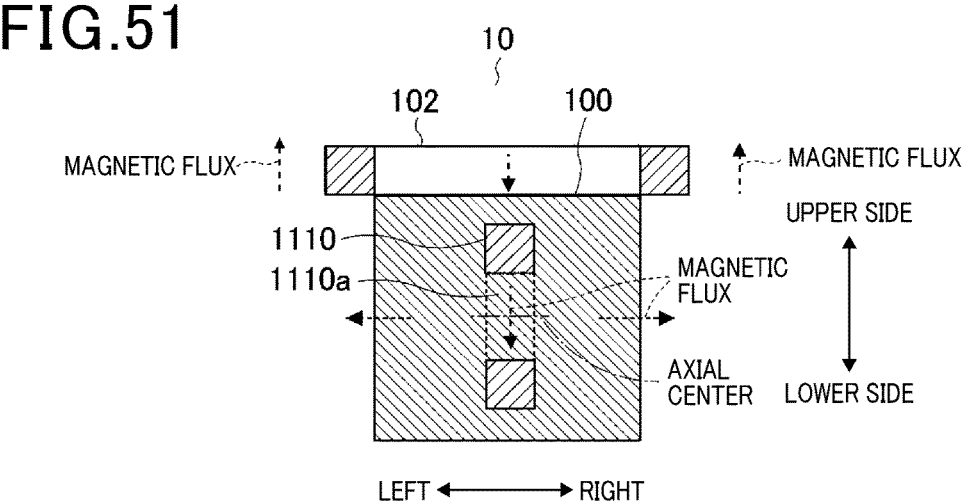
FIG. 51 is a diagram corresponding to FIG. 45 for explaining magnetic flux flow in the power transmission side pad and the inductor coil.
Figure 52:
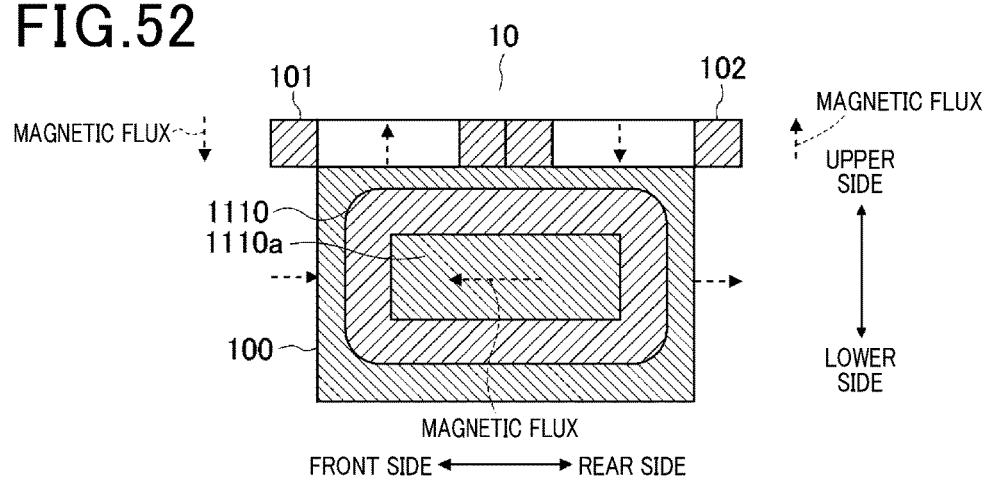
FIG. 52 is a diagram corresponding to FIG. 46 for explaining magnetic flux flow in the power transmission side pad and the inductor coil.

When current is passed through the coils 101 and 102 as shown in FIG. 43 and magnetic flux is generated as shown in FIG. 44 to FIG. 46, magnetic flux is generated inside and around the core 100 as shown in FIGS. 50 to 52.

As shown in FIGS. 48 and 49, the inductor coil 1110 is buried near the center part of the core 100 in the longitudinal direction, the lateral direction, and the vertical direction, with its axial center direction being aligned with the lateral direction. Thus, as shown in FIGS. 50 to 52, the magnetic fluxes generated from the coils 101 and 102 are substantially perpendicular to the axial center direction at the axial center part 1110a of the inductor coil 1110. In other words, the coupling coefficient of the inductor coil 1110 to the coils 101 and 102 is substantially zero. Consequently, even though current is passed through the coils 101 and 102 to generate magnetic flux inside and around the core 100, the magnetic flux hardly interlinks with the inductor coil 1110. Accordingly, the influence of the magnetic fluxes generated from the coils 101 and 102 can be reduced as much as possible.

As shown in FIG. 47, the inductor coil 1110 is serially connected to the capacitor 1111. One end of the inductor coil 1110 is connected to the output terminal of the power conversion circuit 110. One end of the capacitor 1111 is connected to the power transmission side pad 10.

The resonance capacitor 112 configures a resonant circuit together with the coils 101 and 102 of the power transmission side pad 10. The resonance capacitor 112 is connected in parallel to the power transmission side pad 10.

The power reception side pad 12 illustrated in FIG. 1 is arranged in the bottom part of the vehicle so as to face the power transmission side pad 10, being vertically spaced apart therefrom, when the vehicle is parked in the parking space. The power reception side pad 12 generates an alternating current by electromagnetic induction caused by the interlinkage of alternating magnetic fluxes generated from the power transmission side pad 10. The power reception side pad 12 includes a core and coils. The power reception side pad 12 has the same configuration as that of the power transmission side pad 10, and is disposed upside down.

The power reception circuit 13 transmits and receives information to/from the power transmission circuit 11 by radio communication and converts the alternating current supplied from the power reception side pad 12 into a direct current on the basis of the received information to charge the main battery B1. As shown in FIG. 47, the power reception circuit 13 includes a resonance capacitor 130, a filter circuit 131, and a power conversion circuit 132.

The resonance capacitor 130 configures a resonant circuit together with the coils of the power reception side pad 12. The resonance capacitor 130 is connected in parallel to the power reception side pad 12.

The filter circuit 131 removes predetermined frequency components included in the alternating current supplied from the power reception side pad 12, to which the resonance capacitor 130 is connected. The filter circuit 131 includes a capacitor 1310 and an inductor coil 1311.

The inductor coil 1311 has the same configuration as that of the inductor coil 1110, and is provided to the core of the power reception side pad 12 to use the core as a magnetic path. Thus, similarly to the inductor coil 1110, the inductor coil 1311 can reduce the influence of the magnetic fluxes generated from the coils of the power reception side pad 12 as much as possible.

The capacitor 1310 is serially connected to the inductor coil 1311. One end of the capacitor 1310 is connected to the power reception side pad 12. One end of the inductor coil 1311 is connected to the power conversion circuit 132.

The power conversion circuit 132 converts the alternating current supplied through the filter circuit 131 into a direct current, for supply to the main battery B1. The input terminal of the power conversion circuit 132 is connected to the filter circuit 131 and the power reception side pad 12. The output terminal is connected to the main battery B1.

Next, referring to FIGS. 1 and 47, the operation of the contactless power supply system will be described.

As shown in FIG. 1, when the vehicle is parked in the parking space, the power transmission side pad 10 faces the power reception side pad 12, being vertically spaced apart from each other by a predetermined distance. In this state, after a charge start button (not shown) is pressed to instruct the start of charging, the power transmission circuit 11 and the power reception circuit 13 transmit and receive information by radio communication.

The power conversion circuit 110 illustrated in FIG. 47 converts the output of the external power supply PS into high-frequency alternating current and outputs the alternating current. The filter circuit 111 removes predetermined frequency components included in the alternating current supplied from the power conversion circuit 110. The power transmission side pad 10, to which the resonance capacitor 112 is connected, generates alternating magnetic flux, with the alternating current being supplied through the filter circuit 111.

When current is passed through the coils 101 and 102 as shown in FIG. 43 and magnetic flux is generated as shown in FIGS. 44 to 46, magnetic flux is generated inside and around the core 100.

As shown in FIGS. 48 and 49, the inductor coil 1110 is buried near the center part of the core 100 in the longitudinal direction, the lateral direction, and the vertical direction, with its axial center direction being the lateral direction. Thus, as shown in FIGS. 50 to 52, the magnetic fluxes generated from the coils 101 and 102 are substantially perpendicular to the axial center direction at the axial center part 1110a of the inductor coil 1110, and the coupling coefficient of the inductor coil 1110 to the coils 101 and 102 is substantially zero. Consequently, even though current is passed through the coils 101 and 102 to generate magnetic flux inside and around the core 100, the magnetic flux hardly interlinks with the inductor coil 1110. Thus, the influence of the magnetic fluxes generated from the coils 101 and 102 can be reduced as much as possible. As a result, the characteristics of the filter circuit 111 can be ensured.

The power reception side pad 12, to which the resonance capacitor 130 is connected, generates an alternating current by electromagnetic induction caused by the interlinkage of the alternating magnetic fluxes generated from the power transmission side pad 10. The filter circuit 131 removes predetermined frequency components included in the alternating current supplied from the power reception side pad 12, to which the resonance capacitor 130 is connected.

The magnetic fluxes generated from the power reception side pad 12 flows through and around the core. However, the inductor coil 1311 has the same configuration as that of the inductor coil 1110. Thus, the magnetic flux hardly interlinks with the inductor coil 1311. Consequently, the influence of the magnetic fluxes generated from the coils of the power reception side pad 12 can be reduced as much as possible. Accordingly, the characteristics of the filter circuit 131 can be ensured.

The power conversion circuit 132 converts the alternating current supplied through the filter circuit 131 into a direct current, for supply to the main battery B1. In this manner, electric power can be transmitted from the external power supply PS to the main battery B1 in a contactless manner to charge the main battery B1.

Next, the advantageous effects of the contactless power supply system according to the seventh embodiment will be described.

According to the seventh embodiment, the inductor coil 1110 of the filter circuit 11 is provided to the core 100 of the power transmission side pad 10, to which the filter circuit 11 is connected, and uses the core 100 as a magnetic path. In other words, the inductor coil 1110 uses the core 100 of the power transmission side pad 10 as the core configuring the magnetic path of the inductor coil 1110. Thus, the present embodiment is applicable to a mode in which no transformer is provided. Further, the contactless power supply system 1 can be downsized, compared with the case where an inductor coil having a core is separately provided. Moreover, the magnetic fluxes generated from the coils 101 and 102 are substantially perpendicular to the axial center direction at the axial center part 1110a of the inductor coil 1110. Thus, the coupling coefficient of the inductor coil 1110 to the coils 101 and 102 is substantially zero, reducing the influence of the magnetic fluxes generated from the coils 101 and 102 as much as possible. Accordingly, the characteristics of the filter circuit 111 can be ensured.

According to the seventh embodiment, the inductor coil 1110 is buried in the core 100. Thus, the contactless power supply system 1 can be further downsized, compared with the case where an inductor coil having a core is separately provided.

Eighth Embodiment

Next, a contactless power supply system according to an eighth embodiment will be described. In the contactless power supply system according to the eighth embodiment, only an inductor coil is disposed differently from the contactless power supply system according to the seventh embodiment. Other than the inductor coil, the present embodiment is the same as the contactless power supply system according to the seventh embodiment. Thus, referring to FIGS. 53 to 55, only the configuration of the inductor coil is described, and the description of operations is omitted. Note that, the same components as those of the seventh embodiment are designated with the same reference numerals to omit duplicate description.

Figure 53:
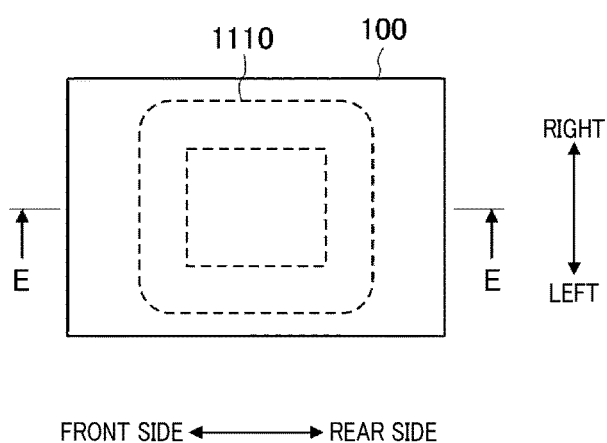
FIG. 53 is a top view of a core for explaining the layout of an inductor coil of a contactless power supply system according to an eighth embodiment.
Figure 54:
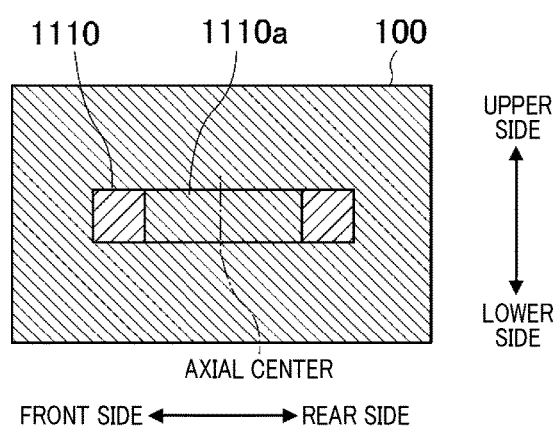
FIG. 54 is a cross-sectional view taken along the line E-E of FIG. 53.

As shown in FIGS. 53 and 54, an inductor coil 1110 is in a substantially rectangular annular shape configured of a wound conductor wire. The inductor coil 1110 is buried near the center part of a core 100 in the longitudinal direction, the lateral direction, and the vertical direction, with its axial center direction being aligned with the vertical direction. An axial center part 1110a in a nearly quadrangular prism shape of the inductor coil 1110 is configured of the magnetic material of the core 100, not an air layer.

Figure 55:
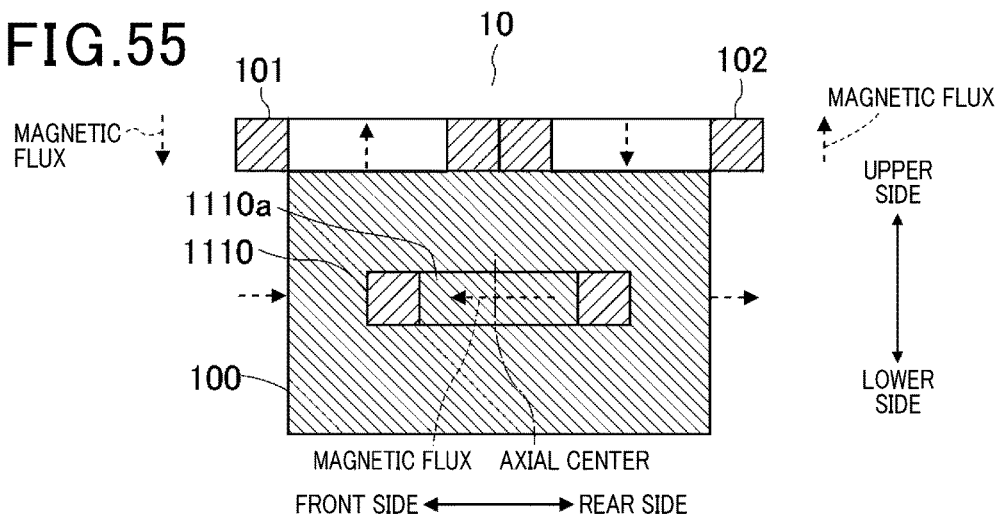
FIG. 55 is a diagram for explaining magnetic flux flow in a power transmission side pad and the inductor coil.

When current is passed through coils 101 and 102 to generate magnetic flux, the magnetic flux flows through and around the core 100 as shown in FIG. 55.

As shown in FIGS. 53 and 54, the inductor coil 1110 is buried near the center part of the core 100 in the longitudinal direction, the lateral direction, and the vertical direction, with its axial center direction being aligned with the vertical direction. Thus, as shown in FIG. 55, the magnetic fluxes generated from the coils 101 and 102 are substantially perpendicular to the axial center direction at the axial center part 1110a of the inductor coil 1110, and the coupling coefficient of the inductor coil 1110 to the coils 101 and 102 is substantially zero. Consequently, even though current is passed through the coils 101 and 102 to generate magnetic flux inside and around the core 100, the magnetic flux hardly interlinks with the inductor coil 1110. Accordingly, the influence of the magnetic fluxes generated from the coils 101 and 102 can be reduced as much as possible.

Next, the advantageous effects of the contactless power supply system according to the eighth embodiment will be described. According to the eighth embodiment, advantageous effects similar to those of the seventh embodiment can be obtained.

Ninth Embodiment

Next, a contactless power supply system according to ninth embodiment will be described. In the contactless power supply system according to the ninth embodiment, only an inductor coil is disposed differently from the contactless power supply system according to the first embodiment. Other than the inductor coil, the configurations are the same as those of the contactless power supply system according to the first embodiment. Thus, referring to FIGS. 56 to 58, only the configuration of the inductor coil is described, and the description of operations is omitted. Note that, the same components as those of the seventh embodiment are designated with the same reference numerals to omit duplicate description.

Figure 56:
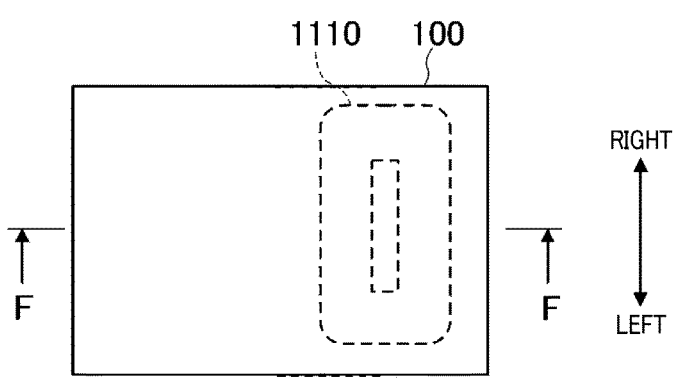
FIG. 56 is a top view of a core for explaining the layout of an inductor coil of a contactless power supply system according to a ninth embodiment.
Figure 57:
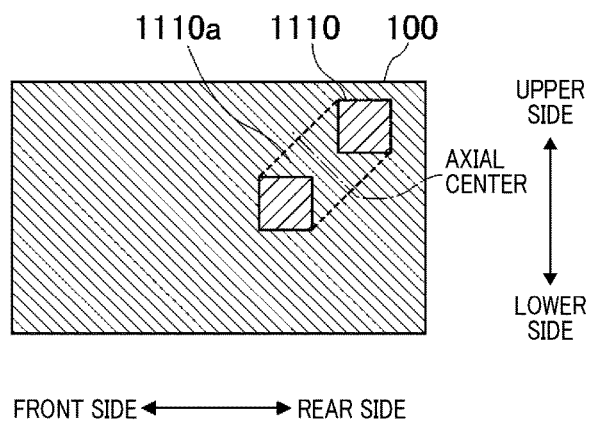
FIG. 57 is a cross-sectional view taken along the line F-F of FIG. 56.

As shown in FIGS. 56 and 57, an inductor coil 1110 is an element in a substantially rectangular annular shape configured of a wound conductor wire. The inductor coil 1110 is buried in a portion near the center part of a core 100 in the lateral direction and above the center part of the core 100 slightly on the rear side in the longitudinal direction, with its axial center direction being diagonally tilted forward from the vertical direction. An axial center part 1110a in a nearly quadrangular prism shape of the inductor coil 1110 is configured of the magnetic material of the core 100, not an air layer.

Figure 58:
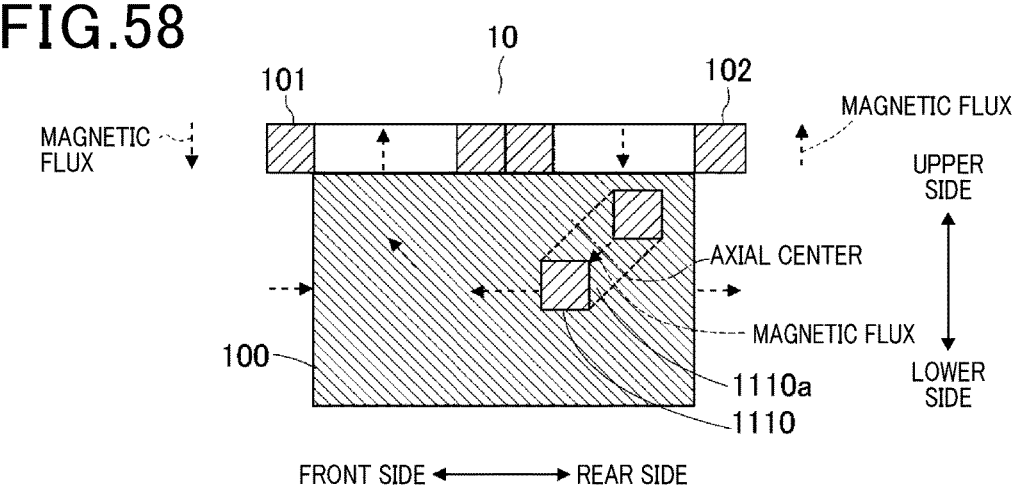
FIG. 58 is a diagram for explaining magnetic flux flow in a power transmission side pad and the inductor coil.

When current is passed through coils 101 and 102 to generate magnetic flux, the magnetic flux flows through and around the core 100 as shown in FIG. 58.

As shown in FIGS. 56 and 57, the inductor coil 1110 is buried in a portion near the center part of the core 100 in the lateral direction and above the center part of the core 100 slightly on the rear side in the longitudinal direction, with its axial center direction being diagonally tilted forward from the vertical direction. Thus, as shown in FIG. 58, the magnetic fluxes generated from the coils 101 and 102 are substantially perpendicular to the axial center direction at the axial center part 1110a of the inductor coil 1110, and the coupling coefficient of the inductor coil 1110 to the coils 101 and 102 is substantially zero. Consequently, even though current is passed through the coils 101 and 102 to generate magnetic flux inside and around the core 100, the magnetic flux hardly interlinks with the inductor coil 1110. Accordingly, the influence of the magnetic fluxes generated from the coils 101 and 102 can be reduced as much as possible.

Next, the advantageous effects of the contactless power supply system according to the ninth embodiment will be described. According to the ninth embodiment, advantageous effects similar to those of the seventh embodiment can be obtained.

Tenth Embodiment

Next, a contactless power supply system according to a tenth embodiment will be described. In the contactless power supply system according to the tenth embodiment, only an inductor coil is disposed differently from the contactless power supply system according to the seventh embodiment. Other than the inductor coil, the present embodiment is the same as the contactless power supply system according to the seventh embodiment. Thus, referring to FIGS. 59 to 61, only the configuration of the inductor coil is described, and the description of operations is omitted. Note that, the same components as those of the seventh embodiment are designated with the same reference numerals to omit duplicate description.

Figure 59:
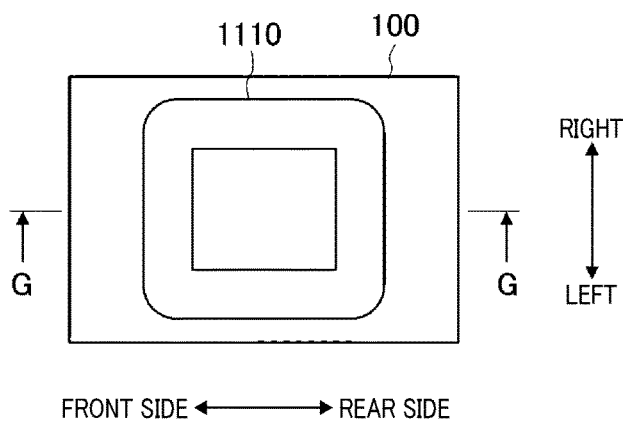
FIG. 59 is a top view of a core for explaining the layout of an inductor coil of a contactless power supply system according to a tenth embodiment.
Figure 60:
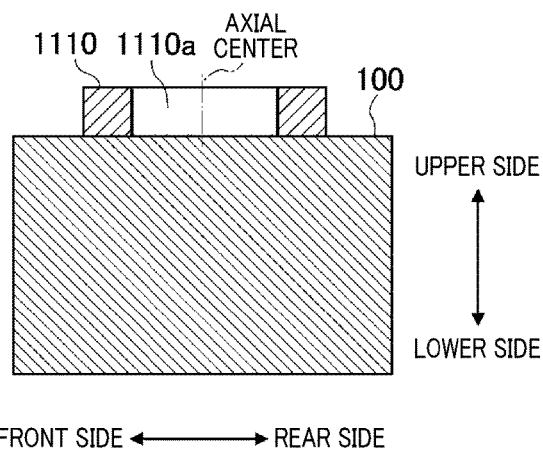
FIG. 60 is a cross-sectional view taken along the line G-G of FIG. 59.

As shown in FIGS. 59 and 60, an inductor coil 1110 is an element in a substantially rectangular annular shape configured of a wound conductor wire. The inductor coil 1110 is disposed near the center part on the top surface of a core 100 in the longitudinal direction and the lateral direction, with its axial center direction being the vertical direction.

Figure 61:
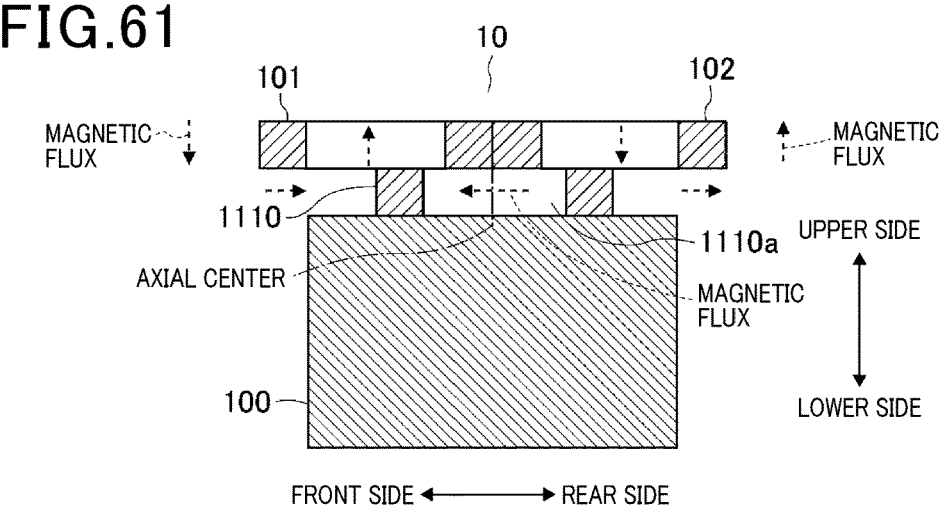
FIG. 61 is a diagram for explaining magnetic flux flow in a power transmission side pad and the inductor coil.

When current is passed through coils 101 and 102 to generate magnetic flux, as shown in FIG. 61, the magnetic flux flows through and around the core 100.

As shown in FIGS. 59 and 60, the inductor coil 1110 is disposed near the center part on the top surface of the core 100 in the longitudinal direction and the lateral direction, with its axial center direction being aligned with the vertical direction. Thus, as shown in FIG. 61, the magnetic fluxes generated from the coils 101 and 102 are substantially perpendicular to the axial center direction at an axial center part 1110a of the inductor coil 1110, and the coupling coefficient of the inductor coil 1110 to the coils 101 and 102 is substantially zero. Consequently, even though current is passed through the coils 101 and 102 to generate magnetic flux inside and around the core 100, the magnetic flux hardly interlinks with the inductor coil 1110. Accordingly, the influence of the magnetic fluxes generated from the coils 101 and 102 can be reduced as much as possible.

Next, the advantageous effects of the contactless power supply system according to the tenth embodiment will be described.

According to the tenth embodiment, similarly to the seventh embodiment, the contactless power supply system 1 can be downsized, compared with the case where an inductor coil having a core is separately provided. Moreover, the characteristics of the filter circuit 111 can be ensured.

According to the tenth embodiment, the inductor coil 1110 is provided to the surface of the core 100. Thus, the inductor coil having the core can be easily configured, compared with the case where the inductor coil is buried in the core.

Eleventh Embodiment

Next, a contactless power supply system according to an eleventh embodiment will be described. In the contactless power supply system according to the eleventh embodiment, only an inductor coil is disposed differently from the contactless power supply system according to the first embodiment. Other than the inductor coil, the configurations are the same as those of the contactless power supply system according to the first embodiment. Thus, referring to FIGS.

62 to 64, only the configuration of the inductor coil is described, and the description of operations is omitted. Note that, the same components as those of the seventh embodiment are designated with the same reference numerals to omit duplicate description.

Figure 62:
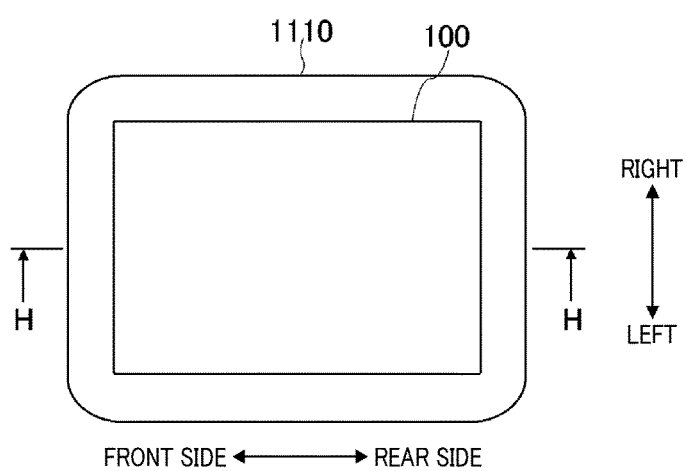
FIG. 62 is a top view of a core for explaining the layout of an inductor coil of a contactless power supply system according to an eleventh embodiment.
Figure 63:
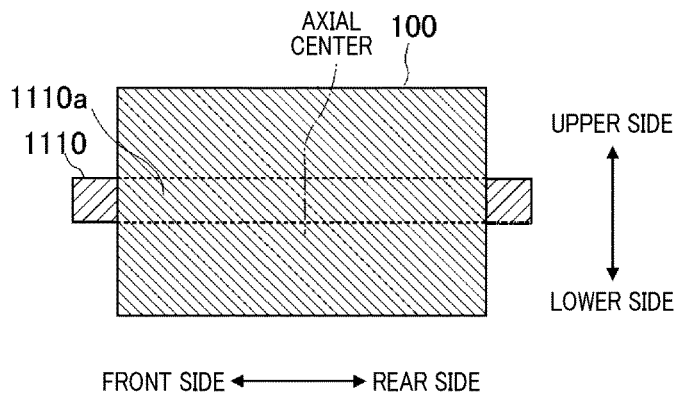
FIG. 63 is a cross-sectional view taken along the line H-H of FIG. 62.

As shown in FIGS. 62 and 63, an inductor coil 1110 is in a substantially rectangular annular shape configured of a wound conductor wire. The inductor coil 1110 is disposed along the front and back surfaces and left and right side surfaces of a core 100, with its axial center direction being aligned with the vertical direction.

Figure 64:
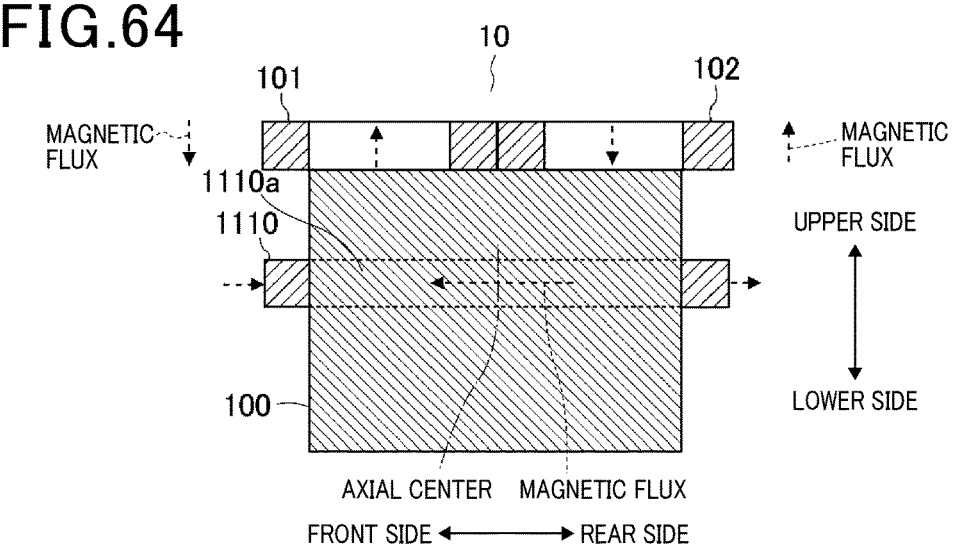
FIG. 64 is a diagram for explaining magnetic flux flow in a power transmission side pad and the inductor coil.

When current is passed through coils 101 and 102 to generate magnetic flux, as shown in FIG. 64, the magnetic flux flows through and around the core 100.

As shown in FIGS. 62 and 63, the inductor coil 1110 is disposed parallel to the front and back surfaces and left and right side surfaces of the core 100, with its axial center direction being aligned with the vertical direction. Thus, as shown in FIG. 64, the magnetic fluxes generated from the coils 101 and 102 are substantially perpendicular to the axial center direction at an axial center part 1110a of the inductor coil 1110, and the coupling coefficient of the inductor coil 1110 to the coils 101 and 102 is substantially zero. Consequently, even though current is passed through the coils 101 and 102 to generate magnetic flux inside and around the core 100, the magnetic flux hardly interlinks with the inductor coil 1110. Accordingly, the influence of the magnetic fluxes generated from the coils 101 and 102 can be reduced as much as possible.

Next, the advantageous effects of the contactless power supply system according to the eleventh embodiment will be described. According to the eleventh embodiment, advantageous effects similar to those of the tenth embodiment can be obtained.

Twelfth Embodiment

Next, a contactless power supply system according to a twelfth embodiment will be described. In the contactless power supply system according to the twelfth embodiment, only an inductor coil is disposed differently from the contactless power supply system according to the seventh embodiment. Other than the inductor coil, the configurations are the same as those of the contactless power supply system according to the first embodiment. Thus, referring to FIGS. 65 to 67, only the configuration of the inductor coil is described, and the description of operations is omitted. Note that, the same components as those of the seventh embodiment are designated with the same reference numerals to omit duplicate description.

Figure 65:
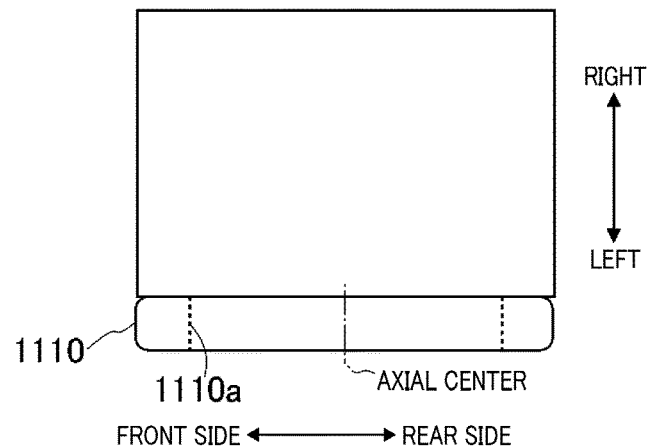
FIG. 65 is a top view of a core for explaining the layout of an inductor coil of a contactless power supply system according to a twelfth embodiment.
Figure 66:
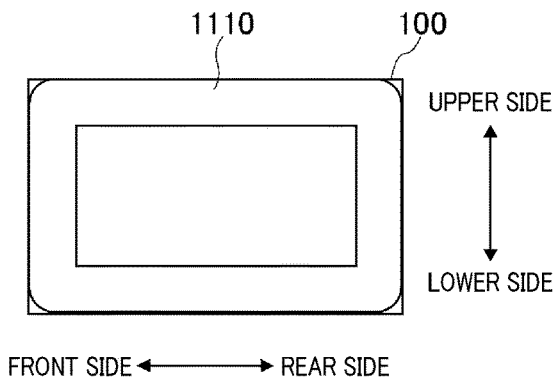
FIG. 66 is a left side view of the core for explaining the layout of the inductor coil.

As shown in FIGS. 65 and 66, an inductor coil 1110 is an element in a substantially rectangular annular shape configured of a wound conductor wire. The inductor coil 1110 is disposed on the left side surface of a core 100, with its axial center direction being the lateral direction.

Figure 67:
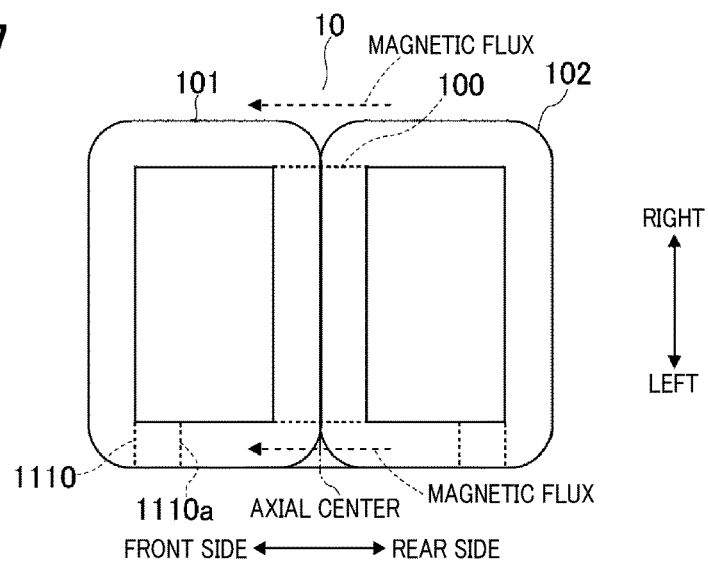
FIG. 67 is a diagram for explaining magnetic flux flow in a power transmission side pad and the inductor coil.
Figure 68:
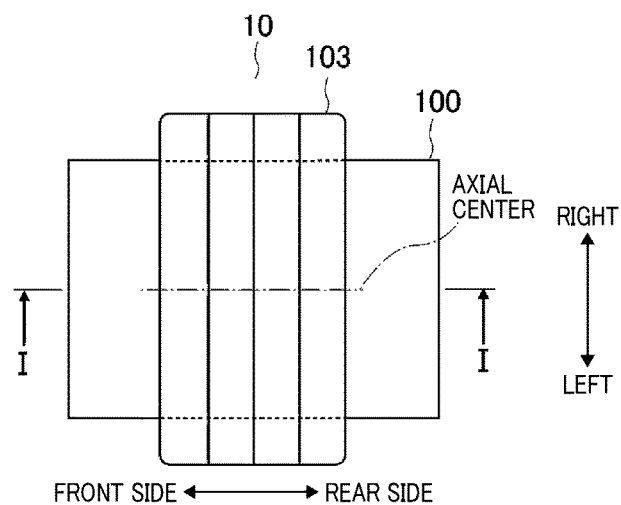
FIG. 68 is a top view of a power transmission side pad of a contactless power supply system according to a thirteenth embodiment.
Figure 69:
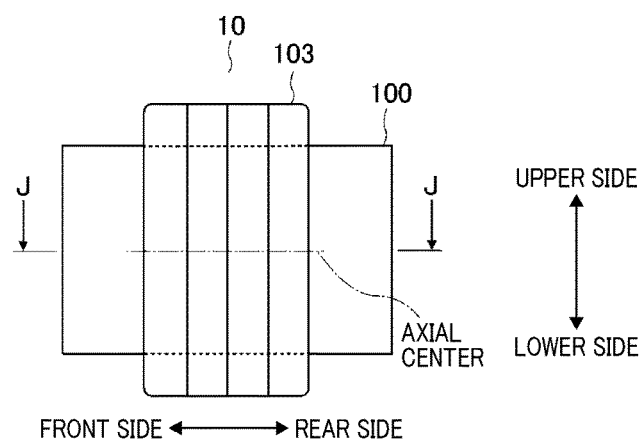
FIG. 69 is a left side view of the power transmission side pad.
Figure 70:
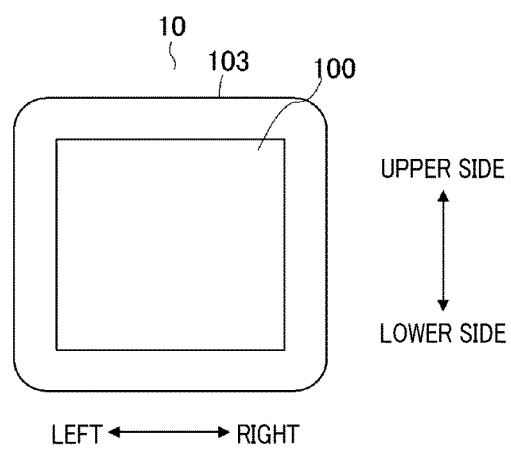
FIG. 70 is a rear side view of the power transmission side pad.
Figure 71:
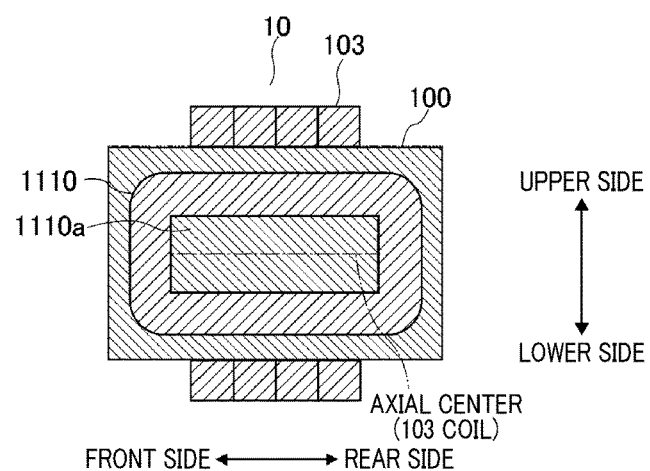
FIG. 71 is a cross-sectional view taken along the line I-I of FIG. 68.
Figure 72:
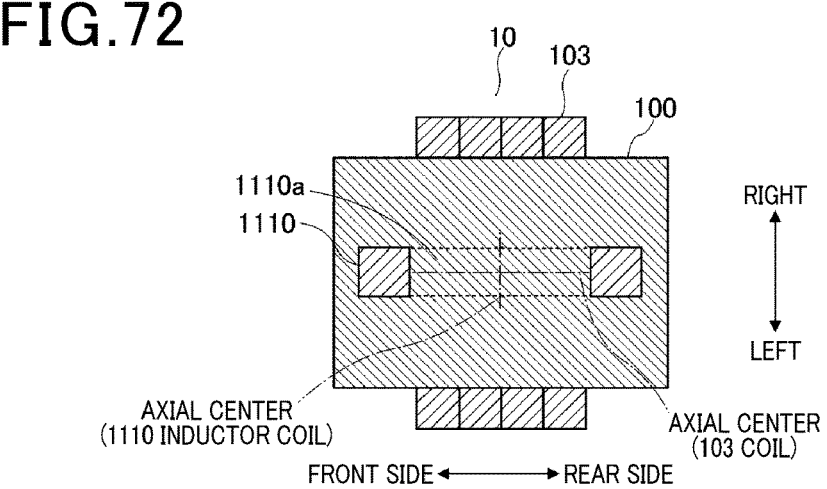
FIG. 72 is a cross-sectional view taken along the line J-J of FIG. 69.

When current is passed through coils 101 and 102 to generate magnetic flux, the magnetic flux flows around the core 100 as shown in FIG. 67.

As shown in FIGS. 65 and 66, the inductor coil 1110 is disposed on the left side surface of the core 100, with its axial center direction being aligned with the lateral direction. Thus, as shown in FIG. 67, the magnetic fluxes generated from the coils 101 and 102 are substantially perpendicular to the axial center direction at the axial center part 1110a of the inductor coil 1110, and the coupling coefficient of the inductor coil 1110 to the coils 101 and 102 is substantially zero. Consequently, even though current is passed through the coils 101 and 102 to generate magnetic flux inside and around the core 100, the magnetic flux hardly interlinks with the inductor coil 1110. Accordingly, the influence of the magnetic fluxes generated from the coils 101 and 102 can be reduced as much as possible.

Next, the advantageous effects of the contactless power supply system according to the twelfth embodiment will be described. According to the twelfth embodiment, advantageous effects similar to those of the tenth embodiment can be obtained.

Thirteenth Embodiment

Next, a contactless power supply system according to a thirteenth embodiment will be described. In the contactless power supply system according to the thirteenth embodiment, only the configurations of the coils of a power transmission side pad and a power reception side pad are changed from the contactless power supply system according to the seventh embodiment. Other than the coils of the power transmission side pad and the power reception side pad, the configurations are the same as those of the contactless power supply system according to the first embodiment. Thus, referring to FIGS. 68 to 77, only the configurations of the coils of the power transmission side pad and the power reception side pad are described, and the description of operations is omitted. Note that, the same components as those of the seventh embodiment are designated with the same reference numerals to omit duplicate description.

As shown in FIGS. 68 to 72, the power transmission side pad 10 includes a core 100 and coils 103 (power supply coils).

The coil 103 is in a substantially rectangular annular shape configured of a wound conductor wire to generate magnetic flux, with current being passed through the coil. The coil 103 is disposed parallel to the upper and lower surfaces and left and right side surfaces of the core 100, with its axial center direction being aligned with the longitudinal direction to use the core 100 as a magnetic path.

Figure 39:
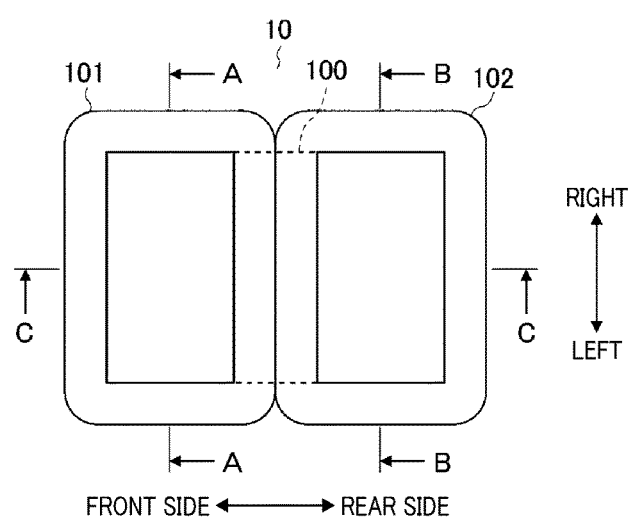
FIG. 39 is a top view of a power transmission side pad according to a seventh embodiment.
Figure 40:
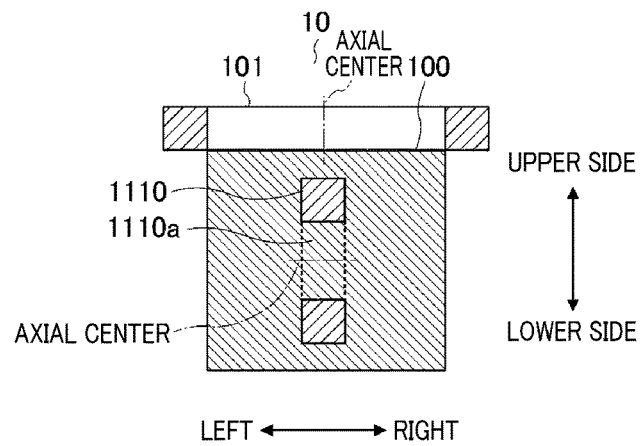
FIG. 40 is a cross-sectional view taken along the line A-A of FIG. 39.
Figure 41:
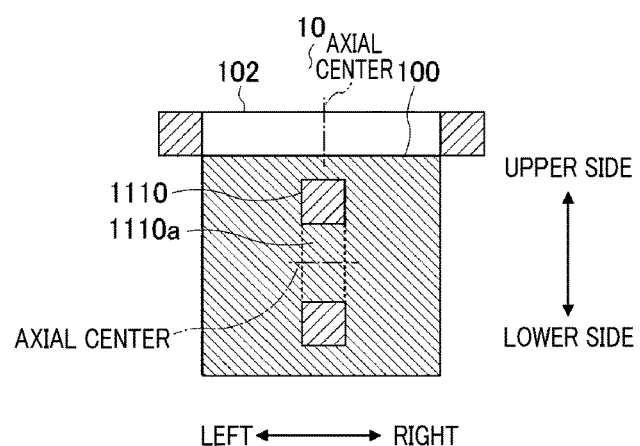
FIG. 41 is a cross-sectional view taken along the line B-B in FIG. 39.
Figure 42:
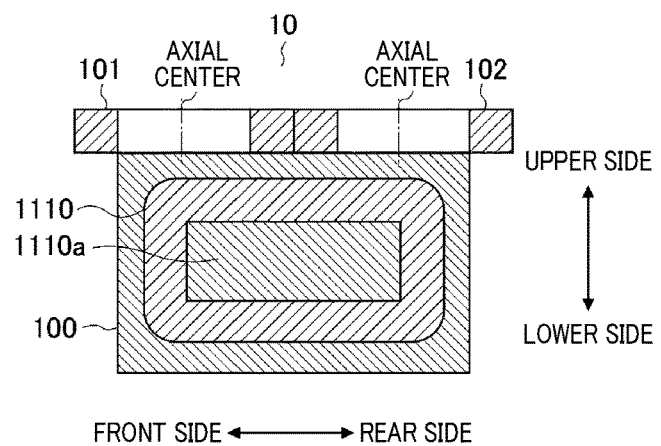
FIG. 42 is a cross-sectional view taken along the line C-C of FIG. 39.
Figure 73:
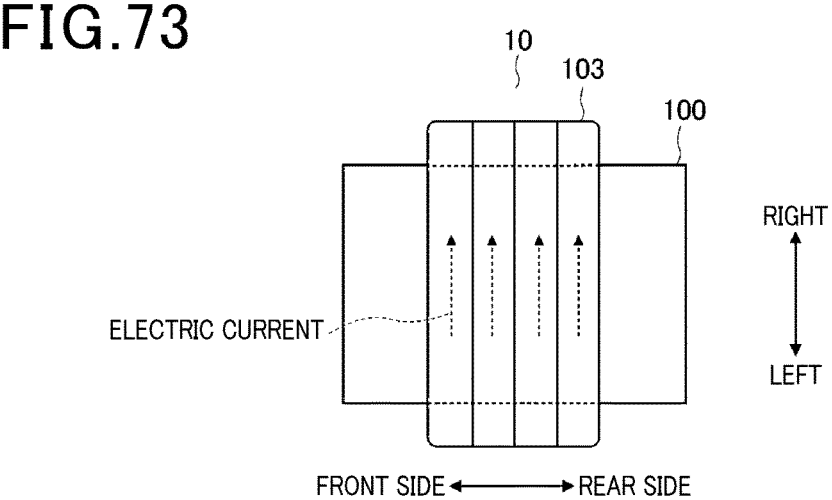
FIG. 73 is a diagram corresponding to FIG. 68 for explaining current flow in the power transmission side pad.
Figure 74:
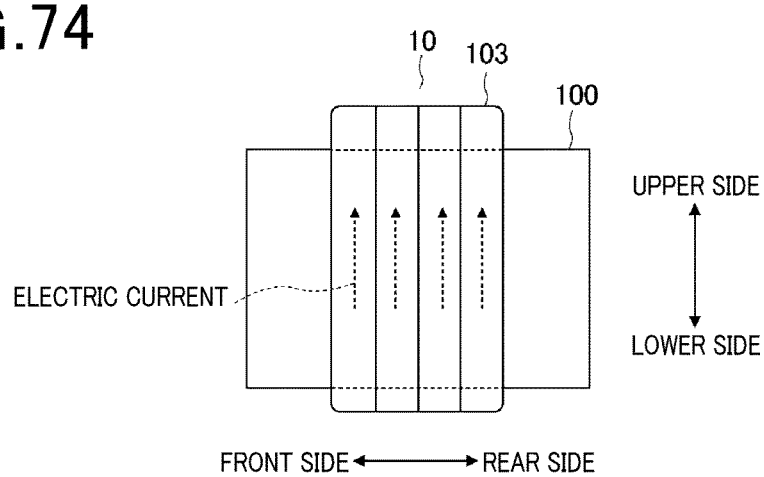
FIG. 74 is a diagram corresponding to FIG. 69 for explaining current flow in the power transmission side pad.
Figure 75:
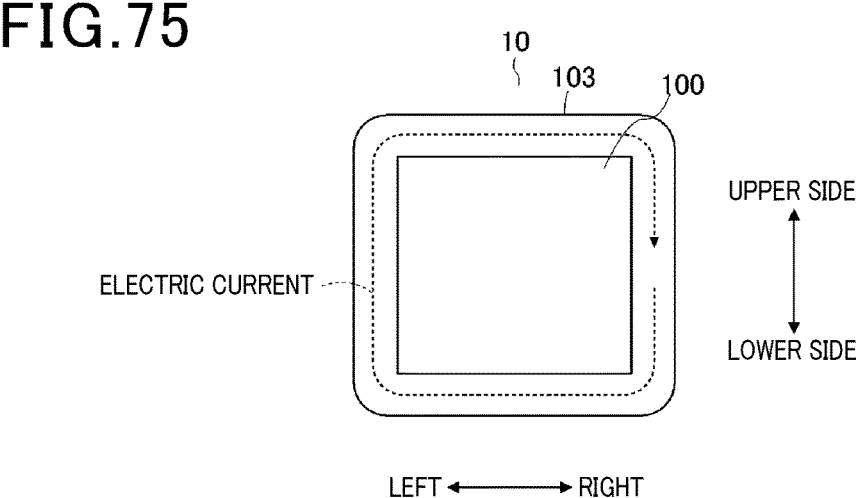
FIG. 75 is a diagram corresponding to FIG. 70 for explaining current flow in the power transmission side pad.

As shown in FIGS. 73 to 75, when current is passed through the coils 103, magnetic flux is generated as shown in FIGS. 39 and 40. When current flows in the reverse direction, a magnetic flux is generated in the reverse direction.

A power reception side pad 12 has the same configuration as that of the power transmission side pad 10, and is disposed upside down.

Figure 76:
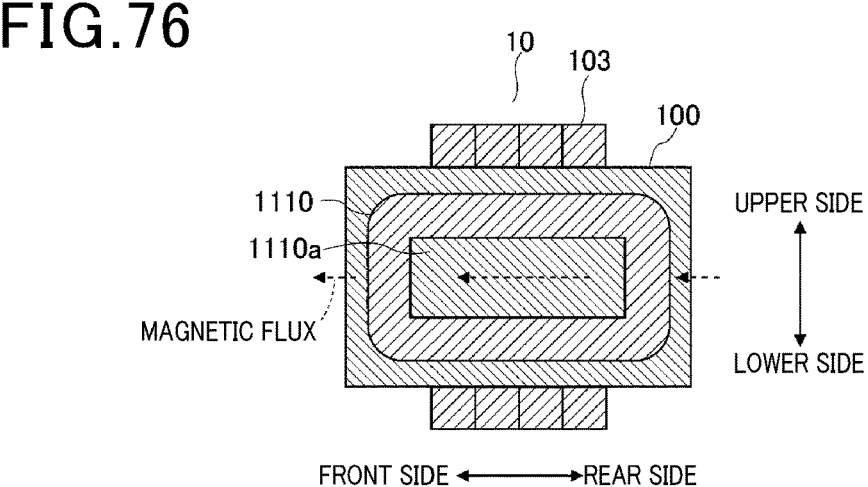
FIG. 76 is a diagram corresponding to FIG. 71 for explaining magnetic flux flow in the power transmission side pad.
Figure 77:
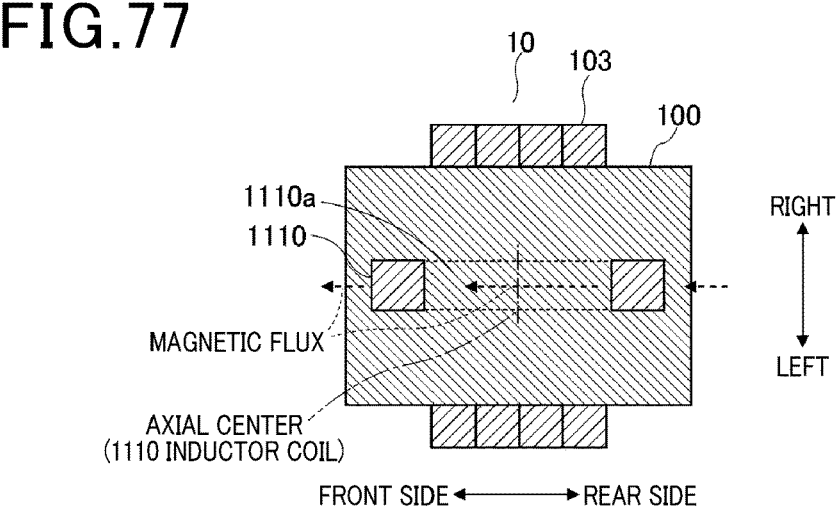
FIG. 77 is a diagram corresponding to FIG. 72 for explaining magnetic flux flow in the power transmission side pad.

As shown in FIGS. 48 and 49, an inductor coil 1110 is buried near the center part of the core 100 in the longitudinal direction, the lateral direction, and the vertical direction, with its axial center direction being aligned with the lateral direction. Thus, as shown in FIGS. 76 and 77, the magnetic fluxes generated from the coil 103 are substantially perpendicular to the axial center direction at an axial center part 1110a of the inductor coil 1110, and the coupling coefficient of the inductor coil 1110 to the coil 103 is substantially zero. Consequently, even though current is passed through the coil 103 to generate magnetic flux inside and around the core 100, the magnetic flux hardly interlinks with the inductor coil 1110. Thus, the influence of the magnetic fluxes generated from the coil 103 can be reduced as much as possible. As a result, the characteristics of the filter circuit 111 can be ensured.

An inductor coil 1311 has the same configuration as that of the inductor coil 1110.

Next, the advantageous effects of the contactless power supply system according to the thirteenth embodiment will be described. According to the thirteenth embodiment, advantageous effects similar to those of the seventh embodiment can be obtained.

Fourteenth Embodiment

Next, a contactless power supply system according to a fourteenth embodiment will be described. In the contactless power supply system according to the fourteenth embodiment, only the configurations of the coils of a power transmission side pad and a power reception side pad are changed from the contactless power supply system according to the seventh embodiment. Other than the coils of the power transmission side pad and the power reception side pad, the present embodiment is the same as the contactless power supply system according to the seventh embodiment. Thus, referring to FIGS. 78 to 81, only the configurations of the coils of the power transmission side pad and the power reception side pad are described, and the description of operations is omitted. Note that, the same components as those of the seventh embodiment are designated with the same reference numerals to omit duplicate description.

Figure 78:
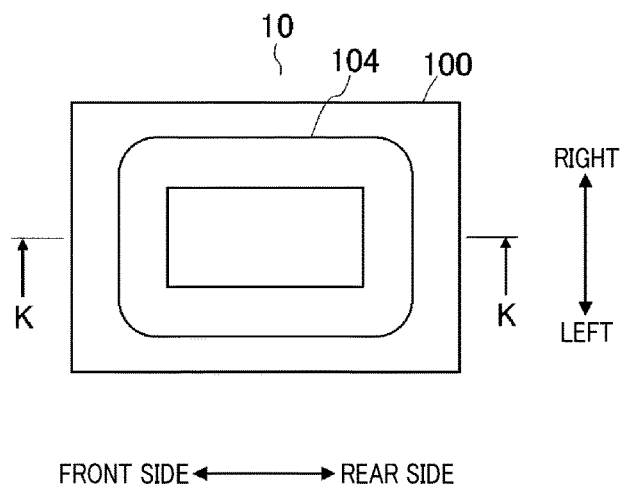
FIG. 78 is a top view of a power transmission side pad of a contactless power supply system according to a fourteenth embodiment.
Figure 79:
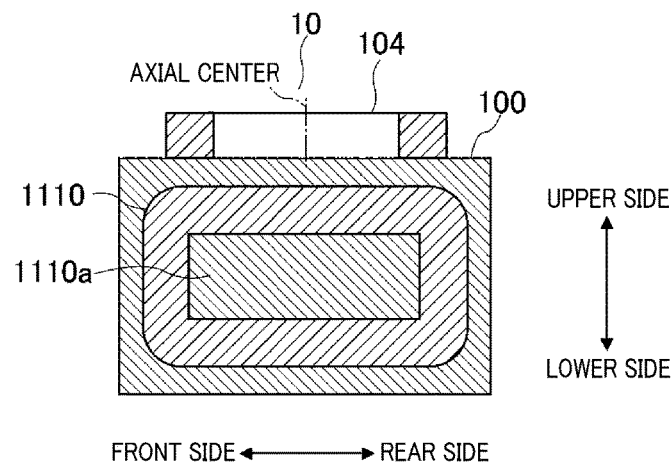
FIG. 79 is a cross-sectional view taken along the line K-K of FIG. 78.

As shown in FIGS. 78 and 79, a power transmission side pad 10 includes a core 100 and a coil 104 (a power supply coil).

The coil 104 is a member in a substantially rectangular annular shape configured of a wound conductor wire to generate magnetic flux, with current being passed through the coil. The coil 104 is disposed near the center part on the top surface of the core 100 in the longitudinal direction and the lateral direction, with its axial center direction being aligned with the vertical direction to use the core 100 as a magnetic path.

Figure 80:
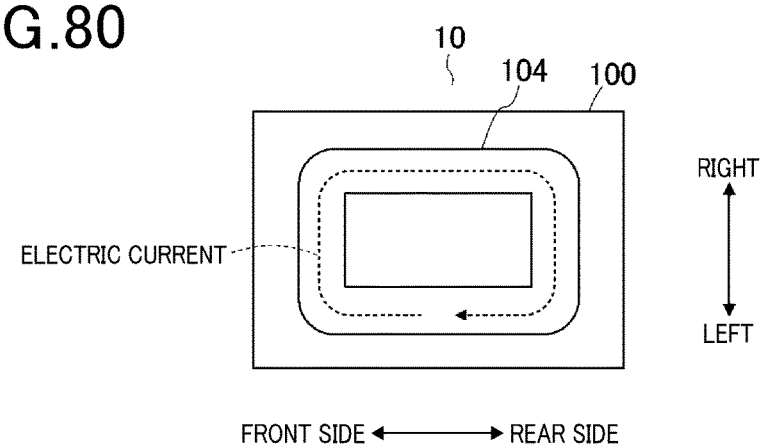
FIG. 80 is a diagram corresponding to FIG. 78 for explaining current flow in the power transmission side pad.
Figure 81:
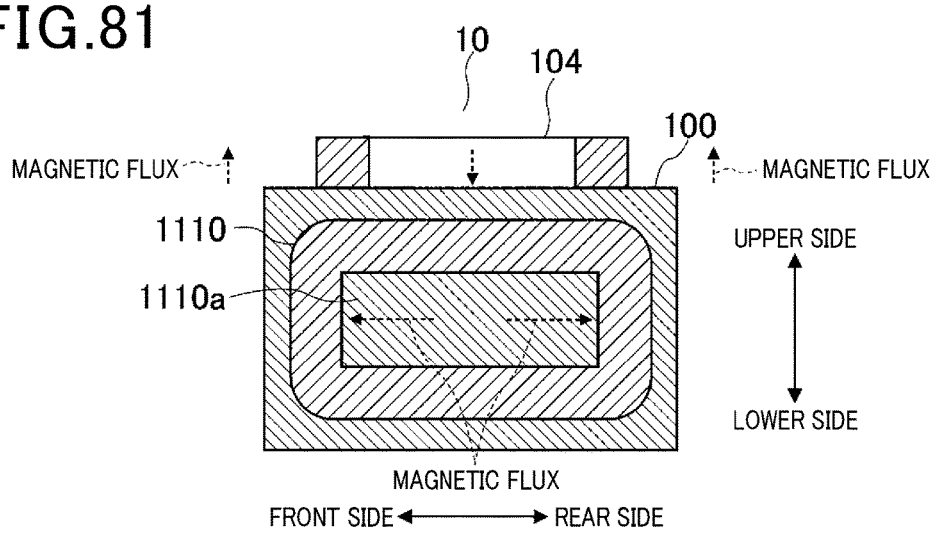
FIG. 81 is a diagram corresponding to FIG. 79 for explaining magnetic flux flow in the power transmission side pad.

As shown in FIG. 80, when current is passed through the coil 104, magnetic flux is generated as shown in FIG. 81. When current flows in the reverse direction, a magnetic flux is generated in the reverse direction.

A power reception side pad 12 has the same configuration as that of the power transmission side pad 10, and is disposed upside down.

Figure 85:
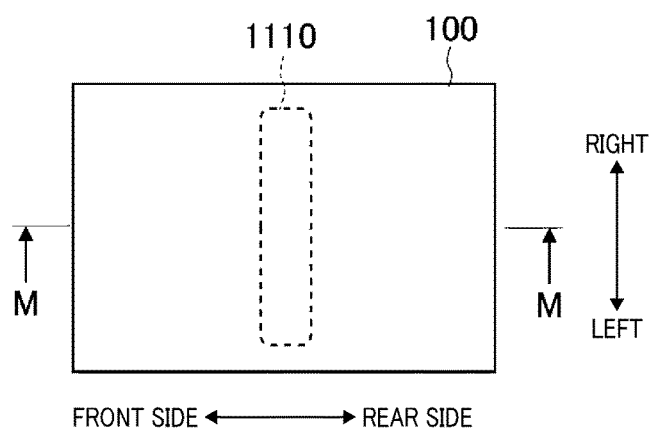
FIG. 85 is a top view of a core for explaining the layout of an inductor coil of a contactless power supply system according to a sixteenth embodiment.
Figure 86:
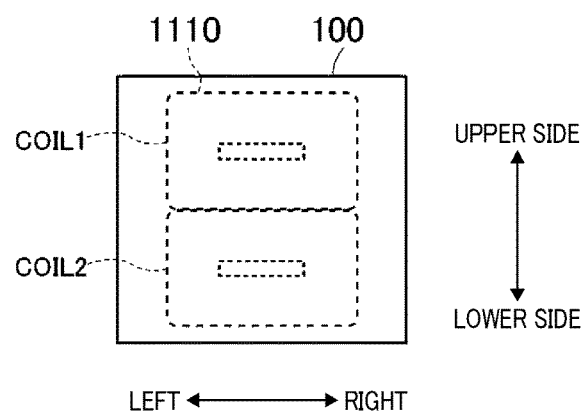
FIG. 86 is a rear side view of the core for explaining the layout of the inductor coil.

As shown in FIGS. 85 and 86, an inductor coil 1110 is buried near the center part of the core 100 in the longitudinal direction, the lateral direction, and the vertical direction, with its axial center direction being aligned with the lateral direction. Thus, as shown in FIG. 81, the magnetic fluxes generated from the coil 104 are substantially perpendicular to the axial center direction at an axial center part 1110a of the inductor coil 1110, and the coupling coefficient of the inductor coil 1110 to the coil 104 is substantially zero. Consequently, when current is passed through the coil 104 to generate magnetic flux inside and around the core 100, the magnetic flux hardly interlinks with the inductor coil 1110. Thus, the influence of the magnetic fluxes generated from the coil 104 can be reduced as much as possible. As a result, the characteristics of the filter circuit 111 can be ensured.

An inductor coil 1311 has the same configuration as that of the inductor coil 1110.

Next, the advantageous effects of the contactless power supply system according to the fourteenth embodiment will be described. According to the fourteenth embodiment, advantageous effects similar to those of the seventh embodiment can be obtained.

Fifteenth Embodiment

Next, a contactless power supply system according to a fifteenth embodiment will be described. In the contactless power supply system according to the fifteenth embodiment, only an inductor coil is disposed differently from the contactless power supply system according to the fourteenth embodiment. Other than the inductor coil, the configurations are the same as those of the contactless power supply system according to the fourteenth embodiment. Thus, referring to FIGS. 82 to 84, only the disposition of the inductor coil will be described, and the description of operations is omitted. Note that, the same components as those of the fourteenth embodiment are designated with the same reference numerals to omit duplicate description.

Figure 82:
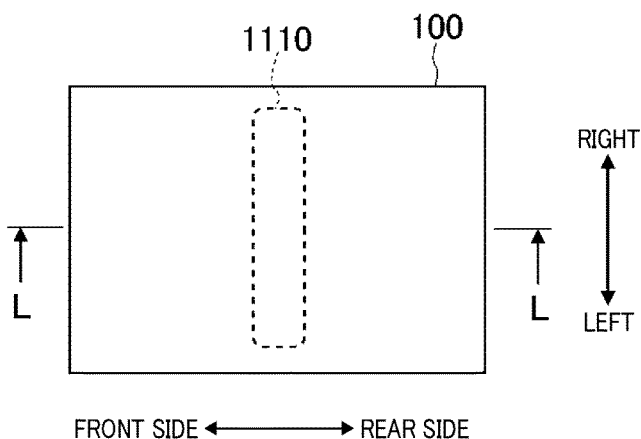
FIG. 82 is a top view of a core for explaining the layout of an inductor coil of a contactless power supply system according to a fifteenth embodiment.
Figure 83:
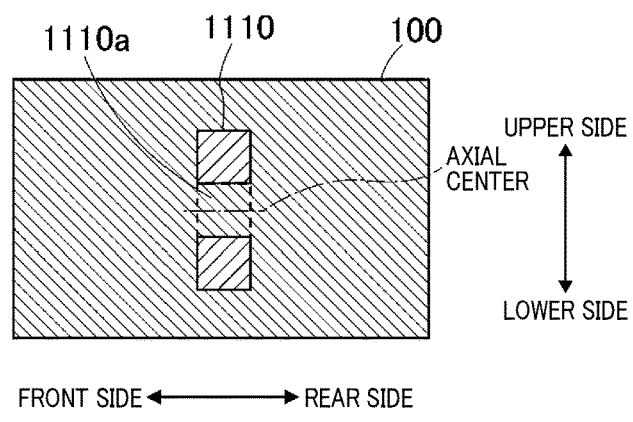
FIG. 83 is a cross-sectional view taken along the line L-L of FIG. 82.

As shown in FIGS. 82 and 83, an inductor coil 1110 is in a substantially rectangular annular shape configured of a wound conductor wire. The inductor coil 1110 is buried near the center part of a core 100 in the longitudinal direction, the lateral direction, and the vertical direction, with its axial center direction being aligned with the longitudinal direction.

Figure 84:
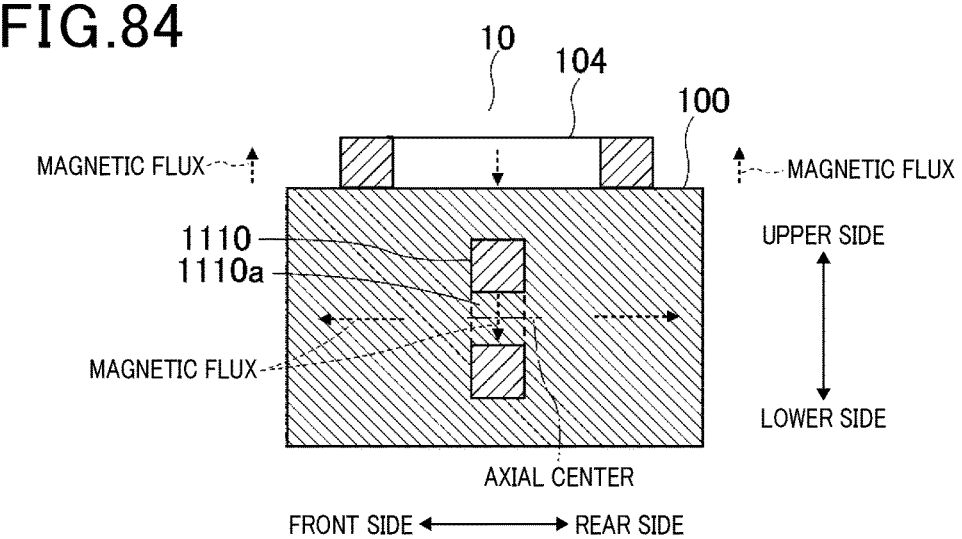
FIG. 84 is a diagram for explaining magnetic flux flow in a power transmission side pad and the inductor coil.

When current is passed through the coil 104 to generate magnetic flux, as shown in FIG. 84, the magnetic flux flows through and around the core 100.

As shown in FIGS. 82 and 83, the inductor coil 1110 is buried near the center part of the core 100 in the longitudinal direction, the lateral direction, and the vertical direction, with its axial center direction being aligned with the longitudinal direction. Thus, as shown in FIG. 84, the magnetic fluxes generated from the coil 104 are substantially perpendicular to the axial center direction at an axial center part 1110a of the inductor coil 1110, and the coupling coefficient of the inductor coil 1110 to the coil 104 is substantially zero. Consequently, when current is passed through the coil 104 to generate magnetic flux inside and around the core 100, the magnetic flux hardly interlinks with the inductor coil 1110. Accordingly, the influence of the magnetic fluxes generated from the coil 104 can be reduced as much as possible.

Next, the advantageous effects of the contactless power supply system according to the fifteenth embodiment will be described. According to the fifteenth embodiment, advantageous effects similar to those of the fourteenth embodiment can be obtained.

Sixteenth Embodiment

Next, a contactless power supply system according to a sixteenth embodiment will be described. In the contactless power supply system according to the sixteenth embodiment, only an inductor coil is disposed differently from the contactless power supply system according to the fourteenth embodiment. Other than the inductor coil, the configurations are the same as those of the contactless power supply system according to the eighth embodiment. Thus, referring to FIGS. 85 to 88, only the configuration of the inductor coil is described, and the description of operations is omitted. Note that, the same components as those of the eighth embodiment are designated with the same reference numerals to omit duplicate description.

Figure 87:
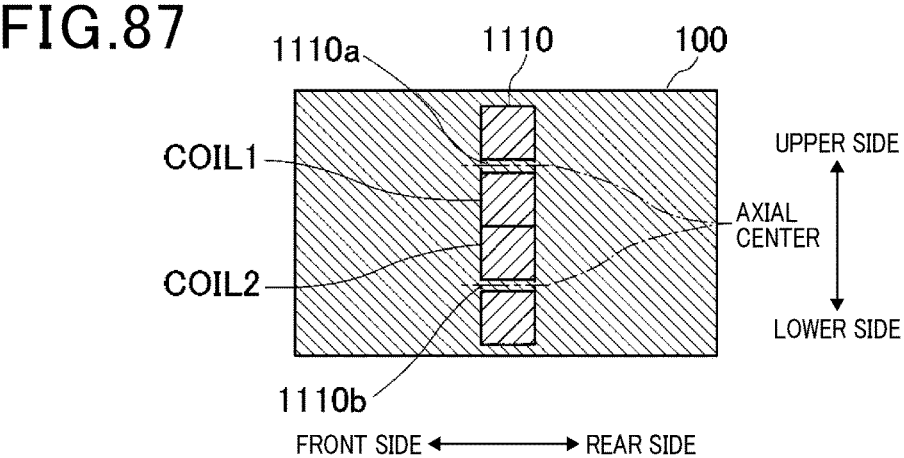
FIG. 87 is a cross-sectional view taken along the line M-M of FIG. 85.
Figure 88:
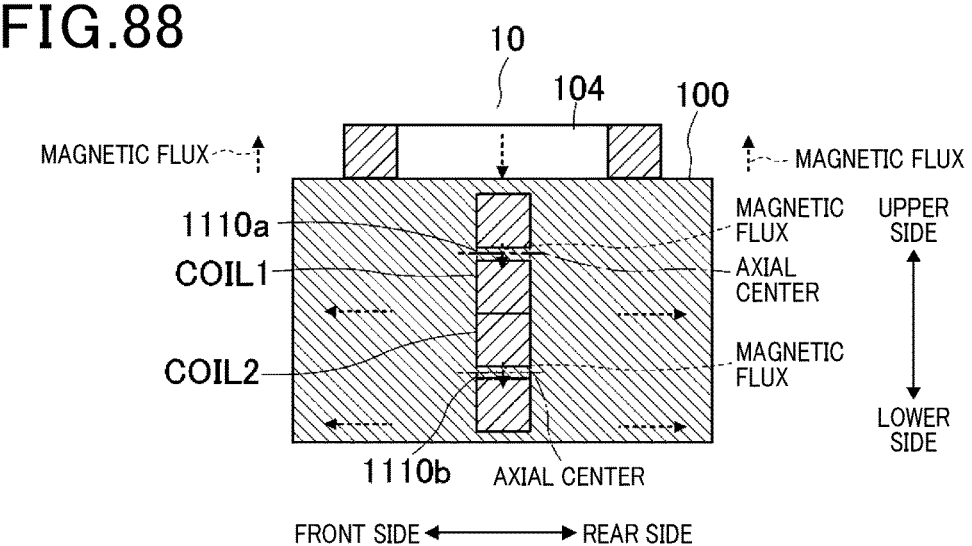
FIG. 88 is a diagram for explaining magnetic flux flow in a power transmission side pad and the inductor coil.

As shown in FIGS. 85 to 87, an inductor coil 1110 is an element in a substantially rectangular annular shape configured of a wound conductor wire. The inductor coil 1110 is configured of two coils COIL1 and COIL2 in a substantially rectangular annular shape. The coils COIL1 and COIL2 are disposed adjacent to each other in the vertical direction perpendicular to the axial center direction, with their axial center directions being the longitudinal direction. The coils COIL1 and COIL2 are buried near the center part of a core 100 in the longitudinal direction, the lateral direction, and the vertical direction. Axial center parts 1110a and 1110b of the inductor coil 1110 in a nearly quadrangular prism shape are configured of the magnetic material of the core 100, not an air layer.

When current is passed through a coil 104 to generate magnetic flux, as shown in FIG. 51, the magnetic flux flows through and around the core 100.

As shown in FIGS. 85 to 87, the inductor coil 1110 is configured of two coils COIL1 and COIL2 in a substantially rectangular annular shape. The coils COIL1 and COIL2 are disposed adjacent to each other in the vertical direction perpendicular to the axial center direction, with their axial center directions being the longitudinal direction. The coils COIL1 and COIL2 are buried near the center part of the core 100 in the longitudinal direction, the lateral direction, and the vertical direction. Thus, as shown in FIG. 87, the magnetic fluxes generated from the coil 104 are substantially perpendicular to the axial center direction at the axial center part 1110a of the inductor coil 1110, and the coupling coefficient of the inductor coil 1110 to the coil 104 is substantially zero. Consequently, when current is passed through the coil 104 to generate magnetic flux inside and around the core 100, the magnetic flux hardly interlinks with the inductor coil 1110. Accordingly, the influence of the magnetic fluxes generated from the coil 104 can be reduced as much as possible.

Next, the advantageous effects of the contactless power supply system according to the sixteenth embodiment will be described. According to the sixteenth embodiment, advantageous effects similar to those of the fourteenth embodiment can be obtained.

Seventeenth Embodiment

Next, a contactless power supply system according to a seventeenth embodiment will be described. In the contactless power supply system according to the seventeenth embodiment, only an inductor coil is disposed differently from the contactless power supply system according to the fourteenth embodiment. Other than the inductor coil, the configurations are the same as those of the contactless power supply system according to the eighth embodiment. Thus, referring to FIGS. 89 to 91, only the configuration of the inductor coil is described, and the description of operations is omitted. Note that, the same components as those of the fourteenth embodiment are designated with the same reference numerals to omit duplicate description.

Figure 89:
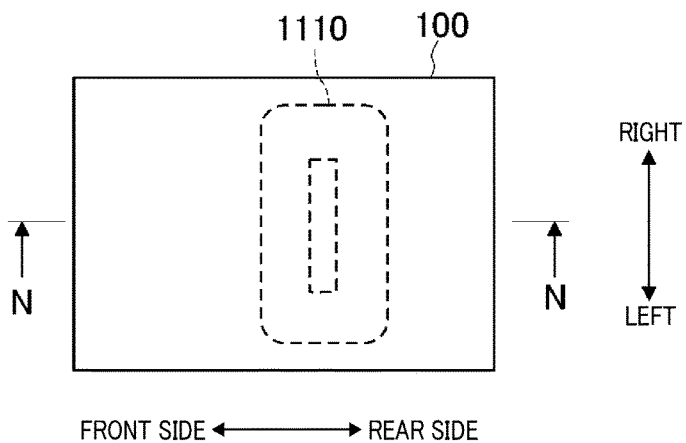
FIG. 89 is a top view of a core for explaining the layout of an inductor coil of a contactless power supply system according to a seventeenth embodiment.
Figure 90:
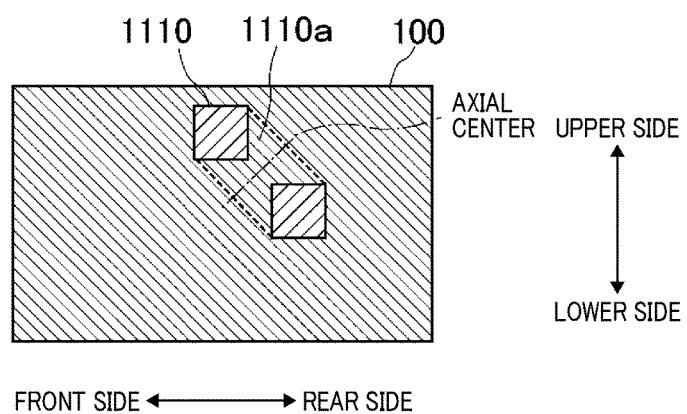
FIG. 90 is a cross-sectional view taken along the line N-N of FIG. 89.

As shown in FIGS. 89 and 90, an inductor coil 1110 is an element in a substantially rectangular annular shape configured of a wound conductor wire. The inductor coil 1110 is buried in a portion near the center part of a core 100 in the lateral direction and above the center part of the core 100 slightly on the rear side in the longitudinal direction, with its axial center direction being diagonally tilted backward from the vertical direction. An axial center part 1110a in a nearly quadrangular prism shape of the inductor coil 1110 is configured of the magnetic material of the core 100, not an air layer.

Figure 91:
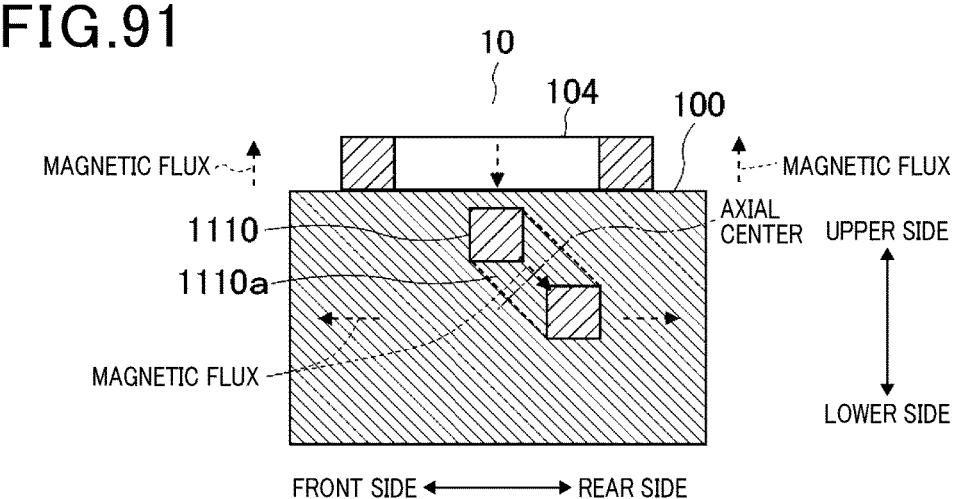
FIG. 91 is a diagram for explaining magnetic flux flow in a power transmission side pad and the inductor coil.

When current is passed through the coil 104 to generate magnetic flux, as shown in FIG. 91, the magnetic flux flows through and around the core 100.

As shown in FIGS. 89 and 90, the inductor coil 1110 is buried in a portion near the center part of the core 100 in the lateral direction and above the center part of the core 100 slightly on the rear side in the longitudinal direction, with its axial center direction being diagonally tilted backward from the vertical direction. Thus, as shown in FIG. 91, the magnetic fluxes generated from the coil 104 are substantially perpendicular to the axial center direction at the axial center part 1110a of the inductor coil 1110, and the coupling coefficient of the inductor coil 1110 to the coil 104 is substantially zero. Consequently, when current is passed through the coil 104 to generate magnetic flux inside and around the core 100, the magnetic flux hardly interlinks with the inductor coil 1110. Accordingly, the influence of the magnetic fluxes generated from the coil 104 can be reduced as much as possible.

Next, the advantageous effects of the contactless power supply system according to the seventeenth embodiment will be described. According to the seventeenth embodiment, advantageous effects similar to those of the fourteenth embodiment can be obtained.

Eighteenth Embodiment

Next, a contactless power supply system according to an eighteenth embodiment will be described. In the contactless power supply system according to the eighteenth embodiment, the configuration of a filter circuit is changed from that of the contactless power supply system according to the seventh embodiment, and the configuration of an inductor coil is changed in association with the change in the filter circuit. Other than the filter circuit and the inductor coil, the configurations are the same as those of the contactless power supply system according to the first embodiment. Thus, referring to FIGS. 92 to 100, only the configurations of the filter circuit and the inductor coil are described, and the description of operations is omitted. Note that, the same components as those of the first embodiment are designated with the same reference numerals to omit duplicate description.

Figure 92:
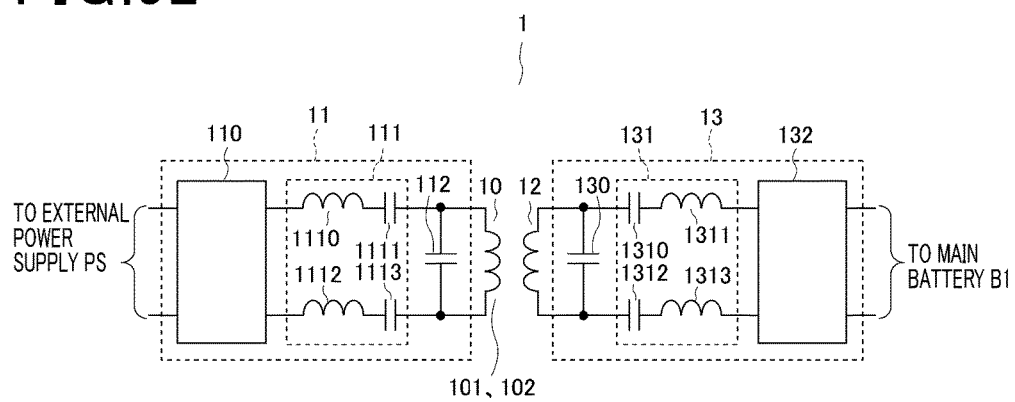
FIG. 92 is a circuit diagram of a power transmission circuit and a power reception circuit of a contactless power supply system according to an eighteenth embodiment.
Figure 93:
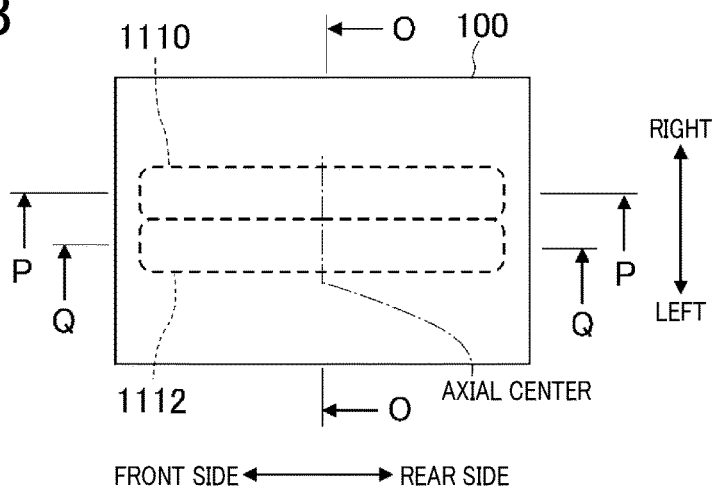
FIG. 93 is a top view of a core for explaining the layout of inductor coils.
Figure 94:
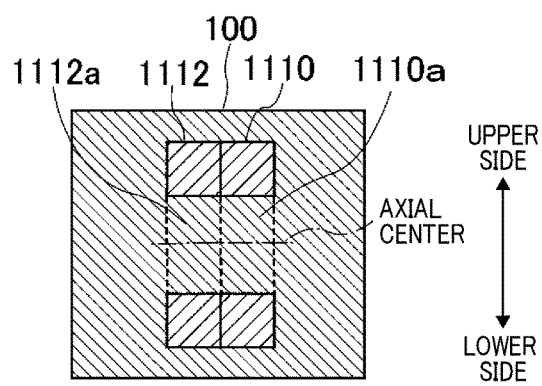
FIG. 94 is a cross-sectional view taken along the line O-O of FIG. 93.
Figure 95:
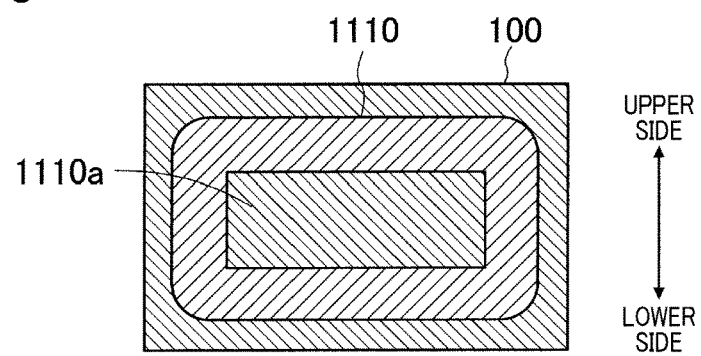
FIG. 95 is a cross-sectional view taken along the line P-P of FIG. 93.
Figure 96:
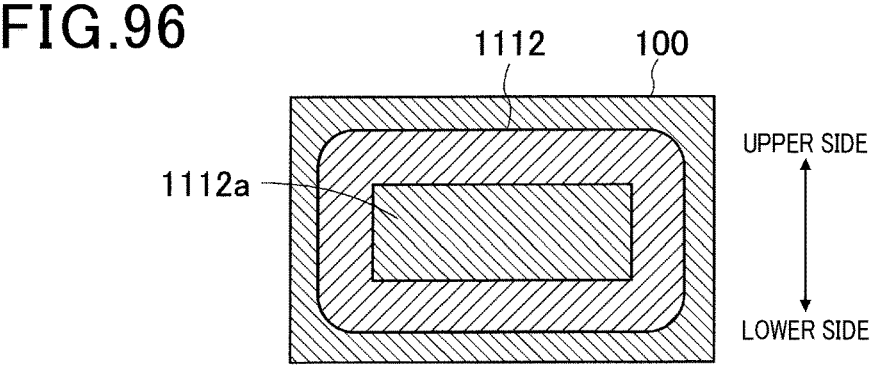
FIG. 96 is a cross-sectional view taken along the line Q-Q of FIG. 93.

As shown in FIG. 92, a filter circuit 111 includes inductor coils 1110 and 1112 and capacitors 1111 and 1113.

As shown in FIGS. 93 to 96, the inductor coils 1110 and 1112 are in a substantially rectangular annular shape configured of a wound conductor wire. The inductor coils 1110 and 1112 are disposed adjacent to each other in the lateral direction, which is the axial center direction, and are buried near the center part of a core 100 in the longitudinal direction, the lateral direction, and the vertical direction, with their axial center directions being the lateral direction. Axial center parts 1110a and 1112a in a nearly quadrangular prism shape of the inductor coils 1110 and 1112 are configured of the magnetic material of the core 100, not an air layer.

Figure 97:
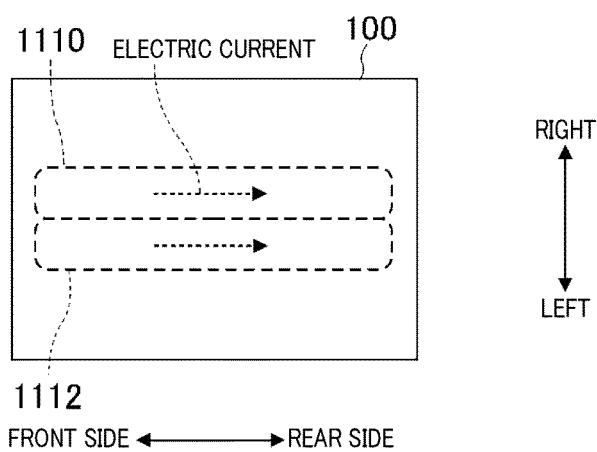
FIG. 97 is a diagram corresponding to FIG. 93 for explaining current flow in the inductor coils.
Figure 98:
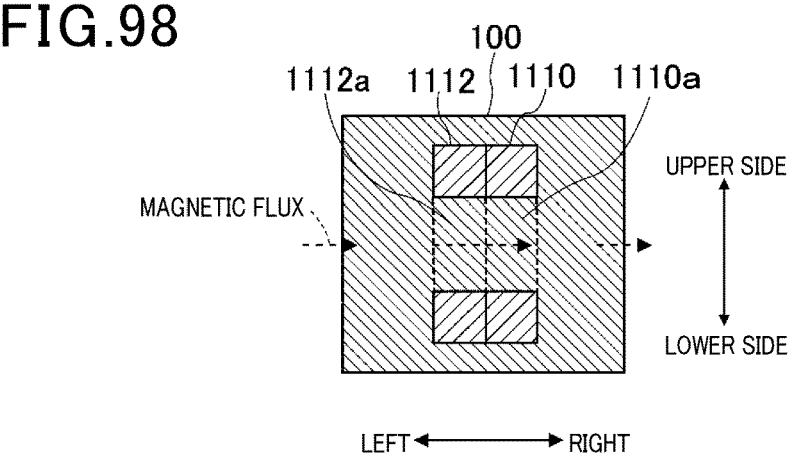
FIG. 98 is a diagram corresponding to FIG. 94 for explaining magnetic flux flow in the inductor coils.
Figure 99:
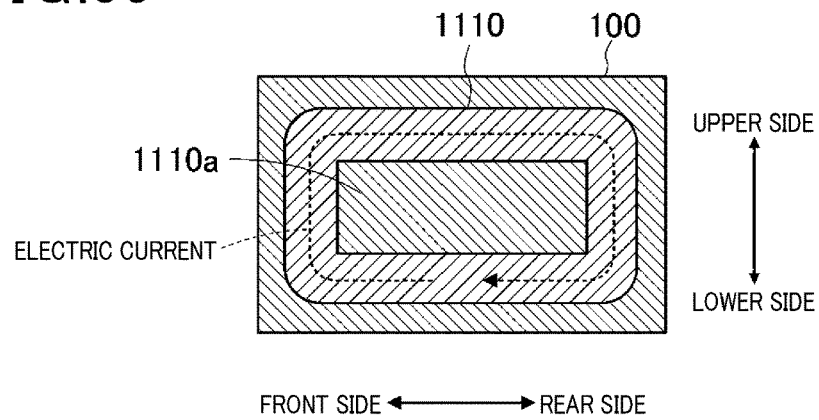
FIG. 99 is a diagram corresponding to FIG. 95 for explaining current flow in the inductor coil.
Figure 100:
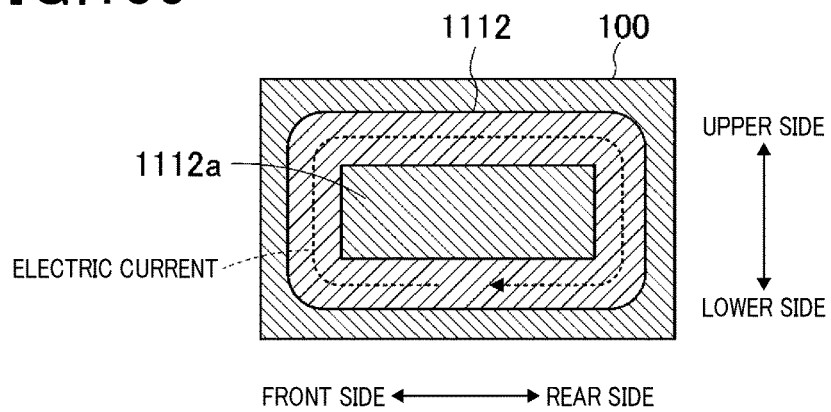
FIG. 100 is a diagram corresponding to FIG. 96 for explaining current flow in the inductor coil.
Figure 101:
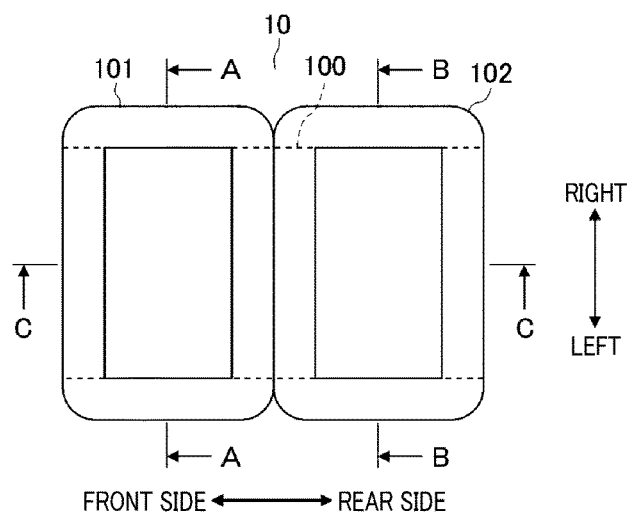
FIG. 101 is a top view of a power transmission side pad according to a nineteenth embodiment.

The inductor coils 1110 and 1112 are arranged in such a manner that magnetic fluxes do not cancel each other, which are generated when current is passed through the filter circuit 111. Specifically, the inductor coils 1110 and 1112 are arranged in such a manner that, when current is passed through the filter circuit 111, a magnetic flux at the axial center part 1110a, which is generated from the inductor coil 1110, and a magnetic flux at the axial center part 1112a, which is generated from the inductor coil 1112, are directed to the same direction. More specifically, the inductor coils 1110 and 1112 are arranged in such a manner that current as shown in FIGS. 97, 99, and 100 flows when current is passed through the filter circuit 111. As shown in FIG. 98, in this case, a magnetic flux at the axial center part 1110a, which is generated from the inductor coil 1110, and a magnetic flux at the axial center part 1112a, which is generated from the inductor coil 1112, are directed in the same direction. Thus, the magnetic fluxes generated from the inductor coil 1110 and the magnetic fluxes generated from the inductor coil 1112 do not cancel each other.

Next, the advantageous effects of the contactless power supply system according to the eighteenth embodiment will be described.

According to the eighteenth embodiment, advantageous effects similar to those of the seventh embodiment can be obtained.

According to the eighteenth embodiment, two inductor coils 1110 and 1112 are provided to one core 100. Thus, the contactless power supply system 1 can be further downsized, compared with the case where two inductor coils having a core are separately provided.

According to the eighteenth embodiment, the inductor coils 1110 and 1112 are disposed adjacent to each other. Accordingly, an event that is an increase in the size of the core 100 can be reduced.

According to the eighteenth embodiment, the inductor coils 1110 and 1112 are arranged in such a manner that magnetic fluxes do not cancel each other, which are generated when current is passed through the filter circuit 111. Accordingly, the characteristics of the filter circuit 111 can be ensured.

Nineteenth Embodiment

First, referring to FIG. 1 and FIGS. 101 to 117, the configuration of a contactless power supply system according to a nineteenth embodiment will be described. Note that, the longitudinal direction, the lateral direction, and the vertical direction in the drawings show the directions in a vehicle. Similarly to the first embodiment, the contactless power supply system according to the present embodiment is applied to the vehicle illustrated in FIG. 1, and the basic circuit configuration of the contactless power supply system is the same. Thus, the configuration is omitted, because the configuration is already described in the first embodiment. In the following, differences will be mainly described.

Figure 102:
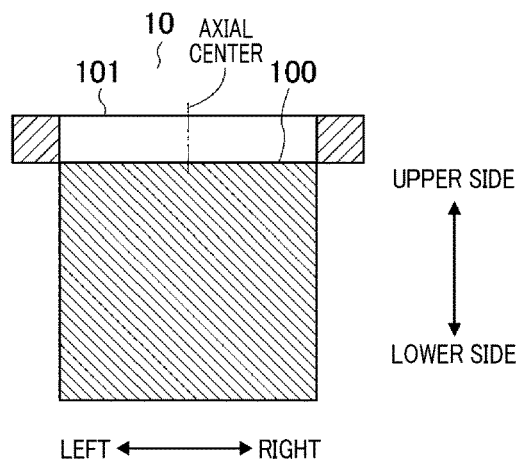
FIG. 102 is a cross-sectional view taken along the line A-A of FIG. 101.
Figure 103:
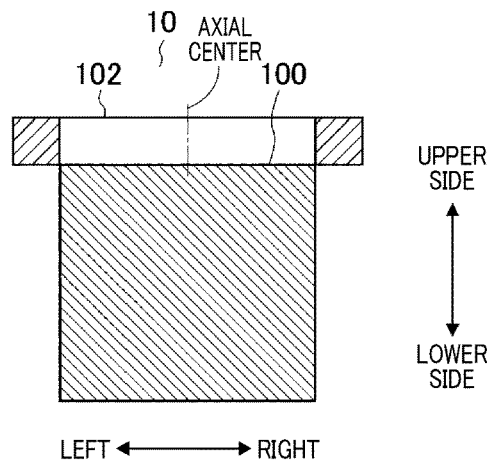
FIG. 103 is a cross-sectional view taken along the line B-B of FIG. 101.
Figure 104:
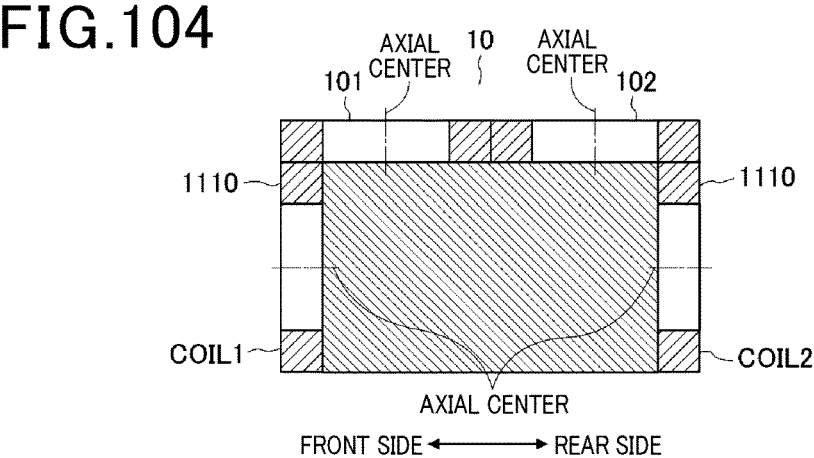
FIG. 104 is a cross-sectional view taken along the line C-C of FIG. 101.

A power transmission side pad 10 is disposed at a predetermined position on the ground surface inside a parking space. At the position, when the vehicle is parked inside the parking space, the power transmission side pad 10 faces a power reception side pad 12 installed in the bottom part of the vehicle, and generates magnetic flux by current being passed therethrough. As shown in FIGS. 101 to 104, the power transmission side pad 10 includes a core 100 (a power supply core) and coils 101 and 102 (power supply coils). FIG. 102 is a cross-sectional view taken along the line A-A in FIG. 101. FIG. 103 is a cross-sectional view taken along the line B-B in FIG. 101. FIG. 5 is a cross-sectional view taken along the line C-C in FIG. 101.

The core 100 is a member formed of a magnetic material in a rectangular parallelepiped shape configuring a magnetic path. Specifically, the core 100 is a member formed of ferrite or a dust core.

Figure 105:
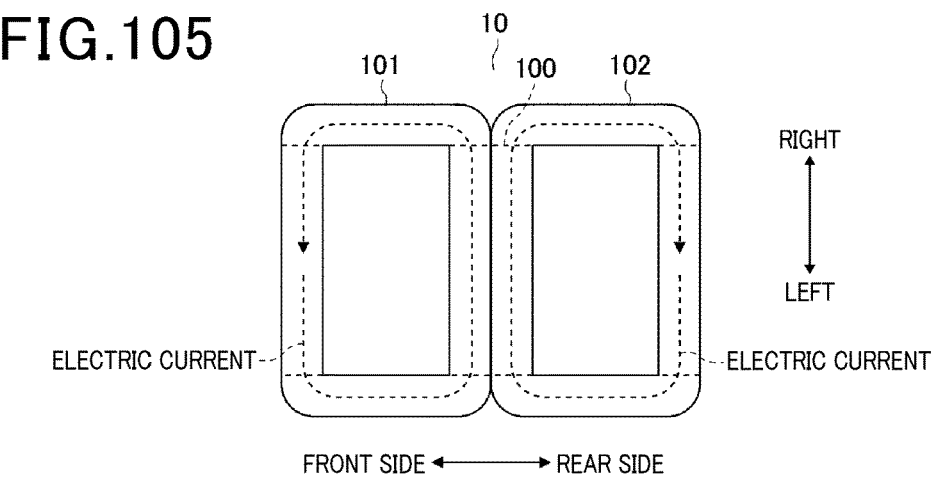
FIG. 105 is a diagram corresponding to FIG. 101 for explaining current flow in a power transmission side pad.
Figure 106:
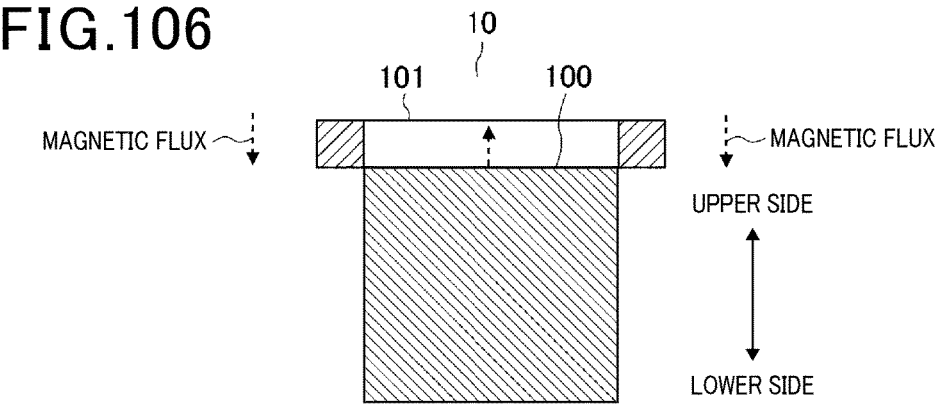
FIG. 106 is a diagram corresponding to FIG. 102 for explaining magnetic flux flow in the power transmission side pad.
Figure 107:
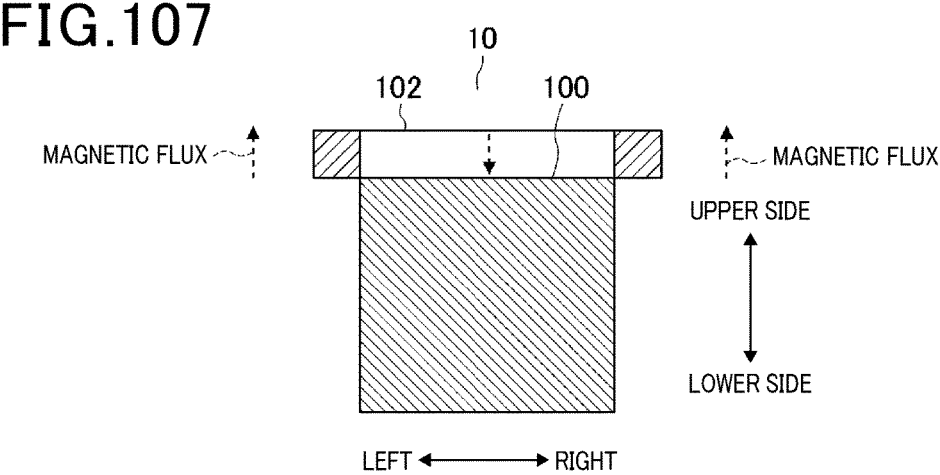
FIG. 107 is a diagram corresponding to FIG. 103 for explaining magnetic flux flow in the power transmission side pad.
Figure 108:
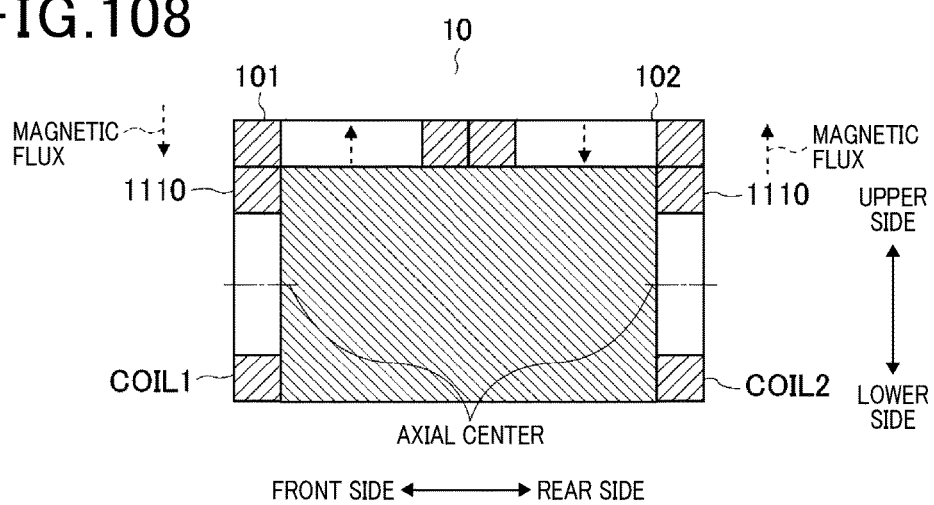
FIG. 108 is a diagram corresponding to FIG. 104 for explaining magnetic flux flow in the power transmission side pad.

The coils 101 and 102 are in a substantially rectangular annular shape configured of a wound conductor wire to generate magnetic flux, with current being passed through the coils. The coils 101 and 102 are disposed adjacent to each other in the longitudinal direction on the top surface of the core 100, with their axial center directions being aligned with the vertical direction to use the core 100 as a magnetic path. The axial center direction of each of the coils 101 and 102 is a normal direction to the inner plane surrounded by the annular coils 101 and 102, the normal direction passing through the axial center of each of the annular coils 101 and 102. Note that, the axial center direction passes through the center of gravity of the annular coils 101 and 102. As shown in FIG. 105, when current is passed through the coils 101 and 102, magnetic flux is generated as shown in FIGS. 106 to 108. When current flows in the reverse direction, a magnetic flux is generated in the reverse direction. FIGS. 106 to 108 are illustrations corresponding to cross-sectional views taken along the lines of FIGS. 102 to 104 for explaining magnetic flux flow in the power transmission side pad.

Figure 109:
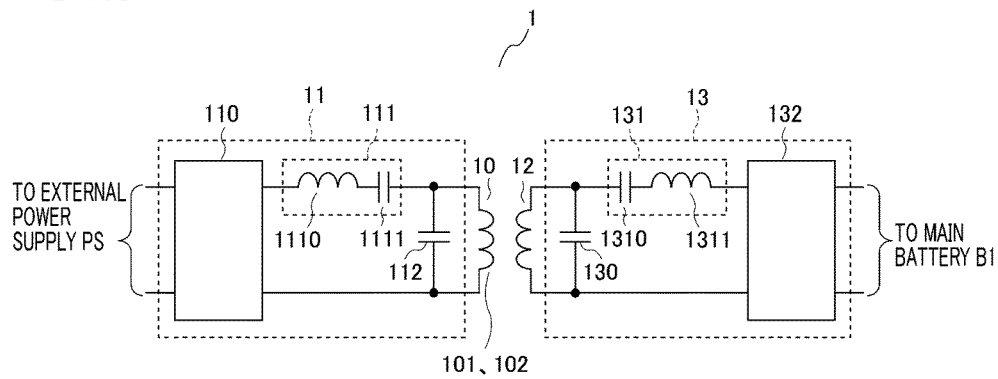
FIG. 109 is a circuit diagram of a power transmission circuit and a power reception circuit illustrated in FIG. 1.

The power transmission circuit 11 illustrated in FIG. 1 transmits and receives information to/from a power reception circuit 13 by radio communication, and converts the output of an external power supply PS into high-frequency alternating current on the basis of the received information, for supply to the power transmission side pad 10. As shown in FIG. 109, the power transmission circuit 11 includes a power conversion circuit 110, a filter circuit 111, and a resonance capacitor 112, and is disposed outside the vehicle.

The power conversion circuit 110 converts the output of the external power supply PS into high-frequency alternating current and outputs the alternating current. The input terminal of the power conversion circuit 110 is connected to the external power supply PS. The output terminal is connected to the filter circuit 111 and the power transmission side pad 10.

The filter circuit 111 removes predetermined frequency components included in the alternating current supplied from the power conversion circuit 110. The filter circuit 111 includes an inductor coil 1110 and a capacitor 1111.

As shown in FIGS. 110 to 112, the inductor coil 1110 is an element in a substantially rectangular annular shape configured of a wound conductor wire. FIG. 112 is a cross-sectional view taken along the line D-D in FIG. 110. The inductor coil 1110 is configured of two coils COIL1 and COIL2 in a substantially rectangular annular shape. The inductor coil 1110 is provided to the core 100 of the power transmission side pad 10 to use the core 100 as a magnetic path.

Figure 113:
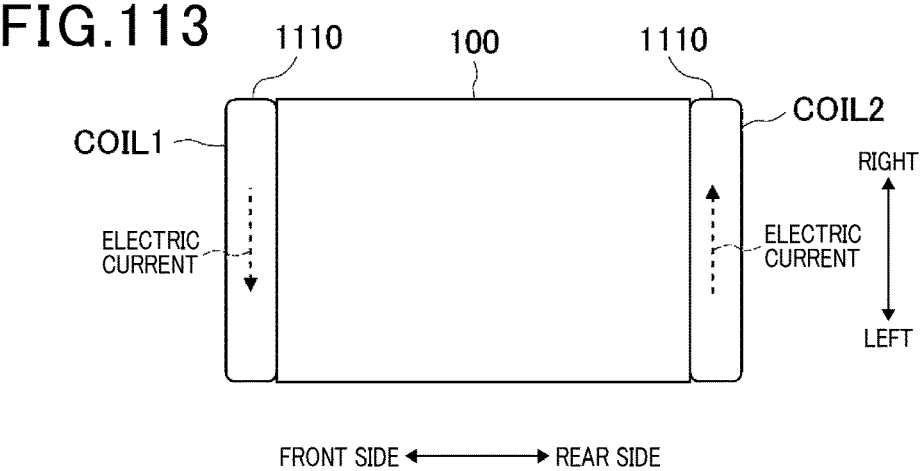
FIG. 113 is a diagram corresponding to FIG. 110 for explaining current flow in the inductor coil.
Figure 114:
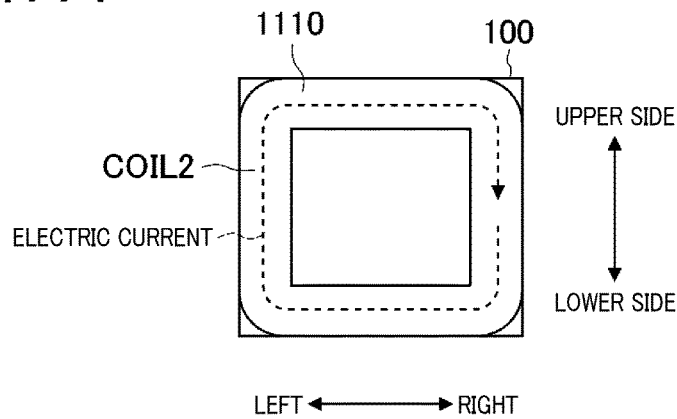
FIG. 114 is a diagram corresponding to FIG. 111 for explaining current flow in the inductor coil.
Figure 115:
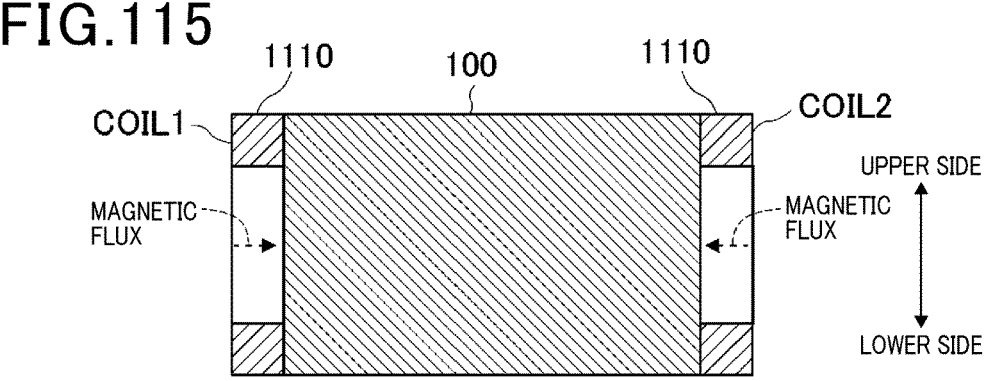
FIG. 115 is a diagram corresponding to FIG. 112 for explaining magnetic flux flow in the inductor coil.

The coils COIL1 and COIL2 are arranged in such a manner that the electric currents induced from the magnetic fluxes generated from the coils 101 and 102 cancel each other. The coil COIL1 is disposed on the front surface of the core 100, with its axial center direction being aligned with the longitudinal direction. The coil COIL2 is disposed on the back surface of the core 100, with its axial center direction being aligned with the longitudinal direction. The axial center direction is a normal direction to the inner plane surrounded by the annular coils COIL1 and COIL2, the normal direction passing through the axial centers of the annular coils COIL1 and COIL2. Note that, the axial center direction passes through the center of gravity of the annular coils COIL1 and COIL2. The coils COIL1 and COIL2 are arranged in such a manner that current as shown in FIG. 113 is passed through the coils COIL1 and COIL2 and 114, when current is passed through the inductor coil 1110. In this case, magnetic fluxes as shown in FIG. 115 are generated. FIG. 115 is a diagram corresponding to the cross-sectional view taken along the line of FIG. 112 for explaining magnetic flux flow in the inductor coils.

Figure 116:
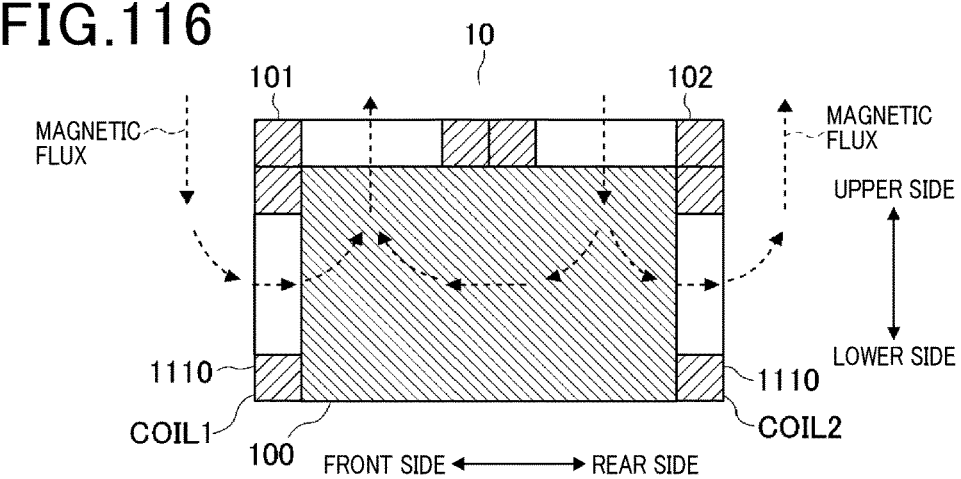
FIG. 116 is a diagram for explaining magnetic flux flow in the power transmission side pad and the inductor coil.
Figure 117:
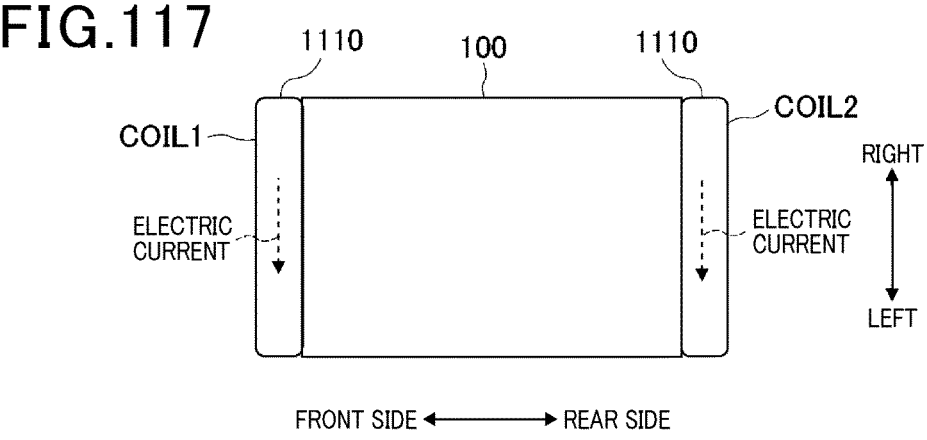
FIG. 117 is a diagram for explaining current flow in the inductor coil generated from magnetic flux in the power transmission side pad.

When current is passed through the coils 101 and 102 as shown in FIG. 105 and magnetic flux is generated as shown in FIGS. 106 to 108, the magnetic flux flows through and around the core 100 as shown in FIG. 116. FIG. 116 is a diagram for explaining magnetic flux flow in the power transmission side pad and the inductor coil. As a result, electric currents as shown in FIG. 117 are induced in the coils COIL1 and COIL2. However, the coils COIL1 and COIL2 are arranged in such a manner that electric currents as shown in FIG. 113 are passed through the coils COIL1 and COIL2. Thus, the electric currents induced from the magnetic fluxes generated from the coils 101 and 102 cancel each other. Accordingly, the influence of the magnetic fluxes generated from the coils 101 and 102 can be reduced as much as possible.

As shown in FIG. 109, the inductor coil 1110 is serially connected to the capacitor 1111. One end of the inductor coil 1110 is connected to the output terminal of the power conversion circuit 110. One end of the capacitor 1111 is connected to the power transmission side pad 10.

The resonance capacitor 112 configures a resonant circuit together with the coils 101 and 102 of the power transmission side pad 10. The resonance capacitor 112 is connected in parallel to the power transmission side pad 10.

The power reception side pad 12 illustrated in FIG. 1 is arranged in the bottom part of the vehicle so as to face the power transmission side pad 10, being vertically spaced apart therefrom, when the vehicle is parked in the parking space. The power reception side pad 12 generates an alternating current by electromagnetic induction caused by the interlinkage of alternating magnetic fluxes generated from the power transmission side pad 10. The power reception side pad 12 includes a core and coils. The power reception side pad 12 has the same configuration as that of the power transmission side pad 10, and is disposed upside down.

The power reception circuit 13 transmits and receives information to/from the power transmission circuit 11 by radio communication and converts the alternating current supplied from the power reception side pad 12 into a direct current on the basis of the received information to charge a main battery B1. As shown in FIG. 109, the power reception circuit 13 includes a resonance capacitor 130, a filter circuit 131, and a power conversion circuit 132.

The resonance capacitor 130 configures a resonant circuit together with the coils of the power reception side pad 12. The resonance capacitor 130 is connected in parallel to the power reception side pad 12.

The filter circuit 131 removes predetermined frequency components included in the alternating current supplied from the power reception side pad 12, to which the resonance capacitor 130 is connected. The filter circuit 131 includes a capacitor 1310 and an inductor coil 1311.

The inductor coil 1311 has the same configuration as that of the inductor coil 1110, and is provided to the core of the power reception side pad 12 to use the core as a magnetic path. Thus, similarly to the inductor coil 1110, the inductor coil 1311 can reduce the influence of the magnetic fluxes generated from the coils of the power reception side pad 12 as much as possible.

The capacitor 1310 is serially connected to the inductor coil 1311. One end of the capacitor 1310 is connected to the power reception side pad 12. One end of the inductor coil 1311 is connected to the power conversion circuit 132.

The power conversion circuit 132 converts the alternating current supplied through the filter circuit 131 into a direct current, for supply to the main battery B1. The input terminal of the power conversion circuit 132 is connected to the filter circuit 131 and the power reception side pad 12. The output terminal is connected to the main battery B1.

Next, referring to FIGS. 1 and 109, the operation of the contactless power supply system will be described.

As shown in FIG. 1, when the vehicle is parked in the parking space, the power transmission side pad 10 faces the power reception side pad 12, being vertically spaced apart from each other by a predetermined distance. In this state, after a charge start button (not shown) is pressed to instruct the start of charging, the power transmission circuit 11 and the power reception circuit 13 transmit and receive information by radio communication.

The power conversion circuit 110 illustrated in FIG. 109 converts the output of the external power supply PS into high-frequency alternating current and outputs the alternating current. The filter circuit 111 removes predetermined frequency components included in the alternating current supplied from the power conversion circuit 110. The power transmission side pad 10, to which the resonance capacitor 112 is connected, generates alternating magnetic flux, with the alternating current being supplied through the filter circuit 111.

As shown in FIG. 116, the magnetic fluxes generated from the power transmission side pad 10 flows through and around the core 100. As a result, electric currents as shown in FIG. 117 are induced in the coils COIL1 and COIL2. However, the coils COIL1 and COIL2 are arranged in such a manner that electric currents as shown in FIG. 113 are passed through the coils COIL1 and COIL2. Thus, the electric currents induced from the magnetic fluxes generated from the coils 101 and 102 cancel each other. Consequently, the influence of the magnetic fluxes generated from the coils 101 and 102 can be reduced as much as possible. Accordingly, the characteristics of the filter circuit 111 can be ensured.

The power reception side pad 12, to which the resonance capacitor 130 is connected, generates an alternating current by electromagnetic induction caused by the interlinkage of the alternating magnetic fluxes generated from the power transmission side pad 10. The filter circuit 131 removes predetermined frequency components included in the alternating current supplied from the power reception side pad 12, to which the resonance capacitor 130 is connected.

The magnetic fluxes generated from the power reception side pad 12 flows through and around the core. However, the inductor coil 1311 has the same configuration as that of the inductor coil 1110. Thus, the electric currents induced from the magnetic fluxes generated from the coils of the power reception side pad 12 cancel each other. Consequently, the influence of the magnetic fluxes generated from the coils of the power reception side pad 12 can be reduced as much as possible. Accordingly, the characteristics of the filter circuit 131 can be ensured.

The power conversion circuit 132 converts the alternating current supplied through the filter circuit 131 into a direct current, for supply to the main battery B1. In this manner, electric power can be transmitted from the external power supply PS to the main battery B1 in a contactless manner to charge the main battery B1.

Next, the advantageous effects of the contactless power supply system according to the nineteenth embodiment will be described.

According to the nineteenth embodiment, the inductor coil 1110 of the filter circuit 11 is provided to the core 100 of the power transmission side pad 10, to which the filter circuit 11 is connected, and uses the core 100 as a magnetic path. In other words, the inductor coil 1110 uses the core 100 of the power transmission side pad 10 as the core configuring the magnetic path of the inductor coil 1110. Thus, the present embodiment is applicable to a mode in which no transformer is provided. Further, the contactless power supply system 1 can be downsized, compared with the case where an inductor coil having a core is separately provided. Moreover, the inductor coil 1110 is formed of two coils COIL1 and COIL2, and is configured to include the coils COIL1 and COIL2 which are arranged in such a manner that the electric currents induced from the magnetic fluxes generated from the coils 101 and 102 of the power transmission side pad 10 cancel each other. Thus, the coupling coefficient of the inductor coil 1110 to the coils 101 and 102 is substantially zero, reducing the influence of the magnetic fluxes generated from the coils 101 and 102 as much as possible. Accordingly, the characteristics of the filter circuit 111 can be ensured.

According to the nineteenth embodiment, the inductor coil 1110 is provided to the surface of the core 100. Thus, the inductor coil having the core can be easily configured.

Twentieth Embodiment

Next, a contactless power supply system according to a twentieth embodiment will be described. In the contactless power supply system according to the twentieth embodiment, only the shape and disposition of an inductor coil are changed from the contactless power supply system according to the nineteenth embodiment. Other than the inductor coil, the configurations are the same as those of the contactless power supply system according to the first embodiment. Thus, referring to FIGS. 118 to 125, only the configuration of the inductor coil is described, and the description of operations is omitted. Note that, the same components as those of the nineteenth embodiment are designated with the same reference numerals to omit duplicate description.

As shown in FIGS. 118 to 120, an inductor coil 1110 is an element in a substantially rectangular annular shape configured of a wound conductor wire. FIG. 120 is a cross-sectional view taken along the line E-E in FIG. 118. The inductor coil 1110 is configured of two coils COIL1 and COIL2 in a substantially rectangular annular shape. The inductor coil 1110 is provided to a core 100 of a power transmission side pad 10 to use the core 100 as a magnetic path.

Figure 121:
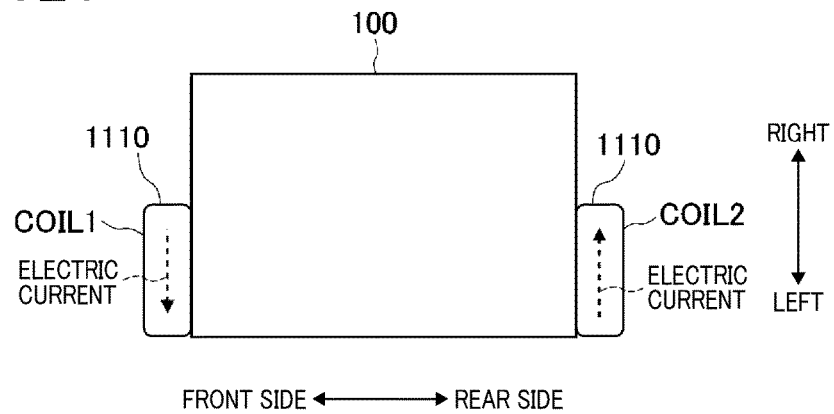
Figure 122:
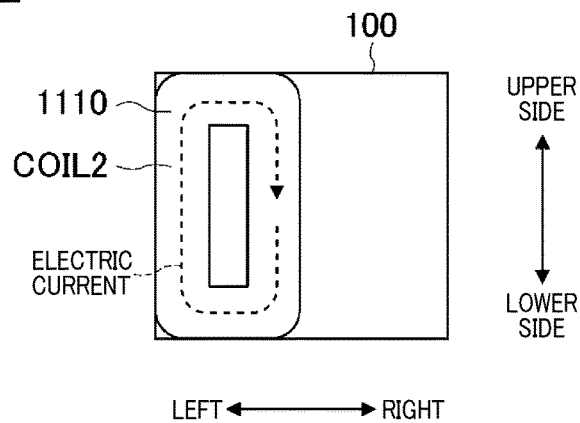
Figure 123:
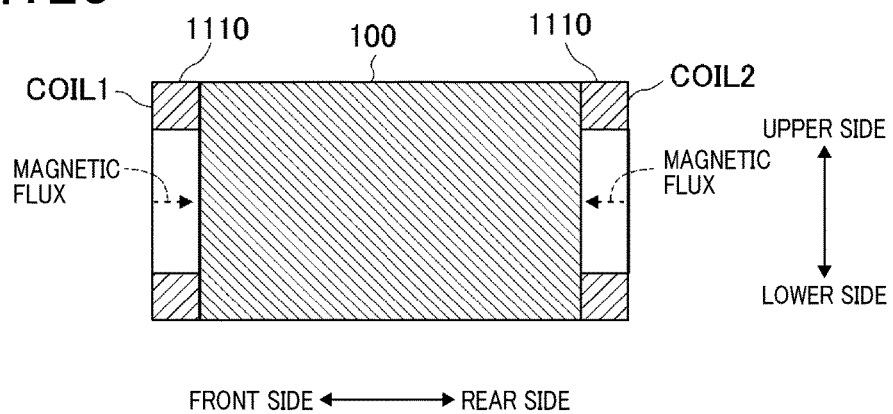

The coils COIL1 and COIL2 are arranged in such a manner that the electric currents induced from the magnetic fluxes generated from the coils 101 and 102 cancel each other. The coil COIL1 is disposed on the front surface of the core 100 on the left side of the center part in the lateral direction, with its axial center direction being aligned with the longitudinal direction. The coil COIL2 is disposed on the back surface of the core 100 on the left side of the center part in the lateral direction, with its axial center direction being aligned with the longitudinal direction. The coils COIL1 and COIL2 are arranged in such a manner that current as shown in FIGS. 121 and 122 is passed through the coils COIL1 and COIL2 when current is passed through the inductor coil 1110. In this case, magnetic fluxes as shown in FIG. 123 are generated. FIG. 123 is a diagram corresponding to the cross-sectional view taken along the line of FIG. 120 for explaining magnetic flux flow in the inductor coil 1110.

Figure 124:
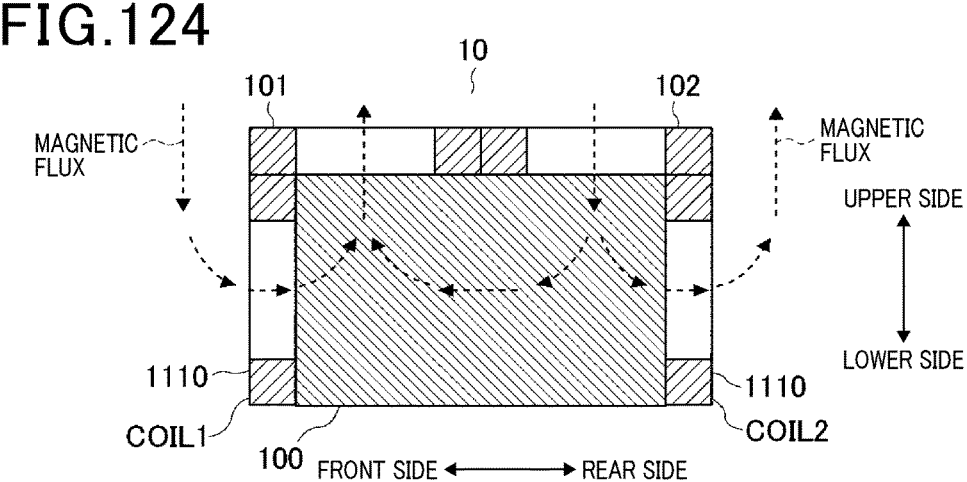
Figure 125:
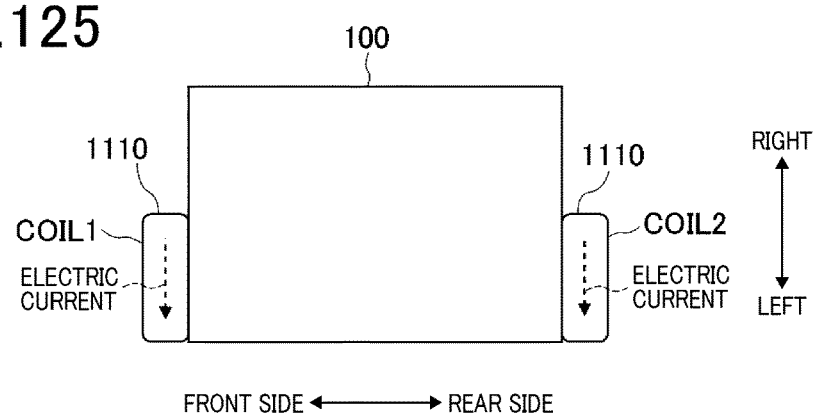

When current is passed through the coils 101 and 102 to generate magnetic flux, the magnetic flux flows through and around the core 100 as shown in FIG. 124. FIG. 124 is a diagram for explaining magnetic flux flow in the power transmission side pad and the inductor coil. As a result, electric currents as shown in FIG. 125 are induced in the coils COIL1 and COIL2. However, the coils COIL1 and COIL2 are arranged in such a manner that electric currents as shown in FIG. 121 are passed through the coils COIL1 and COIL2. Thus, the electric currents induced from the magnetic fluxes generated from the coils 101 and 102 cancel each other. Accordingly, the influence of the magnetic fluxes generated from the coils 101 and 102 can be reduced as much as possible.

Next, the advantageous effects of the contactless power supply system according to the twentieth embodiment will be described. According to the twentieth embodiment, advantageous effects similar to those of the nineteenth embodiment can be obtained.

Twenty-first Embodiment

Next, a contactless power supply system according to a twenty-first embodiment will be described. In the contactless power supply system according to the twenty-first embodiment, only the shape and disposition of an inductor coil are changed from the contactless power supply system according to the nineteenth embodiment. Other than the inductor coil, the configurations of the present embodiment are the same as those of the contactless power supply system according to the nineteenth embodiment. Thus, referring to FIGS. 126 to 131, only the configuration of the inductor coil is described, and the description of operations is omitted. Note that, the same components as those of the nineteenth embodiment are designated with the same reference numerals to omit duplicate description.

As shown in FIGS. 126 and 127, an inductor coil 1110 is in a substantially rectangular annular shape configured of a wound conductor wire. FIG. 127 is a cross-sectional view taken along the line F-F in FIG. 126. The inductor coil 1110 is configured of two coils COIL1 and COIL2 in a substantially rectangular annular shape. The inductor coil 1110 is provided to a core 100 of a power transmission side pad 10 to use the core 100 as a magnetic path.

Figure 128:
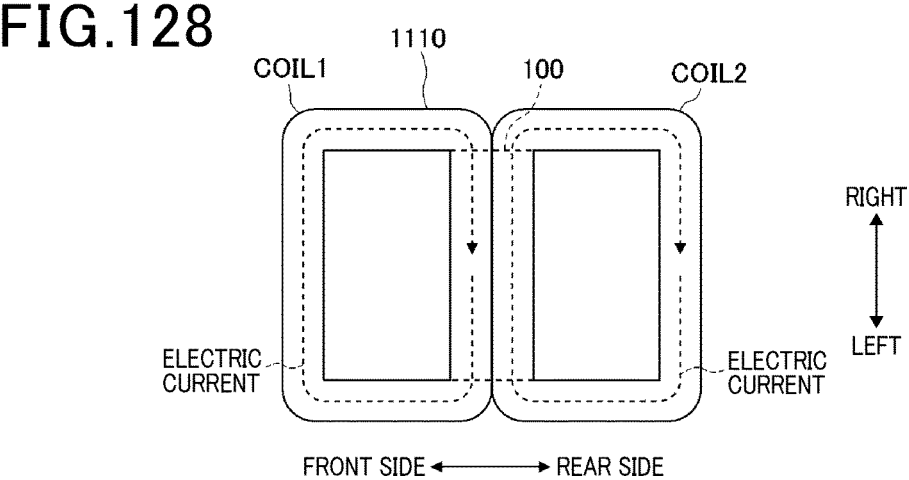
Figure 129:
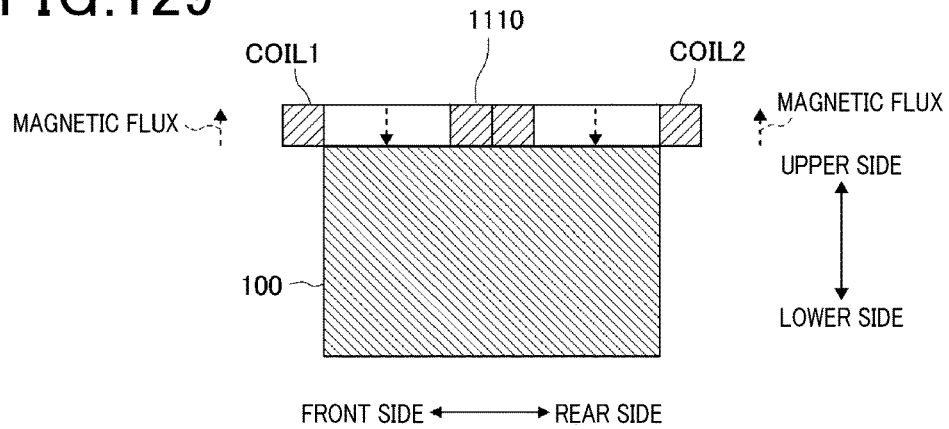

The coils COIL1 and COIL2 are arranged in such a manner that electric currents induced from the magnetic fluxes generated from coils 101 and 102 cancel each other. The coil COIL1 is disposed on the top surface of the core 100 on the front side of the center part in the longitudinal direction, with its axial center direction being aligned with the vertical direction. The coil COIL2 is disposed on the top surface of the core 100 on the rear side of the center part in the longitudinal direction, with its axial center direction being aligned with the vertical direction. The coils COIL1 and COIL2 are arranged in such a manner that current as shown in FIG. 128 is passed through the coils COIL1 and COIL2 when current is passed through the inductor coil 1110. In this case, magnetic fluxes as shown in FIG. 129 are generated. FIG. 129 is a diagram corresponding to the cross-sectional view taken along the line of FIG. 127 for explaining magnetic flux flow in the inductor coil.

Figure 130:
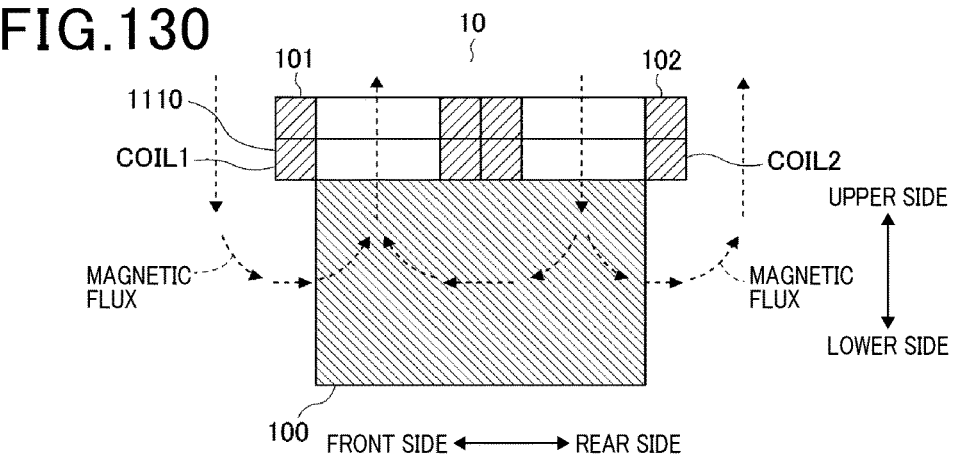
Figure 131:
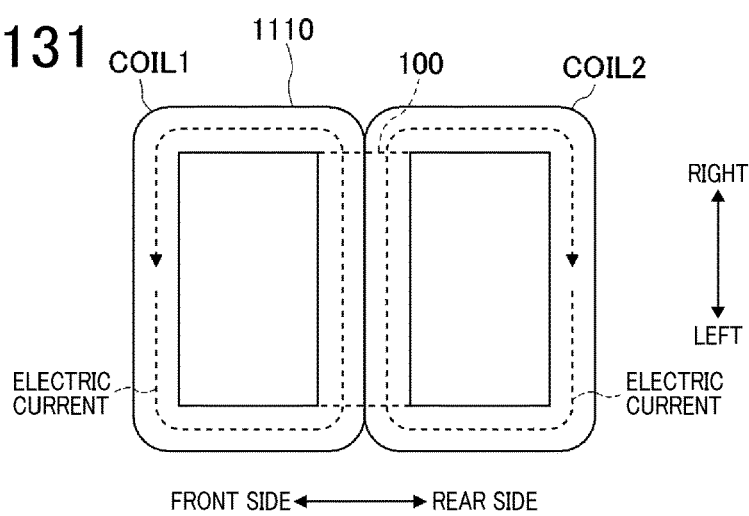

When current is passed through the coils 101 and 102 to generate magnetic fluxes, the magnetic flux flows through and around the core 100 as shown in FIG. 120. FIG. 130 is a diagram for explaining magnetic flux flow in the power transmission side pad and the inductor coil. As a result, electric currents as shown in FIG. 130 are induced in the coils COIL1 and COIL2. However, the coils COIL1 and COIL2 are arranged in such a manner that electric currents as shown in FIG. 128 are passed through the coils COIL1 and COIL2. Thus, the electric currents induced from the magnetic fluxes generated from the coils 101 and 102 cancel each other. Accordingly, the influence of the magnetic fluxes generated from the coils 101 and 102 can be reduced as much as possible.

Next, the advantageous effects of the contactless power supply system according to the twenty-first embodiment will be described. According to the twenty-first embodiment, advantageous effects similar to those of the nineteenth embodiment can be obtained.

Twenty-second Embodiment

Next, a contactless power supply system according to a twenty-second embodiment will be described. In the contactless power supply system according to the twenty-second embodiment, only the shape and disposition of an inductor coil are changed from the contactless power supply system according to the nineteenth embodiment. Other than the inductor coil, the configurations of the present embodiment are the same as those of the contactless power supply system according to the nineteenth embodiment. Thus, referring to FIGS. 132 to 142, only the configuration of the inductor coil is described, and the description of operations is omitted. Note that, the same components as those of the nineteenth embodiment are designated with the same reference numerals to omit duplicate description.

As shown in FIGS. 132 to 135, an inductor coil 1110 is in a substantially rectangular annular shape configured of a wound conductor wire. FIG. 134 is a cross-sectional view taken along the line G-G in FIG. 132. FIG. 135 is a cross-sectional view taken along the line H-H in FIG. 132. The inductor coil 1110 is configured of two coils COIL1 and COIL2 in a substantially rectangular annular shape. The inductor coil 1110 is provided to a core 100 of a power transmission side pad 10 to use the core 100 as a magnetic path.

The coils COIL1 and COIL2 are arranged in such a manner that electric currents induced from magnetic fluxes generated from coils 101 and 102 cancel each other. The coil COIL1 is disposed on the left side surface of the core 100 on the front side of the center part in the longitudinal direction, with its axial center direction being aligned with the lateral direction. The coil COIL2 is disposed on the left side surface of the core 100 on the rear side of the center part in the longitudinal direction, with its axial center direction being aligned with the lateral direction. The coils COIL1 and COIL2 are arranged in such a manner that current as shown in FIGS. 136 and 137 is passed through the coils COIL1 and COIL2 when current is passed through the inductor coil 1110. In this case, magnetic fluxes as shown in FIGS. 138 and 139 are generated. FIGS. 138 and 139 are diagrams corresponding to the cross-sectional views taken along the lines of FIGS. 134 and 135 for explaining magnetic flux flow in the inductor coil.

When current is passed through the coils 101 and 102 to generate magnetic flux, the magnetic flux flows through and around the core 100 as shown in FIGS. 140 and 141. FIGS. 140 and 141 are diagrams for explaining magnetic flux flow in the power transmission side pad and the inductor coil. As a result, electric currents as shown in FIG. 142 are induced in the coils COIL1 and COIL2. However, the coils COIL1 and COIL2 are arranged in such a manner that electric currents as shown in FIG. 137 are passed through the coils COIL1 and COIL2. Thus, the electric currents induced from the magnetic fluxes generated from the coils 101 and 102 cancel each other. Accordingly, the influence of the magnetic fluxes generated from the coils 101 and 102 can be reduced as much as possible.

Next, the advantageous effects of the contactless power supply system according to the twenty-second embodiment will be described. According to the twenty-second embodiment, advantageous effects similar to those of the nineteenth embodiment can be obtained.

Twenty-third Embodiment

Next, a contactless power supply system according to a twenty-third embodiment will be described. In the contactless power supply system according to the twenty-third embodiment, only the shape and disposition of an inductor coil are changed from the contactless power supply system according to the nineteenth embodiment. Other than the inductor coil, the configurations of the present embodiment are the same as those of the contactless power supply system according to the nineteenth embodiment. Thus, referring to FIGS. 143 to 153, only the configuration of the inductor coil is described, and the description of operations is omitted. Note that, the same components as those of the nineteenth embodiment are designated with the same reference numerals to omit duplicate description.

As shown in FIGS. 143 to 146, an inductor coil 1110 is in a substantially rectangular annular shape configured of a wound conductor wire. FIG. 146 is a cross-sectional view taken along the line I-I in FIG. 143. The inductor coil 1110 is configured of two coils COIL1 and COIL2 in a substantially rectangular annular shape. The inductor coil 1110 is provided to a core 100 of a power transmission side pad 10 to use the core 100 as a magnetic path.

The coils COIL1 and COIL2 are arranged in such a manner that electric currents induced from magnetic fluxes generated from coils 101 and 102 cancel each other. The coil COIL1 is disposed on the left side surface of the core 100 on the rear side of the center part in the longitudinal direction, with its axial center direction being aligned with the lateral direction. The coil COIL2 is disposed on the right side surface of the core 100 on the rear side of the center part in the longitudinal direction, with its axial center direction being aligned with the lateral direction. The coils COIL1 and COIL2 are arranged in such a manner that current as shown in FIGS. 147 to 149 is passed through the coils COIL1 and COIL2 when current is passed through the inductor coil 1110. In this case, magnetic fluxes as shown in FIG. 150 are generated. FIG. 150 is a diagram corresponding to the cross-sectional view taken along the line of FIG. 146 for explaining magnetic flux flow in the inductor coil.

When current is passed through the coils 101 and 102 to generate magnetic flux, the magnetic flux flows through and around the core 100 as shown in FIG. 151. FIG. 151 is a diagram for explaining magnetic flux flow in the power transmission side pad and the inductor coil. As a result, electric currents as shown in FIGS. 152 and 153 are induced in the coils COIL1 and COIL2. However, the coils COIL1 and COIL2 are arranged in such a manner that electric currents as shown in FIGS. 148 and 149 are passed through the coils COIL1 and COIL2. Thus, the electric currents induced from the magnetic fluxes generated from the coils 101 and 102 cancel each other. Accordingly, the influence of the magnetic fluxes generated from the coils 101 and 102 can be reduced as much as possible.

Next, the advantageous effects of the contactless power supply system according to the twenty-third embodiment will be described. According to the twenty-third embodiment, advantageous effects similar to those of the nineteenth embodiment can be obtained.

Twenty-fourth Embodiment

Next, a contactless power supply system according to a twenty-fourth embodiment will be described. In the contactless power supply system according to the twenty-fourth embodiment, only the shape and disposition of an inductor coil are changed from the contactless power supply system according to the nineteenth embodiment. Other than the inductor coil, the configurations of the present embodiment are the same as those of the contactless power supply system according to the nineteenth embodiment. Thus, referring to FIGS. 154 to 160, only the configuration of the inductor coil is described, and the description of operations is omitted. Note that, the same components as those of the nineteenth embodiment are designated with the same reference numerals to omit duplicate description.

As shown in FIGS. 154 to 156, an inductor coil 1110 is in a substantially rectangular annular shape configured of a wound conductor wire. FIG. 156 is a cross-sectional view taken along the line J-J in FIG. 154. The inductor coil 1110 is configured of two coils COIL1 and COIL2 in a substantially rectangular annular shape. The inductor coil 1110 is provided to a core 100 of a power transmission side pad 10 to use the core 100 as a magnetic path.

The coils COIL1 and COIL2 are arranged in such a manner that electric currents induced from magnetic fluxes generated from coils 101 and 102 cancel each other. The coil COIL1 is buried near the center part of the core 100 in the longitudinal direction on the upper side of the center part in the vertical direction, with its axial center direction being aligned with the longitudinal direction. An axial center part 1110a in a nearly quadrangular prism shape of the coil COIL1 is configured of the magnetic material of the core 100, not an air layer. The coil COIL2 is buried near the center part of the core 100 in the longitudinal direction on the lower side of the center part in the vertical direction so as to be located adjacent to the coil COIL1, with its axial center direction being aligned with the longitudinal direction. An axial center part 1110b in a nearly quadrangular prism shape of the coil COIL2 is configured of the magnetic material of the core 100, not an air layer. The axial center parts 1110a and 1110b are inner parts surrounded by the annular coils COIL1 and COIL2, and are columnar parts extending in the axial center direction. The coils COIL1 and COIL2 are arranged in such a manner that current as shown in FIG. 157 is passed through the coils COIL1 and COIL2 when current is passed through the inductor coil 1110. In this case, magnetic fluxes as shown in FIG. 158 are generated. FIG. 158 is a diagram corresponding to the cross-sectional view taken along the line of FIG. 156 for explaining magnetic flux flow in the inductor coil.

When current is passed through the coils 101 and 102 to generate magnetic flux, the magnetic flux flows through and around the core 100 as shown in FIG. 159. FIG. 159 is a diagram for explaining magnetic flux flow in the power transmission side pad and the inductor coil. As a result, electric currents as shown in FIG. 160 are induced in the coils COIL1 and COIL2. However, the coils COIL1 and COIL2 are arranged in such a manner that electric currents as shown in FIG. 157 are passed through the coils COIL1 and COIL2. Thus, the electric currents induced from the magnetic fluxes generated from the coils 101 and 102 cancel each other. Accordingly, the influence of the magnetic fluxes generated from the coils 101 and 102 can be reduced as much as possible.

Next, the advantageous effects of the contactless power supply system according to the twenty-fourth embodiment will be described.

According to the twenty-fourth embodiment, similarly to the nineteenth embodiment, the contactless power supply system 1 can be downsized, compared with the case where an inductor coil having a core is separately provided. Moreover, the characteristics of the filter circuit 111 can be ensured.

According to the twenty-fourth embodiment, the inductor coil 1110 is buried in the core 100. Thus, the magnetic fluxes generated from the inductor coil 1110 are not easily leaked to the outside of the core 100. In other words, the magnetic fluxes generated from the inductor coil 1110 are hardly interlinked to the coils 101 and 102 disposed on the top surface of the core 100. Accordingly, the influence of the magnetic fluxes generated from the inductor coil 1110 can be reduced as much as possible.

Twenty-fifth Embodiment

Next, a contactless power supply system according to a twenty-fifth embodiment will be described. In the contactless power supply system according to the twenty-fifth embodiment, only the shape and disposition of an inductor coil are changed from the contactless power supply system according to the nineteenth embodiment. Other than the inductor coil, the configurations are the same as those of the contactless power supply system according to the first embodiment. Thus, referring to FIGS. 161 to 167, only the configuration of the inductor coil is described, and the description of operations is omitted. Note that, the same components as those of the nineteenth embodiment are designated with the same reference numerals to omit duplicate description.

As shown in FIGS. 161 to 163, an inductor coil 1110 is in a substantially rectangular annular shape configured of a wound conductor wire. FIG. 163 is a cross-sectional view taken along the line K-K in FIG. 161. The inductor coil 1110 is configured of two coils COIL1 and COIL2 in a substantially rectangular annular shape. The inductor coil 1110 is provided to a core 100 of a power transmission side pad 10 to use the core 100 as a magnetic path.

The coils COIL1 and COIL2 are arranged in such a manner that electric currents induced from magnetic fluxes generated from coils 101 and 102 cancel each other. The coil COIL1 is buried slightly on the rear side of the center part of the core 100 in the longitudinal direction on the upper side of the center part in the vertical direction, with its axial center direction being aligned with the longitudinal direction. An axial center part 1110a in a nearly quadrangular prism shape of the coil COIL1 is configured of the magnetic material of the core 100, not an air layer. The coil COIL2 is buried slightly on the rear side of the center part of the core 100 in the longitudinal direction on the lower side of the center part in the vertical direction so as to be located adjacent to the coil COIL1, with its axial center direction being aligned with the longitudinal direction. An axial center part 1110b in a nearly quadrangular prism shape of the coil COIL2 is configured of the magnetic material of the core 100, not an air layer. The coils COIL1 and COIL2 are arranged in such a manner that current as shown in FIG. 164 is passed through the coils COIL1 and COIL2 when current is passed through the inductor coil 1110. In this case, magnetic fluxes as shown in FIG. 165 are generated. FIG. 165 is a diagram corresponding to the cross-sectional view taken along the line of FIG. 163 for explaining magnetic flux flow in the inductor coil.

When current is passed through the coils 101 and 102 to generate magnetic flux, the magnetic flux flows through and around the core 100 as shown in FIG. 166. FIG. 166 is a diagram for explaining magnetic flux flow in the power transmission side pad and the inductor coil. As a result, electric currents as shown in FIG. 167 are induced in the coils COIL1 and COIL2. However, the coils COIL1 and COIL2 are arranged in such a manner that electric currents as shown in FIG. 164 are passed through the coils COIL1 and COIL2. Thus, the electric currents induced from the magnetic fluxes generated from the coils 101 and 102 cancel each other. Consequently, the influence of the magnetic fluxes generated from the coils 101 and 102 can be reduced as much as possible.

Next, the advantageous effects of the contactless power supply system according to the twenty-fifth embodiment will be described. According to the twenty-fifth embodiment, advantageous effects similar to those of the twenty-fourth embodiment can be obtained.

Twenty-sixth Embodiment

Next, a contactless power supply system according to a twenty-sixth embodiment will be described. In the contactless power supply system according to the twenty-sixth embodiment, only the shape and disposition of an inductor coil are changed from the contactless power supply system according to the nineteenth embodiment. Other than the inductor coil, the configurations are the same as those of the contactless power supply system according to the first embodiment. Thus, referring to FIGS. 168 to 173, only the configuration of the inductor coil is described, and the description of operations is omitted. Note that, the same components as those of the nineteenth embodiment are designated with the same reference numerals to omit duplicate description.

As shown in FIGS. 168 and 169, an inductor coil 1110 is in a substantially rectangular annular shape configured of a wound conductor wire. FIG. 169 is a cross-sectional view taken along the line L-L in FIG. 168. The inductor coil 1110 is configured of two coils COIL1 and COIL2 in a substantially rectangular annular shape. The inductor coil 1110 is provided to a core 100 of a power transmission side pad 10 to use the core 100 as a magnetic path.

The coils COIL1 and COIL2 are arranged in such a manner that electric currents induced from magnetic fluxes generated from coils 101 and 102 cancel each other. The coil COIL1 is buried near the center part of the core 100 in the vertical direction on the front side of the center part in the longitudinal direction, with its axial center direction being aligned with the vertical direction. An axial center part 1110a in a nearly quadrangular prism shape of the coil COIL1 is configured of the magnetic material of the core 100, not an air layer. The coil COIL2 is buried near the center part of the core 100 in the vertical direction on the rear side of the center part in the longitudinal direction so as to be located adjacent to the coil COIL1, with its axial center direction being aligned with the vertical direction. An axial center part 1110b in a nearly quadrangular prism shape of the coil COIL2 is configured of the magnetic material of the core 100, not an air layer. The coils COIL1 and COIL2 are arranged in such a manner that current as shown in FIG. 170 is passed through the coils COIL1 and COIL2 when current is passed through the inductor coil 1110. In this case, magnetic fluxes as shown in FIG. 171 are generated. FIG. 171 is a diagram corresponding to the cross-sectional view taken along the line of FIG. 169 for explaining magnetic flux flow in the inductor coil.

When current is passed through the coils 101 and 102 to generate magnetic flux, the magnetic flux flows through and around the core 100 as shown in FIG. 172. FIG. 172 is a diagram for explaining magnetic flux flow in the power transmission side pad and the inductor coil. As a result, electric currents as shown in FIG. 173 are induced in the coils COIL1 and COIL2. However, the coils COIL1 and COIL2 are arranged in such a manner that electric currents as shown in FIG. 170 are passed through the coils COIL1 and COIL2. Thus, the electric currents induced from the magnetic fluxes generated from the coils 101 and 102 cancel each other. Accordingly, the influence of the magnetic fluxes generated from the coils 101 and 102 can be reduced as much as possible.

Twenty-seventh Embodiment

Next, a contactless power supply system according to a twenty-seventh embodiment will be described. In the contactless power supply system according to the twenty-seventh embodiment, only the configurations of the coils of a power transmission side pad and a power reception side pad are changed from the contactless power supply system according to the nineteenth embodiment. Other than the coils of the power transmission side pad and the power reception side pad, the configurations are the same as those of the contactless power supply system according to the first embodiment. Thus, referring to FIGS. 174 to 179, only the configurations of the coils of the power transmission side pad and the power reception side pad are described, and the description of operations is omitted. Note that, the same components as those of the nineteenth embodiment are designated with the same reference numerals to omit duplicate description.

As shown in FIGS. 174 to 176, a power transmission side pad 10 includes a core 100 and coils 103 (power supply coils). FIG. 176 is a cross-sectional view taken along the line M-M in FIG. 174.

The coil 103 is a member in a substantially rectangular annular shape configured of a wound conductor wire to generate magnetic flux, with current being passed through the coil. The coil 103 is disposed near the center part of the core 100 in the longitudinal direction parallel to the upper and lower surfaces and left and right side surfaces of the core 100, with its axial center direction aligned with being the longitudinal direction to use the core 100 as a magnetic path. As shown in FIGS. 177 and 178, when current is passed through the coils 103, magnetic flux is generated as shown in FIG. 179. When current flows in the reverse direction, a magnetic flux is generated in the reverse direction. FIG. 179 is a diagram for explaining magnetic flux flow in the power transmission side pad and the inductor coil.

A power reception side pad 12 has the same configuration as that of the power transmission side pad 10, and is disposed upside down.

When current is passed through the coils 103 to generate a magnetic flux, the magnetic flux flows through and around the core 100 as shown in FIG. 179. As a result, similarly to the nineteenth embodiment, electric currents as shown in FIG. 117 are induced in the coils COIL1 and COIL2. However, the coils COIL1 and COIL2 are arranged in such a manner that electric currents as shown in FIG. 113 are passed through the coils COIL1 and COIL2. Thus, electric currents induced from the magnetic fluxes generated from the coil 103 cancel each other. Consequently, the influence of the magnetic fluxes generated from the coil 103 can be reduced as much as possible.

An inductor coil 1311 is also similarly configured as the inductor coil 1110.

Next, the advantageous effects of the contactless power supply system according to the twenty-seventh embodiment will be described. According to the twenty-seventh embodiment, advantageous effects similar to those of the nineteenth embodiment can be obtained.

Twenty-eighth Embodiment

Next, a contactless power supply system according to a twenty-eighth embodiment will be described. In the contactless power supply system according to the twenty-eighth embodiment, the configurations of the coils of a power transmission side pad and a power reception side pad are changed from that of the contactless power supply system according to the nineteenth embodiment, and the arrangement of an inductor coil is changed in association with the change in the configurations. Other than the coils of the power transmission side pad and the power reception side pad and the arrangement of the inductor coil, the configurations are the same as those of the contactless power supply system according to the first embodiment. Thus, referring to FIGS. 180 to 188, only the configurations of the coils of the power transmission side pad and the power reception side pad and the arrangement of the inductor coil will be described, and the description of operations is omitted. Note that, the same components as those of the nineteenth embodiment are designated with the same reference numerals to omit duplicate description.

As shown in FIGS. 180 and 181, a power transmission side pad 10 includes a core 100 and a coil 104 (a power supply coil). FIG. 181 is a cross-sectional view taken along the line N-N in FIG. 180.

The coil 104 is a member in a substantially rectangular annular shape configured of a wound conductor wire to generate magnetic flux, with current being passed through the coil. The coil 104 is disposed near the center part on the top surface of the core 100 in the longitudinal direction and the lateral direction, with its axial center direction being aligned with the vertical direction to use the core 100 as a magnetic path. As shown in FIG. 182, when current is passed through the coil 104, magnetic flux is generated as shown in FIG. 183. When current flows in the reverse direction, a magnetic flux is generated in the reverse direction. FIG. 183 is a diagram corresponding to the cross-sectional view taken along the line of FIG. 181 for explaining current flow in the power transmission side pad.

A power reception side pad 12 has the same configuration as that of the power transmission side pad 10, and is disposed upside down.

As shown in FIGS. 184 to 186, similarly to the nineteenth embodiment, an inductor coil 1110 is disposed including two coils COIL1 and COIL2 in a substantially rectangular annular shape. However, the flows of magnetic fluxes generated from the coil 104 are different from the flows of magnetic fluxes generated from the coils 101 and 102 according to the nineteenth embodiment. Thus, the interconnections of the coils COIL1 and COIL2 are different. FIG. 186 is a diagram corresponding to the cross-sectional view taken along the arrow in FIG. 112 for explaining magnetic flux flow in the inductor coil. The coils COIL1 and COIL2 are arranged in such a manner that current as shown in FIGS. 184 and 185 is passed through the coils COIL1 and COIL2 when current is passed through the inductor coil 1110. In this case, magnetic fluxes as shown in FIG. 186 are generated.

When current is passed through the coil 104 to generate magnetic flux, the magnetic flux flows through and around the core 100 as shown in FIG. 187. FIG. 187 is a diagram for explaining magnetic flux flow in the power transmission side pad and the inductor coil. As a result, electric currents as shown in FIG. 188 are induced in the coils COIL1 and COIL2. However, the coils COIL1 and COIL2 are arranged in such a manner that electric currents as shown in FIG. 184 are passed through the coils COIL1 and COIL2. Thus, the electric currents induced from the magnetic fluxes generated from the coil 104 cancel each other. Accordingly, the influence of the magnetic fluxes generated from the coil 104 can be reduced as much as possible.

An inductor coil 1311 is also similarly configured as the inductor coil 1110.

Next, the advantageous effects of the contactless power supply system according to the twenty-eighth embodiment will be described. According to the twenty-eighth embodiment, advantageous effects similar to those of the nineteenth embodiment can be obtained.

Twenty-ninth Embodiment

Next, a contactless power supply system according to a twenty-ninth embodiment will be described. In the contactless power supply system according to the twenty-ninth embodiment, only the shape and disposition of an inductor coil are changed from the contactless power supply system according to the twenty-eighth embodiment. Other than the inductor coil, the configurations of the present embodiment are the same as those of the contactless power supply system according to the nineteenth embodiment. Thus, referring to FIGS. 189 to 193, only the configuration of the inductor coil is described, and the description of operations is omitted. Note that, the same components as those of the twenty-eighth embodiment are designated with the same reference numerals to omit duplicate description.

As shown in FIGS. 189 to 191, similarly to the twentieth embodiment, an inductor coil 1110 is disposed including two coils COIL1 and COIL2 in a substantially rectangular annular shape. However, the flows of magnetic fluxes generated from a coil 104 are different from the flows of magnetic fluxes generated from the coils 101 and 102 according to the second embodiment. Thus, the interconnections of the coils COIL1 and COIL2 are different. FIG. 191 is a diagram corresponding to the cross-sectional view taken along the line of FIG. 120 for explaining magnetic flux flow in the inductor coil. The coils COIL1 and COIL2 are arranged in such a manner that current as shown in FIGS. 189 and 190 is passed through the coils COIL1 and COIL2 when current is passed through the inductor coil 1110. In this case, magnetic fluxes as shown in FIG. 191 are generated.

When current is passed through the coil 104 to generate magnetic flux, the magnetic flux flows through and around the core 100 as shown in FIG. 192. FIG. 192 is a diagram for explaining magnetic flux flow in the power transmission side pad and the inductor coil. As a result, electric currents as shown in FIG. 193 are induced in the coils COIL1 and COIL2. However, the coils COIL1 and COIL2 are arranged in such a manner that electric currents as shown in FIG. 189 are passed through the coils COIL1 and COIL2. Thus, the electric currents induced from the magnetic fluxes generated from the coil 104 cancel each other. Accordingly, the influence of the magnetic fluxes generated from the coil 104 can be reduced as much as possible.

An inductor coil 1311 is also similarly configured as the inductor coil 1110.

Next, the advantageous effects of the contactless power supply system according to the twenty-ninth embodiment will be described. According to the twenty-ninth embodiment, advantageous effects similar to those of the twenty-eighth embodiment can be obtained.

Thirtieth Embodiment

Next, a contactless power supply system according to a thirtieth embodiment will be described. In the contactless power supply system according to the thirtieth embodiment, only the shape and disposition of an inductor coil are changed from the contactless power supply system according to the twenty-eighth embodiment. Other than the inductor coil, the configurations of the present embodiment are the same as those of the contactless power supply system according to the twenty-eighth embodiment. Thus, referring to FIGS. 194 to 197, only the configuration of the inductor coil is described, and the description of operations is omitted. Note that, the same components as those of the twenty-eighth embodiment are designated with the same reference numerals to omit duplicate description.

As shown in FIGS. 194 and 195, similarly to the twenty-first embodiment, an inductor coil 1110 is disposed including two coils COIL1 and COIL2 in a substantially rectangular annular shape. However, the flows of magnetic fluxes generated from a coil 104 are different from the flows of magnetic fluxes generated from the coils 101 and 102 according to the twenty-first embodiment. Thus, the interconnections of the coils COIL1 and COIL2 are different. FIG. 195 is a diagram corresponding to FIG. 127 for explaining magnetic flux flow in the inductor coil. The coils COIL1 and COIL2 are arranged in such a manner that current as shown in FIG. 194 is passed through the coils COIL1 and COIL2 when current is passed through the inductor coil 1110. In this case, magnetic fluxes as shown in FIG. 195 are generated.

When current is passed through the coil 104 to generate magnetic flux, the magnetic flux flows through and around the core 100 as shown in FIG. 196. FIG. 196 is a diagram for explaining magnetic flux flow in the power transmission side pad and the inductor coil. As a result, electric currents as shown in FIG. 197 are induced in the coils COIL1 and COIL2. However, the coils COIL1 and COIL2 are arranged in such a manner that electric currents as shown in FIG. 194 are passed through the coils COIL1 and COIL2. Thus, the electric currents induced from the magnetic fluxes generated from the coil 104 cancel each other. Accordingly, the influence of the magnetic fluxes generated from the coil 104 can be reduced as much as possible.

An inductor coil 1311 is also similarly configured as the inductor coil 1110.

Next, the advantageous effects of the contactless power supply system according to the thirtieth embodiment will be described. According to the thirtieth embodiment, advantageous effects similar to those of the twenty-eighth embodiment can be obtained.

Thirty-first Embodiment

Next, a contactless power supply system according to a thirty-first embodiment will be described. In the contactless power supply system according to the thirty-first embodiment, only the shape and disposition of an inductor coil are changed from the contactless power supply system according to the twenty-eighth embodiment. Other than the inductor coil, the configurations of the present embodiment are the same as those of the contactless power supply system according to the twenty-eighth embodiment. Thus, referring to FIGS. 198 to 204, only the configuration of the inductor coil is described, and the description of operations is omitted. Note that, the same components as those of the twenty-eighth embodiment are designated with the same reference numerals to omit duplicate description.

As shown in FIGS. 198 to 201, similarly to the twenty-second embodiment, an inductor coil 1110 is disposed including two coils COIL1 and COIL2 in a substantially rectangular annular shape. However, the flows of magnetic fluxes generated from a coil 104 are different from the flows of magnetic fluxes generated from the coils 101 and 102 according to the twenty-second embodiment. Thus, the interconnections of the coils COIL1 and COIL2 are different. The coils COIL1 and COIL2 are arranged in such a manner that current as shown in FIGS. 198 and 199 is passed through the coils COIL1 and COIL2 when current is passed through the inductor coil 1110. In this case, magnetic flux as shown in FIGS. 200 and 201 are generated. FIGS. 200 and 201 are diagrams corresponding to the cross-sectional views taken along the arrows of FIGS. 134 and 135 for explaining magnetic flux flow in the inductor coil.

When current is passed through the coil 104 to generate magnetic flux, the magnetic flux flows through and around the core 100 as shown in FIGS. 202 and 203. FIGS. 202 and 203 are diagrams for explaining magnetic flux flow in the power transmission side pad and the inductor coil. As a result, electric currents as shown in FIG. 204 are induced in the coils COIL1 and COIL2. However, the coils COIL1 and COIL2 are arranged in such a manner that electric currents as shown in FIG. 100 are passed through the coils COIL1 and COIL2. Thus, the electric currents induced from the magnetic fluxes generated from the coil 104 cancel each other. Accordingly, the influence of the magnetic fluxes generated from the coil 104 can be reduced as much as possible.

An inductor coil 1311 is also similarly configured as the inductor coil 1110.

Next, the advantageous effects of the contactless power supply system according to the thirty-first embodiment will be described. According to the thirty-first embodiment, advantageous effects similar to those of the twenty-eighth embodiment can be obtained.

Thirty-second Embodiment

Next, a contactless power supply system according to a thirty-second embodiment will be described. In the contactless power supply system according to the thirty-second embodiment, only the shape and disposition of an inductor coil are changed from the contactless power supply system according to the twenty-eighth embodiment. Other than the inductor coil, the configurations of the present embodiment are the same as those of the contactless power supply system according to the twenty-eighth embodiment. Thus, referring to FIGS. 205 to 208, only the configuration of the inductor coil is described, and the description of operations is omitted. Note that, the same components as those of the twenty-eighth embodiment are designated with the same reference numerals to omit duplicate description.

As shown in FIGS. 205 and 206, similarly to the twenty-sixth embodiment, an inductor coil 1110 is disposed including two coils COIL1 and COIL2 in a substantially rectangular annular shape. However, the flows of magnetic fluxes generated from a coil 104 are different from the flows of magnetic fluxes generated from the coils 101 and 102 according to the twenty-sixth embodiment. Thus, the interconnections of the coils COIL1 and COIL2 are different. FIG. 206 is a diagram corresponding to the cross-sectional view taken along the line of FIG. 169 for explaining magnetic flux flow in the inductor coil. The coils COIL1 and COIL2 are arranged in such a manner that current as shown in FIG. 205 is passed through the coils COIL1 and COIL2 when current is passed through the inductor coil 1110. In this case, magnetic fluxes as shown in FIG. 206 are generated.

When current is passed through the coil 104 to generate magnetic flux, the magnetic flux flows through and around the core 100 as shown in FIG. 207. FIG. 207 is a diagram for explaining magnetic flux flow in the power transmission side pad and the inductor coil. As a result, electric currents as shown in FIG. 208 are induced in the coils COIL1 and COIL2. However, the coils COIL1 and COIL2 are arranged in such a manner that electric currents as shown in FIG. 205 are passed through the coils COIL1 and COIL2. Thus, the electric currents induced from the magnetic fluxes generated from the coil 104 cancel each other. Accordingly, the influence of the magnetic fluxes generated from the coil 104 can be reduced as much as possible.

An inductor coil 1311 is also similarly configured as the inductor coil 1110.

Next, the advantageous effects of the contactless power supply system according to the thirty-second embodiment will be described. According to the thirty-second embodiment, advantageous effects similar to those of the nineteenth embodiment can be obtained.

Thirty-third Embodiment

Next, a contactless power supply system according to a thirty-third embodiment will be described. In the contactless power supply system according to the thirty-third embodiment, the configuration of a filter circuit is changed from that of the contactless power supply system according to the nineteenth embodiment, and the configuration of an inductor coil is changed in association with the change in the configuration of the filter circuit. Other than the filter circuit and the inductor coil, the configurations of the present embodiment are the same as those of the contactless power supply system according to the nineteenth embodiment. Thus, referring to FIGS. 209 to 215, only the configurations of the filter circuit and the inductor coil are described, and the description of operations is omitted. Note that, the same components as those of the nineteenth embodiment are designated with the same reference numerals to omit duplicate description.

As shown in FIG. 209, a filter circuit 111 includes inductor coils 1110 and 1112 and capacitors 1111 and 1113.

As shown in FIGS. 210 and 211, the inductor coils 1110 and 1112 are in a substantially rectangular annular shape configured of a wound conductor wire. FIG. 211 is a cross-sectional view taken along the line O-O of FIG. 210. The inductor coils 1110 and 1112 are provided to a core 100 of a power transmission side pad 10 to use the core 100 as a magnetic path. The inductor coil 1110 is configured of coils COIL1 and COIL2 in a substantially rectangular annular shape. The inductor coil 1112 is configured of coils COIL3 and COIL4 in a substantially rectangular annular shape. The inductor coils 1110 and 1112 are arranged in such a manner that magnetic fluxes do not cancel each other, which are generated when current is passed through the filter circuit 111. The coils COIL1 and COIL2 are arranged in such a manner that electric currents induced from magnetic fluxes generated from coils 101 and 102 cancel each other. The coils COIL3 and COIL4 are also arranged in such a manner that the electric currents induced from the magnetic fluxes generated from the coils 101 and 102 cancel each other. The coil COIL1 is disposed on the front surface of the core 100, with its axial center direction being the longitudinal direction. The coil COIL2 is disposed on the back surface of the core 100, with its axial center direction being the longitudinal direction. The coil COIL3 is disposed on the front side of the coil COIL1 so as to be located adjacent to the coil COIL1, with its axial center direction being the longitudinal direction. The coil COIL4 is disposed on the rear side of the coil COIL2 so as to be located adjacent to the coil COIL2, with its axial center direction being aligned with the longitudinal direction. The coils COIL1 and COIL2 as well as the coils COIL3 and COIL4 are arranged in such a manner that electric currents as shown in FIG. 212 are passed through the coils COIL1 and COIL2 when current is passed through the filter circuit 111. In this case, magnetic fluxes as shown in FIG. 213 are generated. FIG. 213 is a diagram corresponding to the cross-sectional view taken along the line of FIG. 211 for explaining magnetic flux flow in the inductor coils. Thus, a magnetic flux at an axial center part 1110a of the coil COIL1 and a magnetic flux at an axial center part 1112a of the coil COIL3 are directed in the same direction. A magnetic flux at an axial center part 1110b of the coil COIL2 and a magnetic flux at an axial center part 1112b of the coil COIL4 are also directed in the same direction. Consequently, the magnetic fluxes generated from the inductor coil 1110 and the magnetic fluxes generated from the inductor coil 1112 do not cancel each other.

When current is passed through the coils 101 and 102 to generate magnetic flux, the magnetic flux flows through and around the core 100 as shown in FIG. 214. FIG. 214 is a diagram for explaining magnetic flux flow in the power transmission side pad and the inductor coil. As a result, electric currents as shown in FIG. 215 are induced in the coils COIL1 and COIL2 and the coils COIL3 and COIL4. However, the coils COIL1 and COIL2 and the coils COIL3 and COIL4 are arranged in such a manner that electric currents as shown in FIG. 212 are passed through the coils COIL1 and COIL2 and the coils COIL3 and COIL4. Thus, the electric currents induced from the magnetic fluxes generated from the coils 101 and 102 cancel each other. Accordingly, the influence of the magnetic fluxes generated from the coils 101 and 102 can be reduced as much as possible.

Next, the advantageous effects of the contactless power supply system according to the thirty-third embodiment will be described.

According to the thirty-third embodiment, advantageous effects similar to those of the nineteenth embodiment can be obtained.

According to the thirty-third embodiment, two inductor coils 1110 and 1112 are provided to one core 100. Thus, the contactless power supply system 1 can be further downsized, compared with the case where two inductor coils having a core are separately provided.

According to the thirty-third embodiment, the inductor coils 1110 and 1112 are disposed adjacent to each other. Accordingly, an event that is an increase in the size of the core 100 can be reduced.

According to the thirty-third embodiment, the inductor coils 1110 and 1112 are arranged in such a manner that magnetic fluxes do not cancel each other, which are generated when current is passed through the filter circuit 111. Accordingly, the characteristics of the filter circuit 111 can be ensured.

Modifications

The above embodiments can have various forms as below. The first to the sixth embodiments have been described by way of an example in which the inductor coil of the filter circuit on the power transmission circuit side uses the core of the power transmission side pad as a magnetic path, and the inductor coil of the filter circuit on the power reception circuit side uses the core of the power reception side pad as a magnetic path. However, the embodiments are not limited to this example. At least any one of the inductor coils of the filter circuits only has to use the core of the pad connected to the filter circuit as a magnetic path.

Figure 36:
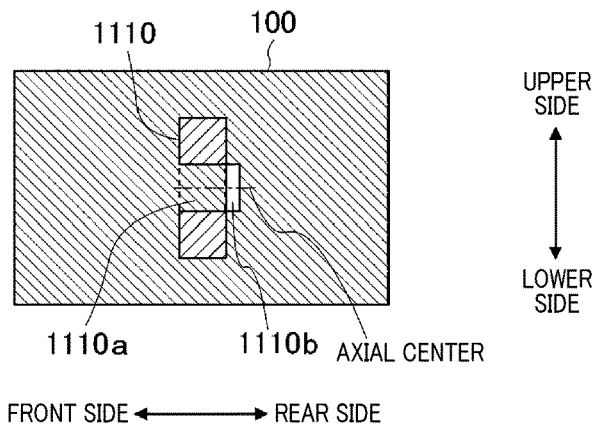
FIG. 36 is a cross-sectional view of a core for explaining a modification of the inductor coil.

The first to the sixth embodiments have been described by way of an example in which the magnetic permeability of the axial center part of the inductor coil is lower than the magnetic permeability of the core. However, the embodiments are not limited to this example. As shown in FIG. 36, a configuration may be possible, in which the magnetic permeability of the axial center part 1110a is the same as the magnetic permeability of the core 100 and the magnetic permeability of an end portion 1110b of the axial center part 1110a is lower than the magnetic permeability of the core 100. In the configuration, at least any one of the permeabilities of the axial center part 1110a and the end portion 1110b of the axial center part 1110a only has to be lower than the magnetic permeability of the core 100.

The first to the sixth embodiments have been described by way of an example in which in order to further decrease the magnetic permeability of the core, the axial center part is configured of an air layer. However, the embodiments are not limited to this example. The axial center part may be configured of a nonmagnetic material.

The first to the sixth embodiments have been described by way of an example in which the resonance capacitor is connected in parallel to the power transmission side pad and the resonance capacitor is connected in parallel to the power reception side pad. However, the embodiments are not limited to this example. The resonance capacitor may be serially connected to the power transmission side pad and the resonance capacitor may be serially connected to the power reception side pad.

The first to the sixth embodiments have been described by way of an example in which the filter circuit is configured of the inductor coil and the capacitor serially connected to each other. However, the embodiments are not limited to this example. The filter circuit may have a configuration other than this. The filter circuit only has to include an inductor coil.

The first to the sixth embodiments have been described by way of an example in which the coils and inductor coils of the power transmission side pad and the power reception side pad are in a substantially rectangular annular shape. However, the embodiments are not limited to this example. The coils and inductor coils of the power transmission side pad and the power reception side pad may be in an annular shape or in a semicircle shape. The coils and the inductor coils only have to be in an annular shape.

In the first to the sixth embodiments have been described by way of an example in which the core is in a rectangular parallelepiped shape. However, the embodiments are not limited to this example. The core may be in a columnar shape. The core only has to be in a shape in which a magnetic path can be configured. The axial center part of the coil may be configured of the magnetic material of the core.

Figure 37:
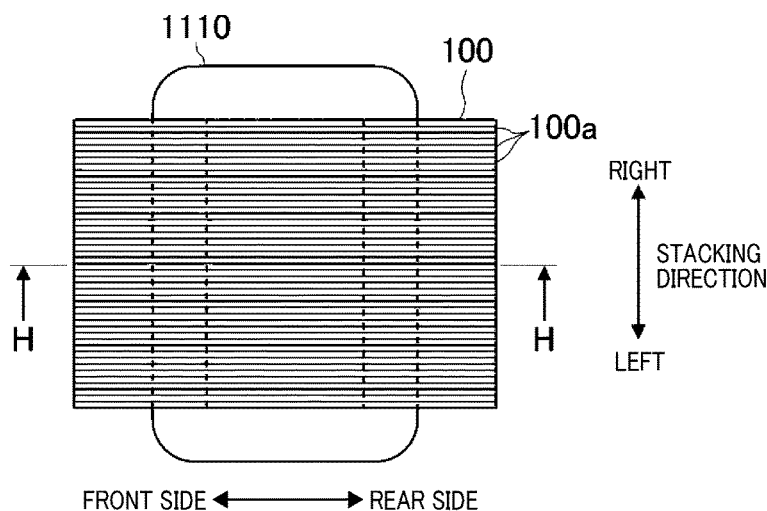
FIG. 37 is a top view of a core for explaining a modification of the core and the inductor coil.
Figure 38:
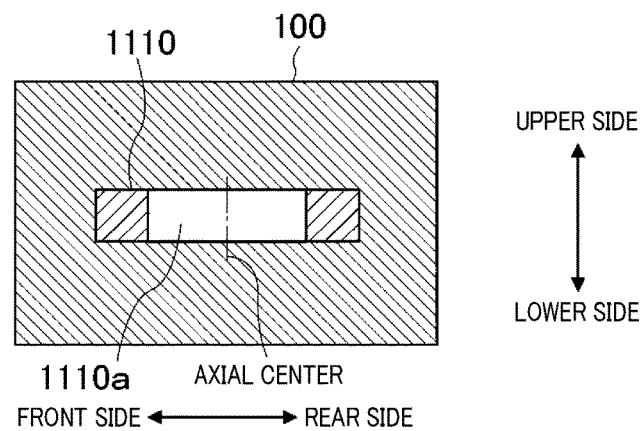
FIG. 38 is a cross-sectional view taken along the line H-H of FIG. 37.

The first to the sixth embodiments have been described by way of an example in which the core is configured of ferrite or a dust core. However, the embodiments are not limited to this example. A configuration may be possible, in which the core is formed by stacking a silicon steel sheet or an amorphous plate in the plate thickness direction. In this case, it is acceptable that the core is buried in such a manner that magnetic fluxes generated from the inductor coil are perpendicular to the stacking direction. As shown in FIG. 37 and FIG. 38, plate shaped magnetic materials 100a can be stacked in the plate thickness direction to configure a core 100, only a portion that generates magnetic flux perpendicular to the stacking direction may be buried in the core 100 when current is passed through the inductor coil 1110, and a portion that generates magnetic flux in the stacking direction can be disposed outside the core 100.

The third and the fourth embodiments have been described by way of an example in which the inductor coils 1110 and 1112 are buried in the core 100 so as to be located adjacent to each other in the direction perpendicular to the axial center direction. However, the embodiments are not limited to this example. The inductor coils 1110 and 1112 may be buried in the core 100 so as to be located adjacent to each other in the axial center direction. The inductor coils 1110 and 1112 only have to be arranged in such a manner that a magnetic flux at the axial center part 1110a, which is generated from the inductor coil 1110, and a magnetic flux at the axial center part 1112a, which is generated from the inductor coil 1112, are directed to the same direction when current is passed through the filter circuit 111. Under these conditions, magnetic fluxes do not cancel each other.

The third and the fourth embodiments have been described by way of an example in which the two inductor coils 1110 and 1112 are buried in the core 100. However, the embodiments are not limited to this example. Three or more inductor coils may be buried in the core.

The third and the fourth embodiments have been described by way of an example in which the inductor coils 1110 and 1112 are arranged so as to be buried adjacently in the core 100 and magnetic fluxes, which are generated when current is passed through the filter circuit 111, do not cancel each other. However, the embodiments are not limited to this example. Depending on the configuration of the filter circuit, when current is passed through the filter circuit, the inductor coils sometimes have to be arranged in such a manner that magnetic fluxes generated from a plurality of inductor coils configuring the filter circuit cancel each other. In this case, a plurality of inductor coils only has to be disposed as separated from each other. An event, in which magnetic fluxes cancel each other, can be reduced as much as possible.

The fifth and the sixth embodiments have been described by way of an example in which the configuration of the inductor coil is the same as that of the first embodiment. However, the embodiments are not limited to this example. The configuration of the inductor coil may be the same as the configurations of the second to the fourth embodiments. With any combination of the configurations, advantageous effects similar to those of the second to the fourth embodiments can be obtained.

The seventh to the eighteenth embodiments have been described by way of an example in which the inductor coil of the filter circuit on the power transmission circuit side uses the core of the power transmission side pad as a magnetic path, and the inductor coil of the filter circuit on the power reception circuit side uses the core of the power reception side pad as a magnetic path. However, the embodiments are not limited to this example. At least any one of the inductor coils of the filter circuits only has to use the core of the pad connected to the filter circuit as a magnetic path.

The seventh to the eighteenth embodiments have been described by way of an example in which the resonance capacitor is connected in parallel to the power transmission side pad and the resonance capacitor is connected in parallel to the power reception side pad. However, the embodiments are not limited to this example. The resonance capacitor may be serially connected to the power transmission side pad and the resonance capacitor may be serially connected to the power reception side pad.

The seventh to the eighteenth embodiments have been described by way of an example in which the filter circuit is configured of the inductor coil and the capacitor serially connected to each other. However, the embodiments are not limited to this example. The filter circuit may have a configuration other than this. The filter circuit only has to include an inductor coil.

The seventh to the eighteenth embodiments have been described by way of an example in which the coils and inductor coils of the power transmission side pad and the power reception side pad are in a substantially rectangular annular shape. However, the embodiments are not limited to this example. The coils and inductor coils of the power transmission side pad and the power reception side pad may be in an annular shape or in a semicircle shape. The coils and the inductor coils only have to be in an annular shape.

The seventh to the eighteenth embodiments have been described by way of an example in which the core is in a rectangular parallelepiped shape. However, the embodiments are not limited to this example. The core may be in a columnar shape. The core only has to be in a shape in which a magnetic path can be configured. The axial center part of the coil may be configured of the magnetic material of the core.

The seventh to the eighteenth embodiments have been described by way of an example in which the core is configured of ferrite or a dust core. However, the embodiments are not limited to this example. A configuration may be possible, in which the core is formed by stacking a silicon steel sheet or an amorphous plate in the plate thickness direction. In this case, it is fine that the core is disposed or is buried in such a manner that magnetic fluxes generated from the inductor coil are perpendicular to the stacking direction.

The tenth embodiment has been described by way of an example in which the inductor coil 1110 is disposed immediately below the coils 101 and 102 of the power transmission side pad 10. However, the embodiment is not limited to this example. The inductor coil 1110 may be disposed immediately above the coils 101 and 102 of the power transmission side pad 10, or may be disposed on the bottom face of the core 100.

The thirteenth embodiment has been described by way of an example in which the configuration of the inductor coil is the same as that of the first embodiment. However, the embodiment is not limited to this example. The configuration of the inductor coil may be the same as the configurations of the eighth to the twelfth embodiments. With any combination of the configurations, advantageous effects similar to those of the eighth to the fourteenth embodiments can be obtained.

The eighteenth embodiment has been described by way of an example in which the inductor coils 1110 and 1112 are buried in the core 100 so as to be located adjacent to each other in the axial center direction. However, the embodiment is not limited to this example. The inductor coils 1110 and 1112 may be buried in the core 100 so as to be located adjacent to each other in the direction perpendicular to the axial center direction. The inductor coils 1110 and 1112 only have to be arranged in such a manner that a magnetic flux at the axial center part 1110a, which is generated from the inductor coil 1110, and a magnetic flux at the axial center part 1112a, which is generated from the inductor coil 1112, flow in the reverse direction when current is passed through the filter circuit 111. Under these conditions, magnetic fluxes do not cancel each other.

The eighteenth embodiment has been described by way of an example in which the two inductor coils 1110 and 1112 are buried in the core 100. However, the embodiment is not limited to this example. Three or more inductor coils may be buried in the core.

The nineteenth to the thirty-third embodiments have been described by way of an example in which the inductor coil of the filter circuit on the power transmission circuit side uses the core of the power transmission side pad as a magnetic path, and the inductor coil of the filter circuit on the power reception circuit side uses the core of the power reception side pad as a magnetic path. However, the embodiments are not limited to this example. At least any one of the inductor coils of the filter circuits only has to use the core of the pad connected to the filter circuit as a magnetic path.

The nineteenth to the thirty-third embodiments have been described by way of an example in which the inductor coil is configured of two coils. However, the embodiments are not limited to this example. The inductor coil may be configured of three or more coils. The inductor coil only has to be arranged in such a manner that electric currents induced from the magnetic fluxes generated from the coil of the power transmission side pad cancel each other.

The nineteenth to the thirty-third embodiments have been described by way of an example in which the resonance capacitor is connected in parallel to the power transmission side pad and the resonance capacitor is connected in parallel to the power reception side pad. However, the embodiments are not limited to this example. The resonance capacitor may be serially connected to the power transmission side pad and the resonance capacitor may be serially connected to the power reception side pad.

The nineteenth to the thirty-third embodiments have been described by way of an example in which the filter circuit is configured of the inductor coil and the capacitor serially connected to each other. However, the embodiments are not limited to this example. The filter circuit may have a configuration other than this. The filter circuit only has to include an inductor coil.

The nineteenth to the thirty-third embodiments have been described by way of an example in which the coils and inductor coils of the power transmission side pad and the power reception side pad are in a substantially rectangular annular shape. However, the embodiments are not limited to this example. The coils and inductor coils of the power transmission side pad and the power reception side pad may be in an annular shape or in a semicircle shape. The coils and the inductor coils only have to be in an annular shape.

The nineteenth to the thirty-third embodiments have been described by way of an example in which the core is in a rectangular parallelepiped shape. However, the embodiments are not limited to this example. The core may be in a columnar shape. The core only has to be in a shape in which a magnetic path can be configured. The axial center part of the coil may be configured of the magnetic material of the core.

The nineteenth to the thirty-third embodiments have been described by way of an example in which the core is configured of ferrite or a dust core. However, the embodiments are not limited to this example. A configuration may be possible, in which the core is formed by stacking a silicon steel sheet or an amorphous plate in the plate thickness direction. In this case, it is fine that the core is buried in such a manner that magnetic fluxes generated from the inductor coil are perpendicular to the stacking direction. As shown in FIG. 216, a configuration only has to be provided, in which plate shaped magnetic materials 100a are stacked in the plate thickness direction to configure a core 100, only a portion that generates magnetic flux perpendicular to the stacking direction is buried in the core 100 when current is passed through the inductor coil 1110, and a portion that generates magnetic flux in the stacking direction is disposed outside the core 100.

The twenty-first embodiment has been described by way of an example in which the shapes of the coils COIL1 and COIL2 configuring the inductor coil 1110 are the same as the shapes of the coils 101 and 102 of the power transmission side pad 10 and disposed immediately below the coils 101 and 102. However, the embodiment is not limited to this example. The coils COIL1 and COIL2 configuring the inductor coil 1110 may be in shapes different from the shapes of the coils 101 and 102 of the power transmission side pad 10. The coils COIL1 and COIL2 may be disposed immediately above the coils 101 and 102 of the power transmission side pad 10, or may be disposed on the bottom face of the core 100.

The twenty-fifth embodiment has been described by way of an example in which the coils COIL1 and COIL2 configuring the inductor coil 1110 are buried in the core 100, with their axial center directions being the longitudinal direction. In the eighth embodiment, the coils COIL1 and COIL2 configuring the inductor coil 1110 are buried in the core 100, with their axial center directions being the vertical direction. However, the embodiments are not limited to these examples. The coils COIL1 and COIL2 may be buried in the core 100, with their axial center directions being the lateral direction.

The twenty-seventh embodiment has been described by way of an example in which the configuration of the inductor coil is the same as that of the first embodiment. However, the embodiment is not limited to this example. The configuration of the inductor coil may be the same as the configurations of the twentieth to the twenty-sixth embodiments. With any combination of the configurations, the effect similar to the effects of the twentieth to the twenty-second embodiments can be obtained.

The twenty-eighth to the thirty-second embodiments have been described by way of an example in which the power transmission side pad 10 including the coil 104 is combined with inductor coils in various configurations. However, the embodiments are not limited to this example. The configuration of the inductor coil may be the same as that of the twenty-third and the twenty-fifth embodiments. With any combination of the configurations, advantageous effects similar to those of the twenty-third and the twenty-fifth embodiments can be obtained.

The thirty-third embodiment has been described by way of an example in which the two inductor coils 1110 and 1112 are provided to the core 100. However, the embodiment is not limited to this example. Three or more inductor coils may be provided to the core.

The thirty-third embodiment has been described by way of an example in which the inductor coils 1110 and 1112 arranged so as to be adjacently buried in the core 100 and magnetic fluxes, which are generated when current is passed through the filter circuit 111, do not cancel each other. However, the embodiment is not limited to this example. Depending on the configuration of the filter circuit, when current is passed through the filter circuit, the inductor coils sometimes have to be arranged in such a manner that magnetic fluxes generated from a plurality of inductor coils configuring the filter circuit cancel each other. In this case, a plurality of inductor coils only has to be disposed as separated from each other. A situation in which magnetic fluxes cancel each other, can be reduced as much as possible.

REFERENCES SIGNS LIST

1 . . . Contactless power supply system
10 . . . Power transmission side pad (power supply pad)
100 . . . Core (power supply core)
101, 102 . . . Coil (power supply coil)
11 . . . Power transmission circuit
110, 132 . . . Power conversion circuit
111, 131 . . . Filter circuit
1110 . . . Inductor coil
1111, 1113 . . . Capacitor
112, 130 . . . Resonance capacitor

What is claimed is:

1. A contactless power supply system comprising:
a power supply pad including a power supply core formed of a magnetic material, and a power supply coil provided to the power supply core to use the power supply core as a magnetic path; and
a filter circuit including an inductor coil, the filter circuit being connected to the power supply pad, wherein:
the power supply pad to which the filter circuit is connected is brought into a face-to-face relation with a power reception pad such that electric power is transmitted from the power supply pad to the power reception pad in a contactless manner, wherein
the inductor coil of the filter circuit is provided to the power supply core of the power supply pad to which the filter circuit is connected, and the inductor coil uses the power supply core as a magnetic path.

2. The contactless power supply system according to claim 1, wherein
the inductor coil provided to the power supply core is provided such that a coupling coefficient of the inductor coil to the power supply coil is substantially zero.

3. The contactless power supply system according to claim 2, wherein
the inductor coil provided to the power supply core is buried in the power supply core.

4. The contactless power supply system according to claim 3, wherein
the inductor coil provided to the power supply core is an annular coil; and
at least any one of a magnetic permeability of an axial center part and a magnetic permeability of an end portion of the axial center part is lower than a magnetic permeability of the power supply core.

5. The contactless power supply system according to claim 4, wherein
in the inductor coil provided to the power supply core, at least any one of an axial center part and an end portion of the axial center part is formed of an air layer or a nonmagnetic material.

6. The contactless power supply system according to claim 1, wherein
a plurality of the inductor coils is provided to the power supply core.

7. The contactless power supply system according to claim 6, wherein
the plurality of the inductor coils provided to the power supply core is disposed adjacent to each other.

8. The contactless power supply system according to claim 7, wherein
the plurality of the inductor coils provided to the power supply core is arranged such that magnetic fluxes to be generated when current is passed through the filter circuit do not cancel each other.

9. A contactless power supply system comprising:
a power supply pad including a power supply core formed of a magnetic material, and a power supply coil provided to the power supply core to use the power supply core as a magnetic path; and
a filter circuit including an inductor coil, the filter circuit being connected to the power supply pad, wherein:
the power supply pad to which the filter circuit is connected is brought into a face-to-face relation with a power reception pad so that electric power is transmitted from the power supply pad to the power reception pad in a contactless manner, wherein
the inductor coil of the filter circuit is in an annular shape;
the inductor coil is provided to the power supply core of the power supply pad to which the filter circuit is connected such that magnetic fluxes generated from the power supply coil are substantially perpendicular to an axial center direction at an axial center part; and
the inductor coil uses the power supply core as a magnetic path.

10. The contactless power supply system according to claim 9, wherein
the inductor coil provided to the power supply core is buried in the power supply core.

11. The contactless power supply system according to claim 9, wherein
the inductor coil provided to the power supply core is provided to a surface of the power supply core.

12. The contactless power supply system according to claim 9, wherein
a plurality of the inductor coils is provided to the power supply core.

13. The contactless power supply system according to claim 12, wherein the plurality of the inductor coils provided to the power supply core is disposed adjacent to each other.

14. The contactless power supply system according to claim 13, wherein
the plurality of the inductor coils provided to the power supply core are arranged so that magnetic fluxes to be generated when current is passed through the filter circuit do not cancel each other.

15. A contactless power supply system comprising:
a power supply pad including a power supply core formed of a magnetic material, and a power supply coil provided to the power supply core to use the power supply core as a magnetic path; and
a filter circuit including an inductor coil, the filter circuit being connected to the power supply pad, wherein:
the power supply pad to which the filter circuit is connected is brought into a face-to-face relation with a power reception pad such that electric power is transmitted from the power supply pad to the power reception pad in a contactless manner, wherein
the inductor coil of the filter circuit is formed of a plurality of coils;
the inductor coil is configured to include the plurality of coils arranged such that electric currents induced by magnetic fluxes generated from the power supply coil cancel each other;
the inductor coil is provided to the power supply core of the power supply pad to which the filter circuit is connected; and
the inductor coil uses the power supply core as a magnetic path.

16. The contactless power supply system according to claim 15, wherein
the inductor coil provided to the power supply core is buried in the power supply core.

17. The contactless power supply system according to claim 15, wherein
the inductor coil provided to the power supply core is provided to a surface of the power supply core.

18. The contactless power supply system according to claim 15, wherein
a plurality of the inductor coils is provided to the power supply core.

19. The contactless power supply system according to claim 18, wherein
the plurality of the inductor coils provided to the power supply core is disposed adjacent to each other.

20. The contactless power supply system according to claim 19, wherein
the plurality of the inductor coils provided to the power supply core is arranged so that magnetic fluxes to be generated when current is passed through the filter circuit do not cancel each other.

* * * * *